(12) United States Patent
Kobayashi et al.

(10) Patent No.: US 8,027,156 B2
(45) Date of Patent: Sep. 27, 2011

(54) KEYBOARD CONNECTION CONFIGURATION AND ELECTRONIC DEVICE

(75) Inventors: Norio Kobayashi, Tokyo (JP); Hideki Hanamura, Nagano (JP); Masanori Akiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 12/477,698

(22) Filed: Jun. 3, 2009

(65) Prior Publication Data
US 2009/0279238 A1 Nov. 12, 2009

Related U.S. Application Data

(63) Continuation-in-part of application No. 12/121,476, filed on May 15, 2008, now Pat. No. 7,733,636.

(30) Foreign Application Priority Data

May 16, 2007 (JP) ................................ 2007-130721
Jun. 4, 2008 (JP) ................................ 2008-146374

(51) Int. Cl.
G06F 1/16 (2006.01)
G06F 3/02 (2006.01)
H01H 9/04 (2006.01)
H01H 13/70 (2006.01)
H03K 17/94 (2006.01)
B41J 11/56 (2006.01)
B41J 29/02 (2006.01)

(52) U.S. Cl. ......... 361/679.17; 361/679.08; 361/679.58; 200/302.1; 200/345; 345/168; 345/169; 341/22; 400/682; 400/691; 400/692; 400/693

(58) Field of Classification Search ................................
361/679.01–679.45, 679.55–679.59, 679.11–679.17;
345/156, 157, 168, 169; 200/302.1, 345;
341/22; 400/682, 82, 691–693, 488–489
See application file for complete search history.

(56) References Cited

U.S. PATENT DOCUMENTS

| | | | | |
|---|---|---|---|---|
| 5,510,953 A * | 4/1996 | Merkel | ................... | 361/679.08 |
| 6,064,564 A * | 5/2000 | Song et al. | ............... | 361/679.09 |
| 6,493,215 B1 * | 12/2002 | Chiang et al. | ............ | 361/679.08 |
| 6,731,269 B2 * | 5/2004 | Horiuchi et al. | .............. | 345/168 |
| 6,922,333 B2 * | 7/2005 | Weng et al. | ................ | 361/679.2 |

(Continued)

FOREIGN PATENT DOCUMENTS

JP 11-265251 9/1999

*Primary Examiner* — Jayprakash N Gandhi
*Assistant Examiner* — Nidhi Desai
(74) *Attorney, Agent, or Firm* — Oblon, Spivak, McClelland, Maier & Neustadt, L.L.P.

(57) ABSTRACT

A keyboard includes a keyboard unit and casing. The keyboard unit is rectangular and includes a first and second surface, the first surface including at least one key disposed thereon, the second surface including a protrusion portion that protrudes therefrom. The protrusion portion includes an engagement hole open toward a first direction that corresponds to a longitudinal direction of the rectangle. The casing includes a third surface on which the keyboard unit is mounted, the third surface including an insertion or through hole into which the protrusion portion is insertable, the casing including an engagement protrusion provided at a position opposed to the engagement hole of the protrusion portion that is inserted into the through hole, the engagement protrusion being engaged with the engagement hole of the inserted protrusion portion when the keyboard unit is moved in the first direction. A method of assembling the keyboard is also described.

13 Claims, 47 Drawing Sheets

U.S. PATENT DOCUMENTS

| | | |
|---|---|---|
| 7,643,278 B2 * | 1/2010 | Hou .................. 361/679.17 |
| 7,755,883 B2 * | 7/2010 | Hsu et al. .............. 361/679.17 |
| 2002/0048155 A1 * | 4/2002 | Chiang et al. ............. 361/747 |
| 2002/0085338 A1 * | 7/2002 | Lin ............................ 361/680 |
| 2004/0190233 A1 * | 9/2004 | Yu et al. ..................... 361/680 |
| 2006/0028791 A1 * | 2/2006 | Huang et al. ............... 361/683 |
| 2006/0279912 A1 * | 12/2006 | Shi et al. .................... 361/680 |
| 2007/0201194 A1 * | 8/2007 | Chen et al. ................. 361/680 |

* cited by examiner

KEYBOARD CONNECTION CONFIGURATION AND ELECTRONIC DEVICE

CROSS REFERENCES TO RELATED APPLICATIONS

The present invention contains subject matter related to and claims priority to Japanese Patent Application JP 2007-130721, filed in the Japanese Patent Office on May 16, 2007, and to Japanese Patent Application JP 2008-146374, filed in the Japanese Patent Office on Jun. 4, 2008, the entire contents of both of which Japanese Patent Applications are incorporated herein by reference. The present invention also claims priority under 35 U.S.C §120 to U.S. application Ser. No. 12/121,476, filed on May 15, 2008, the entire contents of which are incorporated herein by reference.

BACKGROUND OF THE INVENTION

1. Field of the Invention

The present invention relates to keyboard connection configurations and electronic devices. One example of the present invention relates to ensuring a strong connection of a keyboard to a casing by providing multiple retaining portions at predetermined positions on the keyboard. In another example, the present invention relates to a keyboard used for a laptop personal computer or the like, an electronic device such as a laptop personal computer including such a keyboard mounted thereon, a keyboard manufacturing method, an electronic device manufacturing method, and a keyboard component used for such a keyboard.

2. Description of the Related Art

In electronic devices such as personal computers, cellular phones, and PDAs (Personal Digital Assistant), etc., there is typically a keyboard (keyboard unit) having multiple operating keys. The keyboard is typically connected to a casing (see Japanese Patent No. 3218819).

With the electronic device described in Japanese Patent No. 3218819, an engagement pawl portion is provided on both edge portions of the keyboard, a hole portion and a pawl portion are formed in a casing, one of the pawl portions of the keyboard is inserted in the hole portion of the casing to engage this with the opening edge of the hole portion, and the other pawl portion of the keyboard is engaged with the pawl portion of the casing to connect the keyboard to the casing. With this arrangement, a backing plate for receiving the operating key at the time of an operating key being pressed is typically provided on the casing.

Note however, with the electronic device provided in Japanese Patent No. 3218819, only the pawl portions provided on both edge portions of the keyboard are engaged with the casing, whereby the keyboard is connected to the casing. Thus, if the backing plate is bent due to aging, temperature environment, or the like, the center of the keyboard floats upwards from the casing, and the sense of operation when pressing an operating key deteriorates, in some cases.

Particularly, in a case in which the backing plate is formed of a thin metal material such as aluminum or the like to reduce weight and thickness of the electronic device, bending of the backing plate readily occurs.

In order to prevent bending of the backing plate, for example, there is a method for fixing the center portion of the keyboard to the casing using screw-thread members, but this arrangement can create difficulties upon disassembly of the keyboard from the casing, and thus can lead to difficulty in maintenance.

Accordingly, there has been recognized a need to provide a keyboard connection configuration with a strong connection to the casing.

It is preferable to provide different keyboards to laptop personal computers depending on destination positions. Further, a keyboard is often attached/detached for maintenance. When a keyboard unit is secured to a casing by screws, attachment/detachment operations can become unduly complicated.

There has been proposed a method in which a marginal surface of a keyboard unit is fixed to a casing by a lug portion of a casing, and the keyboard unit is put upwards with fingers or the like through an opening in a rear surface (position where the keyboard unit is provided) of the casing, thereby detaching the keyboard unit from the casing.

In this method, however, a center area of the keyboard unit is not fixed in position, so a rigidity of the keyboard is low and a keystroke feeling may be insufficient. By securing the center area of the keyboard unit to the casing by screws or the like, that issue may be overcome, but attachment/detachment operations may become complicated. In particular, securing the keyboard unit to the casing at the center area thereof by screws may be required to be performed from a rear surface side of the casing. Therefore, a disassembly operation of the casing may be unduly complicated.

In view of the above-mentioned circumstances, it is desirable to provide a keyboard, an electronic device, a keyboard manufacturing method, an electronic device manufacturing method, and a keyboard component that are capable of facilitating the attachment/detachment operation of the keyboard unit while providing a high keyboard rigidity and desirable keystroke feeling.

SUMMARY OF THE INVENTION

With a keyboard connection configuration according to one embodiment of the present invention, multiple retaining portions are provided on at least a portion other than an outer circumferential portion of a placement base of the keyboard. Additionally multiple retaining portions configured to be engaged with the multiple retaining portions of the placement base respectively are provided on the casing.

An electronic device according to one embodiment of the present invention includes a keyboard having a plurality of operating keys and a placement base where the plurality of operating keys are disposed. This embodiment includes a casing on which the keyboard is disposed and to which the keyboard is attached. The keyboard is disposed on the casing and attached to the casing in a layered state. A plurality of retaining portions are provided on at least portions other than an outer circumferential portion of the placement base of the keyboard. A plurality of connection retaining portions are provided on the casing. The plurality of retaining portions of the placement base are retained in and connected to the plurality of connection retaining portions, respectively.

Accordingly, with the keyboard connection configuration and electronic device according to the first aspect of the present invention, at least a portion other than an outer circumferential portion of the placement base is connected to the casing.

The keyboard connection configuration according to one aspect of the present invention includes a keyboard having a plurality of operating keys and a placement base where the plurality of operating keys are disposed. This aspect also includes a casing on which the keyboard is disposed on and to which the keyboard is attached. The keyboard is disposed on and attached to the casing in a layered state. A plurality of retaining portions are provided on at least portions other than an outer circumferential portion of the placement base of the keyboard. A plurality of connection retaining portions are provided on the casing. The plurality of retaining portions of the placement base are retained in and connected to the connection retaining portions, respectively.

Therefore, a strong connection state of the keyboard as to the casing can be provided. Further, excellent operation feeling can be provided when pressing an operating key without causing the keyboard to float up from the casing.

A plurality of through holes, which continue to extend the plurality of connection retaining portions, may be formed in the casing. Each of the plurality of retaining portions is inserted in a through hole and in a state in which the plurality of retaining portions are inserted in the plurality of through holes in the layering direction of the keyboard and the casing respectively, the keyboard is configured to slide relative to the casing. Thus, the plurality of retaining portions are retained in the plurality of connection retaining portions respectively to connect the keyboard to the casing. Accordingly there is no need to connect the keyboard to the casing with a screw-thread using a screw clamp, disassembly of the keyboard from the casing can be readily performed, and ease of maintenance can be improved.

Another aspect of the invention provides a keyboard cover fixed to the placement base from the opposite side of the casing, whereby rigidity of the keyboard and device main frame portion can be enhanced.

An electronic device according to another aspect of the present invention includes a device main frame portion, a display portion supported by the device main frame portion, a keyboard having a plurality of operating keys, and a placement base where the plurality of operating keys are disposed. This aspect includes a casing on which the keyboard is disposed and to which the keyboard is attached. A plurality of retaining portions are provided on at least portions other than an outer circumferential portion of the placement base of the keyboard. A plurality of connection retaining portions are provided on the casing. The plurality of retaining portions of the placement base are retained in and connected to the connection retaining portions, respectively.

Therefore, a strong connection state of the keyboard as to the casing can be provided, and accordingly, excellent sense of operation can be achieved when pressing an operating key, without causing the keyboard to float up from the casing.

One aspect of the invention provides a keyboard connection configuration including a keyboard with a plurality of operating keys, a placement base in which the plurality of operating keys are disposed, and means for retaining disposed on at least portions of the placement base of the keyboard other than an outer circumferential portion. This aspect of the invention further includes a casing on which the keyboard is disposed and to which the keyboard is attached in a layered configuration and means for connecting the casing to the means for retaining.

Another aspect of the invention provides an electronic device including a device main frame portion and a display portion supported by the device main frame portion. This aspect includes a keyboard with a plurality of operating keys, a placement base in which the plurality of operating keys are disposed, and means for retaining disposed on at least portions of the placement base of the keyboard other than an outer circumferential portion. This aspect further includes a casing on which the keyboard is disposed and to which the keyboard is attached and means for connecting the casing to the means for retaining.

According to another embodiment, there is provided a keyboard including a keyboard unit and a casing. The keyboard unit is formed into a substantially rectangular shape and includes a first surface and a second surface. The first surface includes a key disposed thereon, and the second surface includes a protrusion portion that protrudes therefrom. The protrusion portion typically has an engagement hole toward a first direction that corresponds to a longitudinal direction of the rectangle. The casing includes a third surface on which the keyboard unit is mounted. The third surface typically has an insertion or through hole into which the protrusion portion is capable of being inserted. The casing includes an engagement protrusion provided at a position opposed to the engagement hole of the protrusion portion that is inserted into the insertion or through hole. The engagement protrusion is engaged with the engagement hole of the inserted protrusion portion when the keyboard unit is moved in the first direction.

In this embodiment, the protrusion portion of the keyboard unit is inserted into the insertion hole, of the casing, and when the keyboard unit is moved in the first direction that corresponds to the longitudinal direction of the rectangular keyboard unit, the engagement hole of the inserted protrusion portion is engaged with the engagement protrusion of the casing. On the other hand, to detach the keyboard unit from the casing, by moving the keyboard unit in a direction opposite to the first direction, the inserted protrusion portion is detached from the engagement protrusion of the casing. After that, the protrusion portion of the keyboard unit is drawn from the insertion hole of the casing. Thus, the attachment/detachment operation of the keyboard unit can be easily performed. In addition, because the predetermined area of the keyboard unit can be fixed to the first casing, a high rigidity and desirable keystroke feeling of the keyboard can be obtained.

In this embodiment, the protrusion portion may be provided in each of a first area and a second area, the first area being located along at least one of two short sides of the rectangle, the second area being located inside the rectangle away from each side of the rectangle. The insertion hole may be formed at a position corresponding to the protrusion portion. The engagement hole of the protrusion portion provided in the first area may be brought into contact with the engagement protrusion engaged with the insertion hole corresponding thereto before the engagement hole of the protrusion portion provided in the second area is brought into contact with the engagement protrusion engaged with the insertion hole corresponding thereto, when the keyboard unit is moved in the first direction.

With this structure, positioning is performed in the vicinity of the perimeter of the keyboard unit in which an operator can easily carry out the positioning, and the engagement hole of the protrusion portion at this position is guided to the engagement protrusion of the insertion hole. After that, positioning is performed inside the keyboard unit in which it is relatively difficult for the operator to carry out the positioning in accordance with the guide, thereby engaging engagement hole of the protrusion portion at this position with the engagement protrusion of the insertion hole. As a result, it can be prevented that the engagement hole of the protrusion portion fails to be engaged with the engagement protrusion of the insertion hole in the center area of the keyboard unit and a space is left in the center area, when the keyboard unit is attached to the casing.

The keyboard may further include an eave portion to guide the engagement protrusion to the engagement hole of the protrusion portion when the keyboard unit is moved in the first direction, the eave portion being provided to the protrusion portion toward the first direction.

With this structure, the eave portion guides the engagement hole of the protrusion portion to the engagement protrusion of the insertion hole. Thus, it can be prevented that the engagement hole of the protrusion portion fails to be engaged with the engagement protrusion of the insertion hole when the keyboard unit is attached to the casing.

The eave portion may be inclined to be distanced from the engagement protrusion with increasing distance from the protrusion portion in the first direction.

With this structure, the engagement hole of the protrusion portion can be more reliably guided to the engagement protrusion of the insertion hole by the eave portion.

The keyboard may further include a guide member, a guide groove, and a guide rail. The guide member has an L shape that protrudes outward from the keyboard unit, the guide member being provided in a third area located along a first side of two long sides of the rectangle of the keyboard unit. The guide groove is provided at a position corresponding to the guide member in the casing, the guide groove allowing the guide member to be inserted thereinto and allowing the inserted guide member to move in the first direction. The guide rail is used for guiding the guide member in the first direction with the guide rail being engaged with the guide member, the guide groove being provided along an outer side of the guide groove. Here, the keyboard unit has a first screw hole in a fourth area located along a second side of the two long sides of the rectangle. The casing has a second screw hole that penetrates the casing, the second screw hole being formed at a position corresponding to the first screw hole. The keyboard may further include a screw that is screwed into the first screw hole through the second screw hole.

With this structure, by using the guide member and the guide rail, the keyboard unit and the casing are positioned. In addition, the engagement hole of the protrusion portion is guided to the engagement protrusion of the insertion hole by the guide member and the guide rail. As a result, it can be prevented that the engagement hole of the protrusion portion fails to be engaged with the engagement protrusion of the insertion hole when the keyboard unit is attached to the casing.

The keyboard may further include a flexible wiring substrate to electrically connect the keyboard unit and the casing, the flexible wiring substrate being folded into a concave shape concaved toward the first direction, and a containing portion to contain the flexible wiring substrate, the containing portion being provided in the casing.

With this structure, when the keyboard unit is attached to the casing, the flexible wiring substrate is typically smoothly deformed, which can prevent excessive pressure from being applied to the flexible wiring substrate, and the flexible wiring substrate is contained in the containing portion with the flexible wiring substrate being folded. Therefore, the wiring substrate can be prevented from being stuck between the keyboard unit and the casing.

According to another embodiment, there is provided an electronic device. The electronic device includes a keyboard unit, a first casing, and a second casing. The keyboard unit is formed into a substantially rectangular shape and includes a first surface and a second surface, the first surface including at least one key disposed thereon, the second surface including a protrusion portion that is protruded therefrom, the protrusion portion having an engagement hole open toward a first direction that corresponds to a longitudinal direction of the rectangle. The first casing includes a third surface on which the keyboard unit is mounted, the third surface having an insertion hole into which the protrusion portion is capable of being inserted, the first casing including an engagement protrusion provided at a position opposed to the engagement hole of the protrusion portion that is inserted into the insertion hole, the engagement protrusion being engaged with the engagement hole of the inserted protrusion portion when the keyboard unit is moved in the first direction. The second casing includes a display portion that faces the keyboard unit when closed with respect to the first casing, the second casing being pivotably attached to the first casing.

In the embodiment, the protrusion portion of the keyboard unit is inserted into the insertion hole of the first casing, and when the keyboard unit is moved in the first direction that corresponds to the longitudinal direction of the rectangular keyboard unit the engagement hole of the inserted protrusion portion is engaged with the engagement protrusion of the casing. With this structure, a predetermined area of the keyboard unit can be fixed to the first casing. On the other hand, to detach the keyboard unit from the first casing, by moving the keyboard unit in a direction opposite to the first direction, the inserted protrusion portion is detached from the engagement protrusion of the first casing. After that, the protrusion portion of the keyboard unit is drawn from the insertion hole of the first casing. Thus, the attachment/detachment operation of the keyboard unit can be easily performed. In addition, because the predetermined area of the keyboard unit can be fixed to the first casing, a relatively high rigidity and desirable keystroke feeling of the keyboard can be obtained.

According to another embodiment, there is provided a keyboard manufacturing method. The keyboard manufacturing method includes preparing a keyboard unit that is substantially a rectangular shape and includes a first surface and a second surface and a casing including a third surface, inserting the protrusion portion into the insertion hole, and engaging the engagement hole with the engagement protrusion by moving the keyboard unit in the first direction. The first surface includes a key disposed thereon, the second surface includes a protrusion portion that is protruded therefrom, the protrusion portion has an engagement hole toward a first direction that corresponds to a longitudinal direction of the rectangle, and the third surface has an insertion hole into which the protrusion portion is capable of being inserted. The casing includes an engagement protrusion provided at a position opposed to the engagement hole of the protrusion portion that is inserted into the insertion hole.

In one embodiment, the protrusion portion of the keyboard unit is inserted into the insertion hole of the casing, and when the keyboard unit is moved in the first direction that corresponds to the longitudinal direction of the rectangular keyboard unit, the engagement hole of the inserted protrusion portion is engaged with the engagement protrusion of the casing. With this structure, a predetermined area of the keyboard unit can be fixed to the casing. On the other hand, to detach the keyboard unit from the casing, by moving the keyboard unit in a direction opposite to the first direction, the inserted protrusion portion is detached from the engagement protrusion of the casing. After that, the protrusion portion of the keyboard unit is drawn from the insertion hole of the casing. Thus, the attachment/detachment operation of the keyboard unit can be relatively easily performed. In addition, because the predetermined area of the keyboard unit can be fixed to the casing, a relatively high rigidity and desirable keystroke feeling of the keyboard can be obtained.

In the step of inserting the protrusion portion into the insertion hole, a guide member may be inserted into a guide groove provided at a position corresponding to the guide member in the casing, the guide member having an L shape that protrudes outward from the keyboard unit, the guide member being provided in a third area located along a first side of two long sides of the rectangle of the keyboard unit. In the step of engaging the engagement hole with the engagement protrusion, the guide member may be guided in the first direction while engaging the guide member with a guide rail provided along an outer side of the guide groove.

With this structure, the L-shaped guide member is inserted into the guide groove, and thus the protrusion portion can be inserted into the insertion hole. The guide member is guided in the first direction while engaging the guide member with the guide rail, and thus the engagement hole can be engaged with the engagement protrusion.

According to another embodiment, there is provided an electronic device manufacturing method. The electronic device manufacturing method includes preparing a keyboard unit, a first casing, and a second casing, the keyboard unit being a rectangle and including a first surface and a second surface, the first casing including a third surface, inserting the protrusion portion into the insertion hole, and engaging the engagement hole with the engagement protrusion by moving the keyboard unit in the first direction. The first surface includes a key disposed thereon, and the second surface includes a protrusion portion that is protruded therefrom. The protrusion portion has an engagement hole open toward a first direction that corresponds to a longitudinal direction of the rectangle. The third surface has an insertion hole into which the protrusion portion is configured to be inserted. The first casing includes an engagement protrusion provided at a position opposed to the engagement hole of the protrusion portion that is inserted into the insertion hole. The second casing includes a display portion that faces the keyboard unit when closed with respect to the first casing. The second casing is pivotably attached to the first casing.

In one embodiment, the protrusion portion of the keyboard unit is inserted into the insertion hole of the first casing, and when the keyboard unit is moved in the first direction that corresponds to the longitudinal direction of the rectangular keyboard unit, the engagement hole of the inserted protrusion portion is engaged with the engagement protrusion of the first casing. With this structure, a predetermined area of the keyboard unit can be fixed to the first casing. On the other hand, to detach the keyboard unit from the first casing, by moving the keyboard unit in a direction opposite to the first direction, the inserted protrusion portion is detached from the engagement protrusion of the first casing. After that, the protrusion portion of the keyboard unit is drawn from the insertion hole of the first casing. Thus, the attachment/detachment operation of the keyboard unit can be easily performed. In addition, because the predetermined area of the keyboard unit can be fixed to the first casing, the high rigidity and desirable keystroke feeling of the keyboard can be obtained.

In the step of inserting the protrusion portion into the insertion hole, a guide member may be inserted into a guide groove provided at a position corresponding to the guide member in the casing, the guide member having an L shape that protrudes outward from the keyboard unit, the guide member being provided in a third area located along a first side of two long sides of the rectangle of the keyboard unit. In the step of engaging the engagement hole with the engagement protrusion, the guide member may be guided in the first direction while engaging the guide member with a guide rail provided along an outer side of the guide groove.

With this structure, the L-shaped guide member is inserted into the guide groove, and thus the protrusion portion can be inserted to the insertion hole. The guide member is guided in the first direction while engaging the guide member with the guide rail, and thus the engagement hole can be guided to the engagement protrusion.

According to another embodiment, there is provided a keyboard component including a main body, a key, and a protrusion portion. The main body is a rectangle and includes a first surface and a second surface. The key is provided on the first surface. The protrusion portion protrudes from the second surface and has an engagement hole open toward a first direction that corresponds to a longitudinal direction of the rectangle.

In the embodiment, for example, when the protrusion portion of the keyboard unit is inserted into the insertion hole of the casing and the keyboard unit is moved in the first direction that corresponds to the longitudinal direction of the rectangular keyboard unit, the engagement hole of the inserted protrusion portion is engaged with the engagement protrusion of the engagement hole. With this structure, a predetermined area of the keyboard unit can be fixed to the casing. On the other hand, to detach the keyboard unit from the casing, by moving the keyboard unit in a direction opposite to the first direction, the inserted protrusion portion is detached from the engagement protrusion of the casing. After that, the protrusion portion of the keyboard unit is drawn from the insertion hole of the casing. Thus, the attachment/detachment operation of the keyboard unit can be relatively easily performed. In addition, because the predetermined area of the keyboard unit can be fixed to the casing, a relatively high rigidity and desirable keystroke feeling of the keyboard can be obtained.

As described above, according to this embodiment, a relatively high rigidity and desirable keystroke feeling of the keyboard can be obtained, and the attachment/detachment operation of the keyboard unit can be facilitated.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 40A and 40B are a bottom view and a side view of the keyboard unit, respectively;

DESCRIPTION OF THE PREFERRED EMBODIMENTS

Preferred embodiments for implementing the present invention will be described below with reference to the appended drawings. With the non-limiting embodiments described below, an electronic device according to the present invention is applied to a personal computer serving as an information processing device.

With the following description, in a state in which a user visually recognizes the display screen of the personal computer, the front-and-rear, vertical, and horizontal directions are shown as viewed from the user. Accordingly, the user side is assumed to be the front. Note that the front-and-rear, vertical, and horizontal directions shown below are for the sake of convenience of description, and implementation of the present invention is not restricted to those directions.

Figure 1:
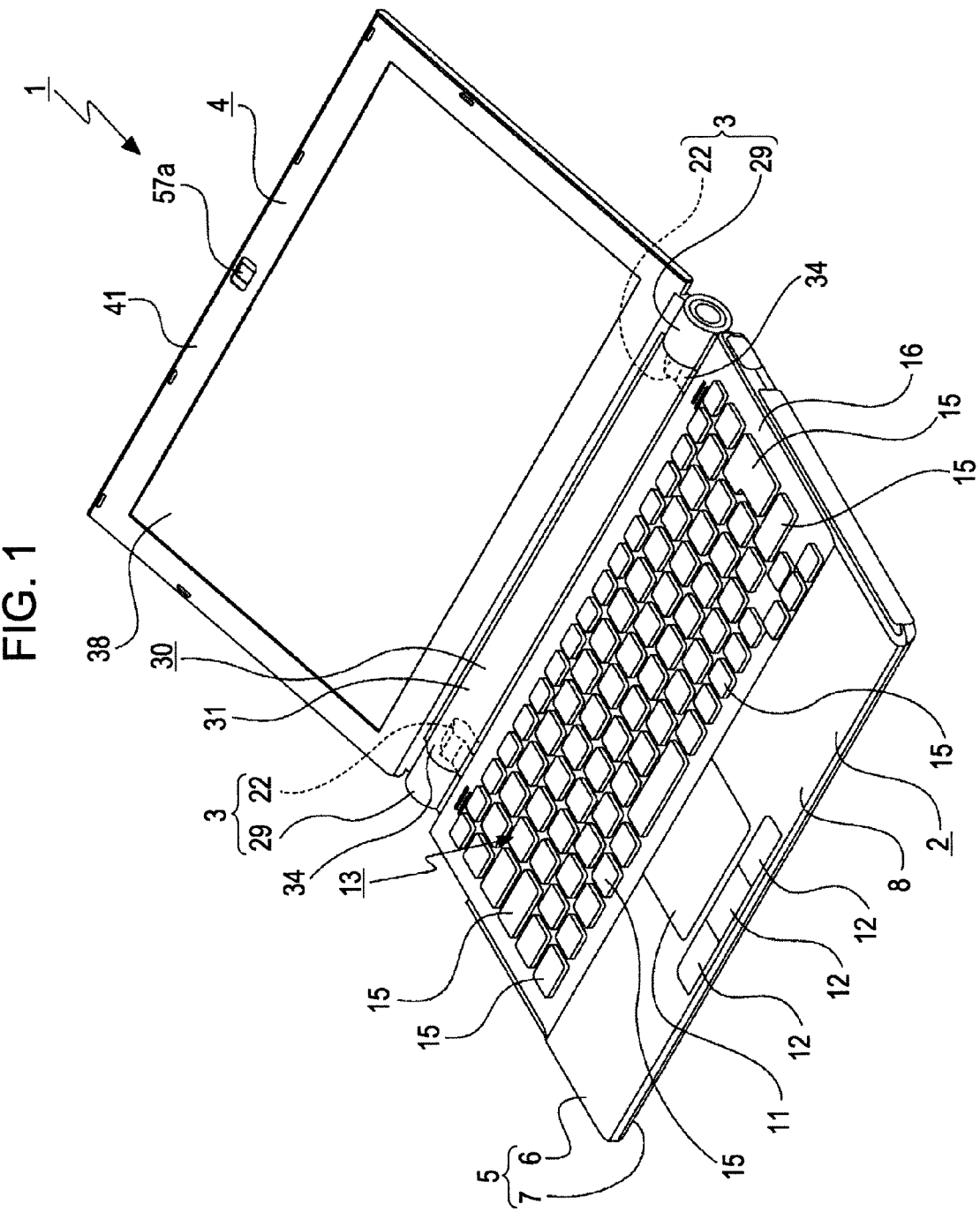
FIG. 1 illustrates a preferred embodiment of the present invention along with FIG. 2 through FIG. 35, and is a perspective view of an electronic device illustrating a state in which a display portion is opened.
Figure 2:
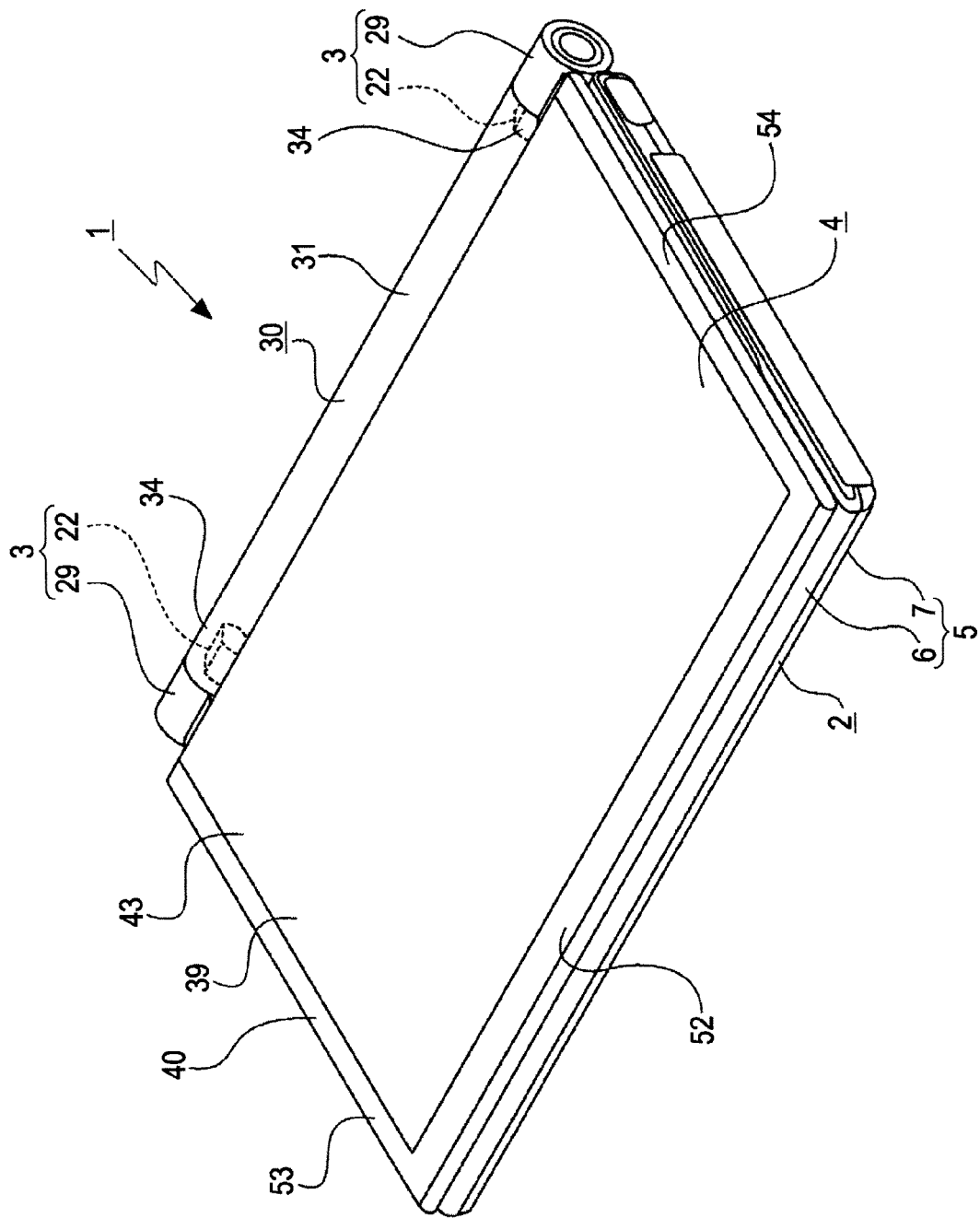
FIG. 2 is a perspective view of an electronic device illustrating a state in which the display portion is closed.

An electronic device, in this example, a personal computer 1 includes a display portion 4 supported with the rear edge portion of a device main frame portion 2 via hinge portions 3 so as to be rotationally movable (see FIGS. 1 and 2).

The device main frame portion 2 includes an unshown control circuit board (mother board) within a casing 5, and the casing 5 includes an upper case 6 and a lower case 7 connected vertically.

Figure 3:
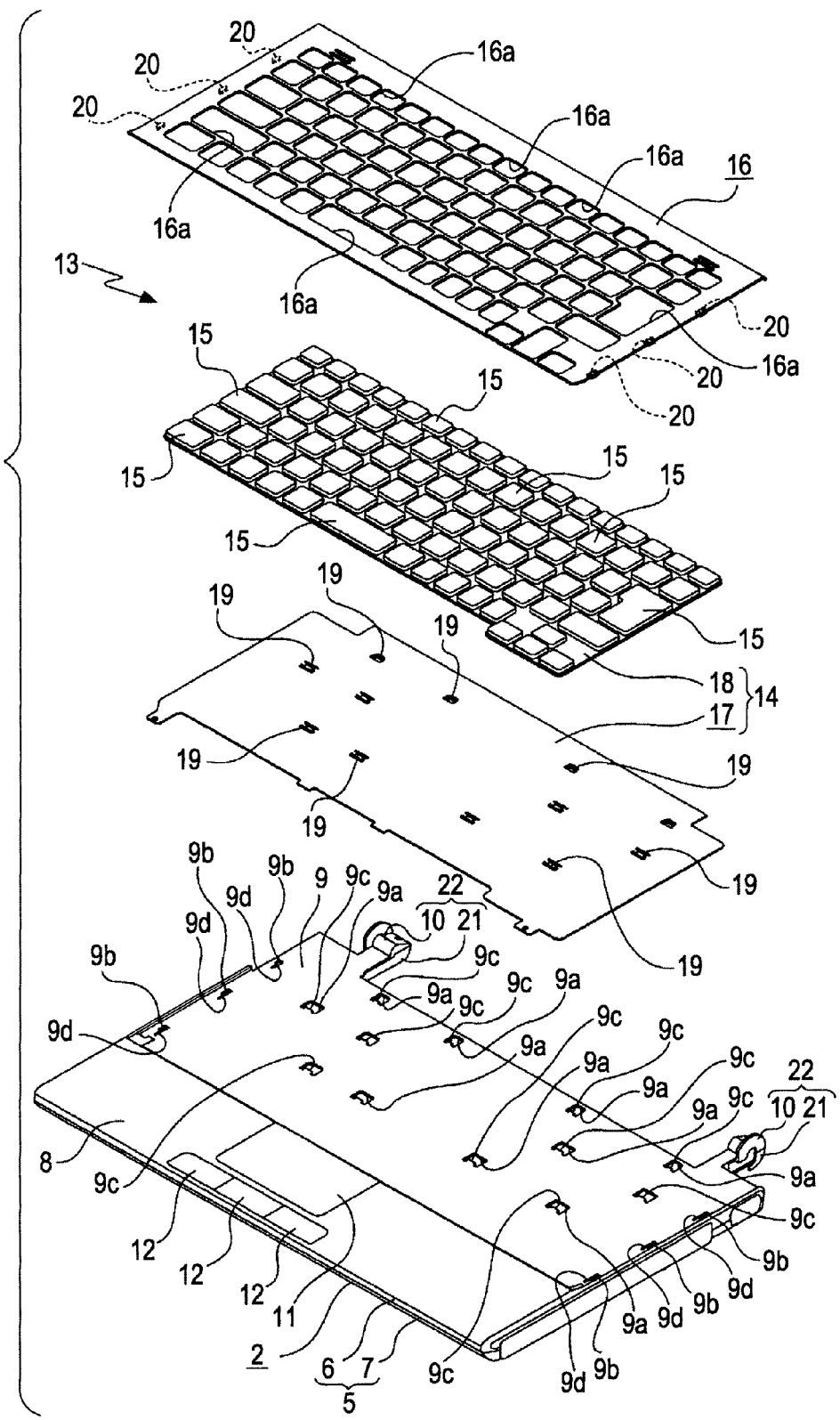
FIG. 3 is an exploded perspective view illustrating a keyboard and the upper case of a casing.

As shown in FIG. 3, the upper case 6 includes a palm rest portion 8 disposed on a front side, and a key array portion 9 consecutively disposed on a rear side of the palm rest portion 8. Protrusions for hinges 10 protruding backward are isolated and provided on either side of the rear edge of the key array portion 9 in the depicted example.

The palm rest portion 8 is formed in an approximate plate shape of a horizontally long rectangle, and at the approximate central portion of the palm rest portion 8, a pointing device 11 and click buttons 12 are disposed in the depicted example. The pointing device 11 is a touch-sensor type operating portion, and as for the click buttons 12, a left button, a middle button, and a right button are typically provided.

The key array portion 9 is typically formed in a shallow recessed shape. With the key array portion 9, multiple through holes 9a are formed at portions other than both side portions, and isolated insertion holes 9b are formed in the forward and backward directions on both side portions. At the opening edge portions of the through holes 9a of the key array portion 9, for example, tongue-shaped connection retaining portions 9c protruding backward are provided. At the opening edge portions of the through holes 9b of the key array portion 9, for example, tongue-shaped connection retaining portions 9d protruding backward are provided, respectively.

A keyboard 13 is disposed on and connected to the key array portion 9. The keyboard 13 includes a placement base 14, multiple operating keys 15 disposed on the placement base 14, and a keyboard cover 16 fixed to the placement base 14.

The placement base 14 includes a backing plate 17, an unshown circuit board formed on the backing plate 17, and a protective sheet 18 covering the circuit board from above.

Figure 4:
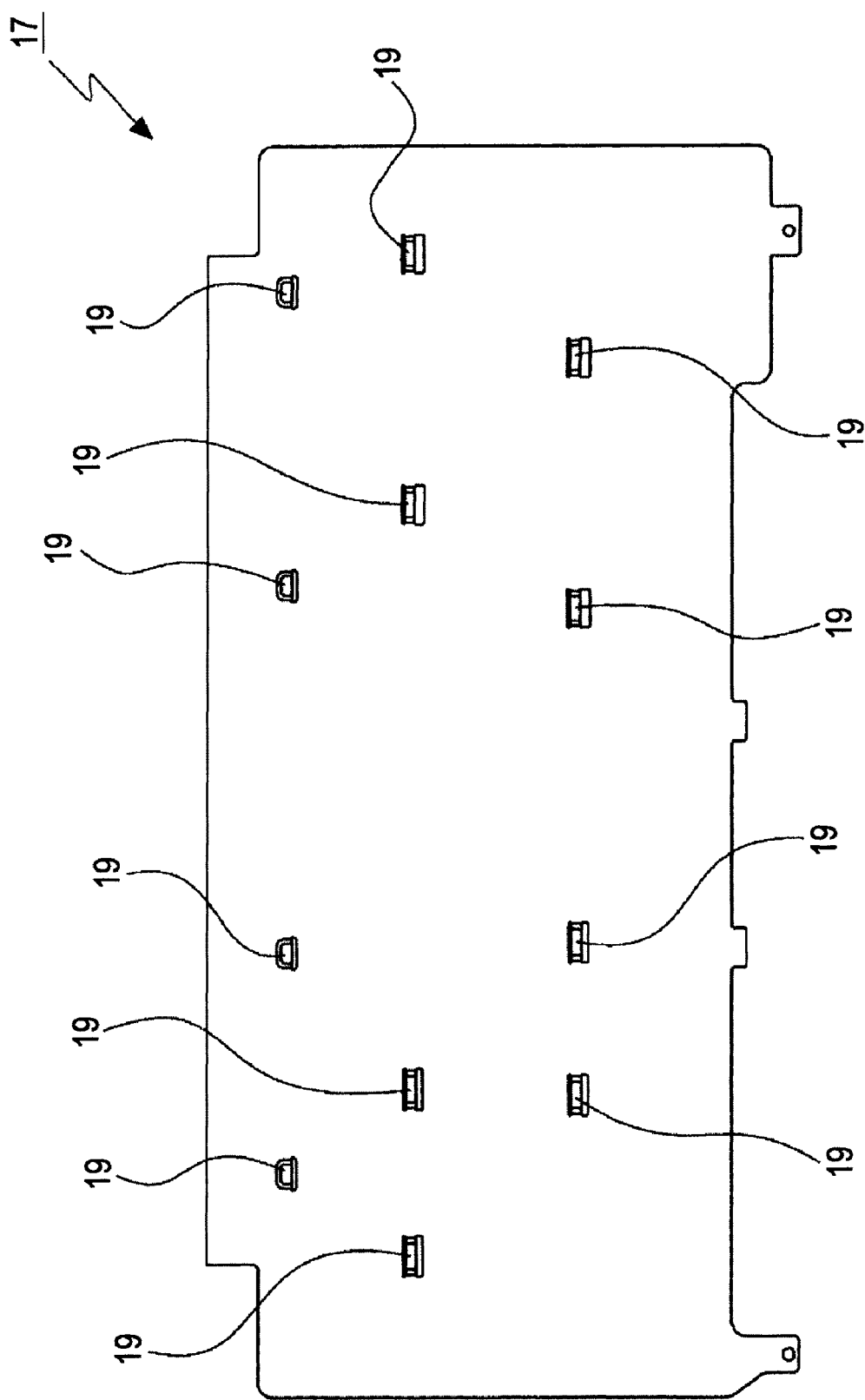
FIG. 4 is a bottom view of a backing plate.
Figure 5:
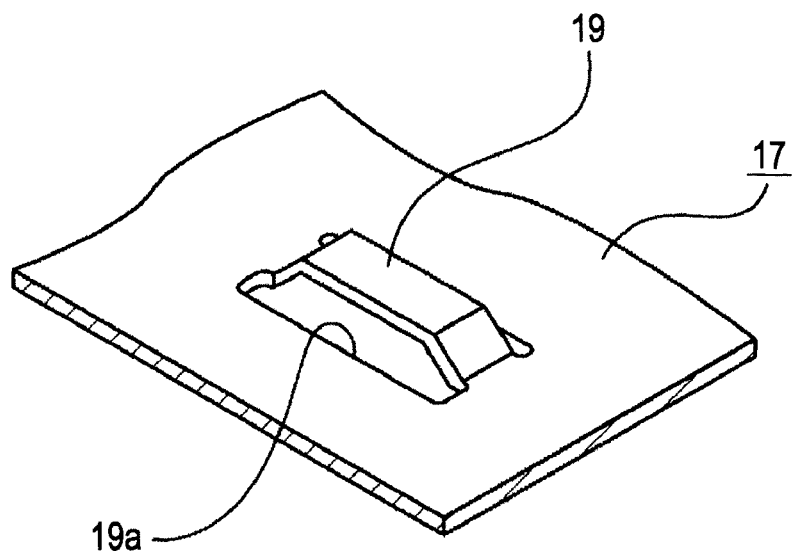
FIG. 5 is an enlarged perspective view illustrating a retaining portion provided on the backing plate.
Figure 6:
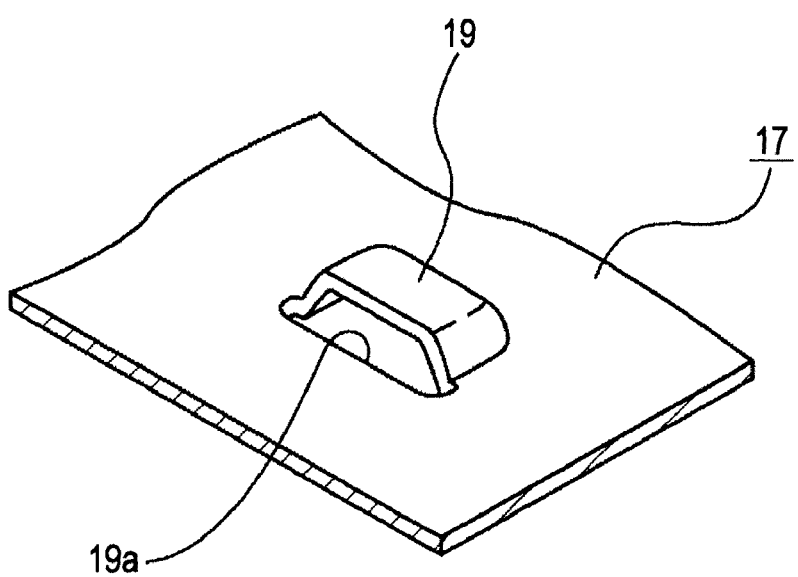
FIG. 6 is an enlarged perspective view illustrating another shape of the retaining portion provided on the backing plate.

The backing plate 17 includes, for example, a metal material such as aluminum or the like. At the underside of the backing plate 17, multiple retaining portions 19, protruding downward, are provided (see FIG. 4). The retaining portions 19 are formed by each part of the backing plate 17 being punched out downward. In an example shown in FIGS. 5 and 6, the retaining portions 19, are formed in an arch shape or sack-like shape, and have opening portions 19a which typically open in the forward direction, respectively.

The operating keys 15 are each movable vertically relative to the placement base 14. Movement is permitted by an unshown ascending/descending mechanism provided on the placement base 14. When the operating key 15 pressed downward, an operating signal corresponding to the operation thereof is generated by the circuit board formed on the backing plate 17.

Figure 7:
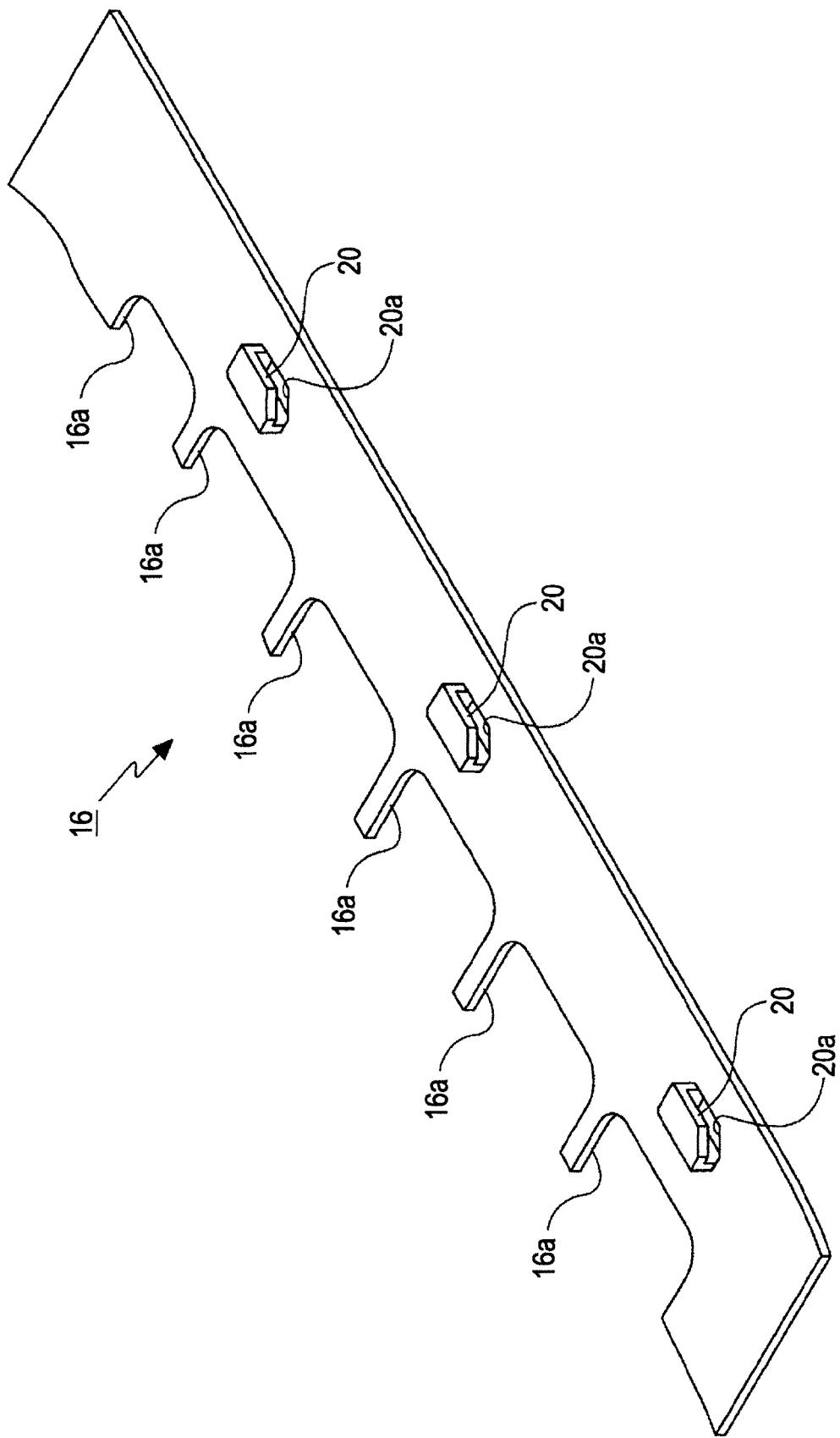
FIG. 7 is a perspective view of a keyboard cover.

The outer shape of the keyboard cover 16 is typically somewhat larger than the outer shape of the placement base 14 (see FIG. 3). Holes 16a each corresponding to the operating keys 15, are formed in the keyboard cover 16. At each of both side portions of the keyboard cover 16, as shown in FIG. 7, retaining portions 20 are provided, and at the retaining portions 20, opening portions 20a, which are opened forward and sideward, are formed, respectively.

The keyboard cover 16 is typically fixed to the placement base 14, for example, with welding. In a state in which the keyboard cover 16 is fixed to the placement base 14, operating keys 15 protrude upward from the holes 16a and the outer circumferential portion of the keyboard cover 16 is positioned outside of the placement base 14. Accordingly, the retaining portions 20 are positioned outside of the placement base 14.

The keyboard 13 is connected to the upper case 6 of the casing 5 as follows (see FIG. 8 through FIG. 11).

Figure 8:
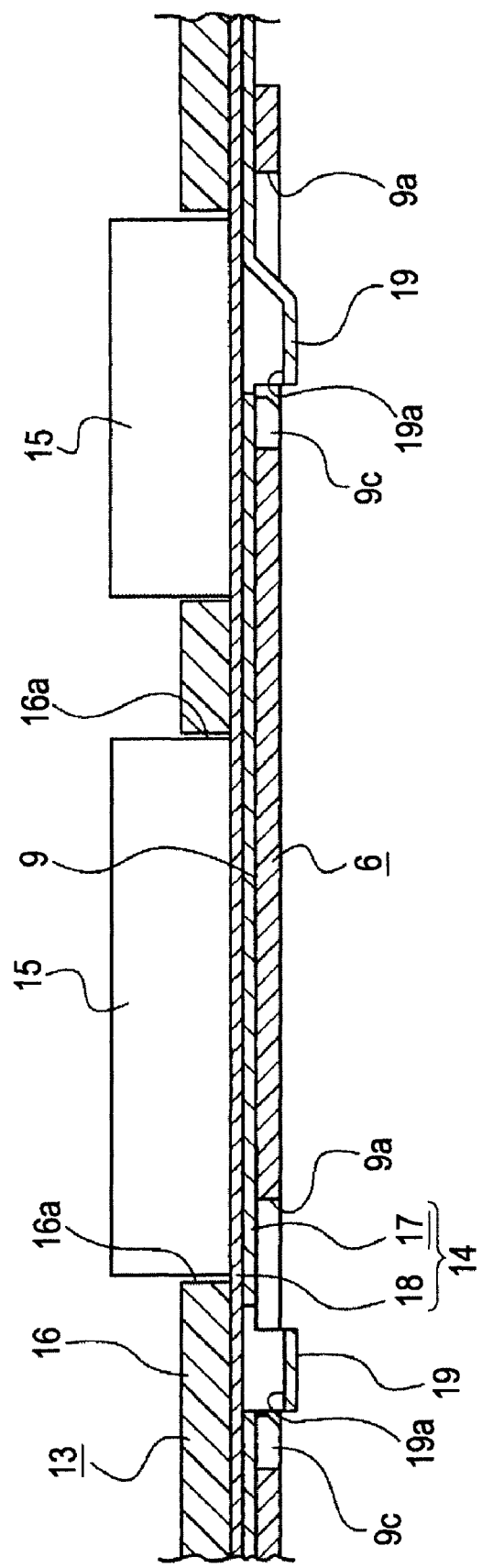
FIG. 8 illustrates connection procedures between the keyboard and the upper case along with FIGS. 9 through 11, and the present diagram is a schematic enlarged cross-sectional view illustrating a state in which the keyboard is overlapped on a key array portion of the upper case, and the retaining portions protrude from through holes.
Figure 9:
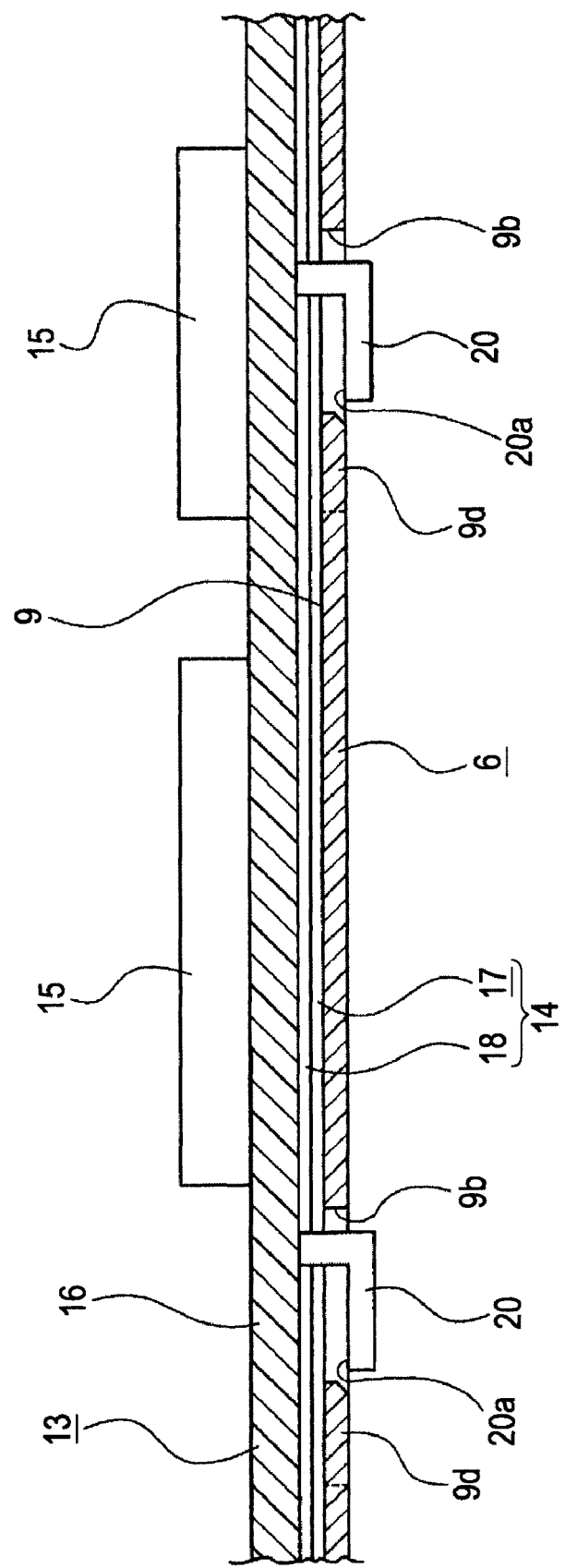
FIG. 9 is a schematic enlarged cross-sectional view illustrating a state in which the keyboard is overlapped on the key array portion of the upper case, and the retaining portions of the backing plate protrude from insertion holes.

First, the keyboard 13 is positioned to overlap the key array portion 9 of the upper case 6, and as shown in FIGS. 8 and 9, the retaining portions 19 of the placement base 14 protrude downward from the through holes 9a of the key array portion 9 respectively. The retaining portions 20 of the keyboard cover 16 protrude downward from the insertion holes 9b of the key array portion 9 respectively.

Figure 10:
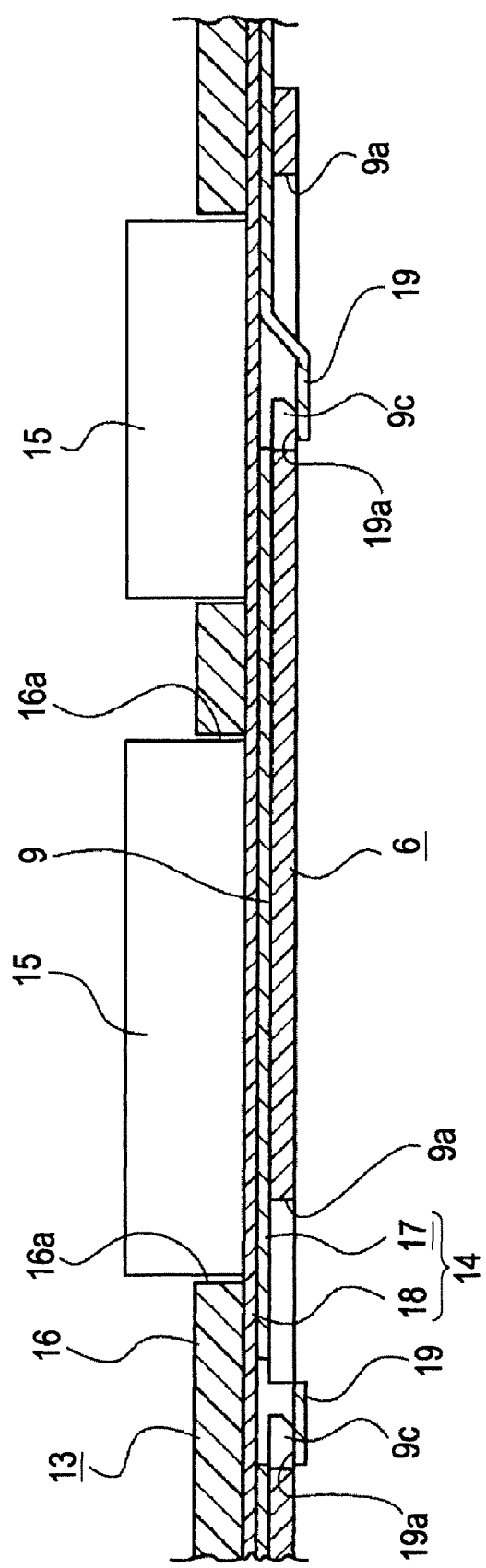
FIG. 10 is an enlarged cross-sectional view illustrating a state in which the keyboard slides relative to the upper case, and the retaining portions of the keyboard cover are retained with connection retaining portions.
Figure 11:
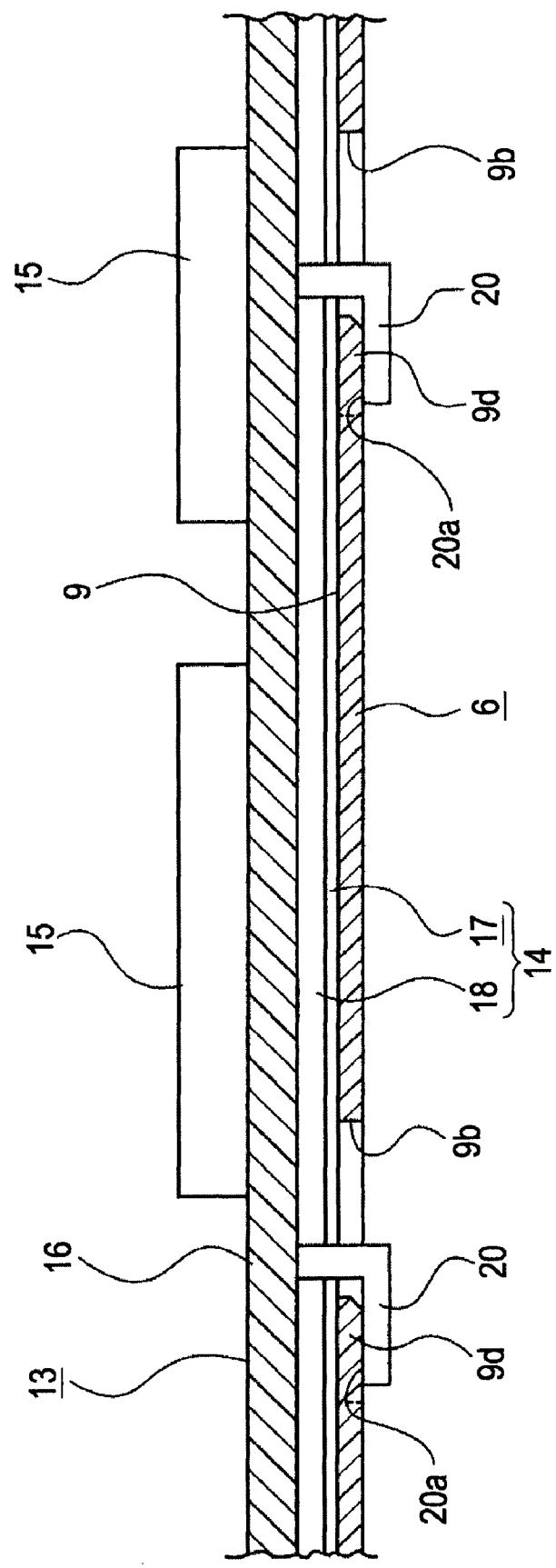
FIG. 11 is an enlarged cross-sectional view illustrating a state in which the keyboard slides relative to the upper case, and the retaining portions provided at both side edge portions are retained with connection retaining portions.

Next, upon making the keyboard 13 slide forward relative to the upper case 6, as shown in FIGS. 10 and 11, the connection retaining portions 9c are inserted in the opening portions 19a of the retaining portions 19, respectively, and the retaining portions 19 are retained with the connection retaining portions 9c respectively. The connection retaining portions 9d are inserted in the opening portions 20a of the retaining portions 20 respectively. The retaining portions 20 are retained with the connection retaining portions 9d respectively, and thus, the keyboard 13 is connected to the upper case 6.

As described above, with the electronic device 1, the retaining portions 19 and 20, provided on the outer circumferential portions and the portions other than the outer circumferential portions of the keyboard 13 are retained, and the keyboard 13 is connected to the casing 5, whereby a strong connection state between the keyboard 13 and casing 5 can be provided, and an excellent operating feeling when pressing the operating keys 15 can be achieved without providing a state in which the keyboard 13 floats above the upper case 6.

Also, connection between the keyboard 13 and casing 5 is typically carried out only by retaining the retaining portions 19 and 20 with the connection retaining portions 9c and 9d, so the keyboard 13 is typically not connected to the casing 5 using screw clamps. Thus, disassembly of the keyboard 13 from the casing 5 can readily be performed, and improvement in maintenance can be achieved.

Further, connection of the keyboard 13 to the casing 5 can be performed by overlapping the keyboard 13 on the key array portion 9 and making the keyboard 13 slide, whereby connection of the keyboard 13 to the casing 5 can readily be performed. Accordingly improvement in workability in the assembling work of the electronic device 1 can be achieved.

Additionally, with the keyboard 13, the keyboard cover 16 fixed to the placement base 14 is provided, whereby the rigidity of the keyboard 13 and device main frame portion 2 can be enhanced.

Figure 12:
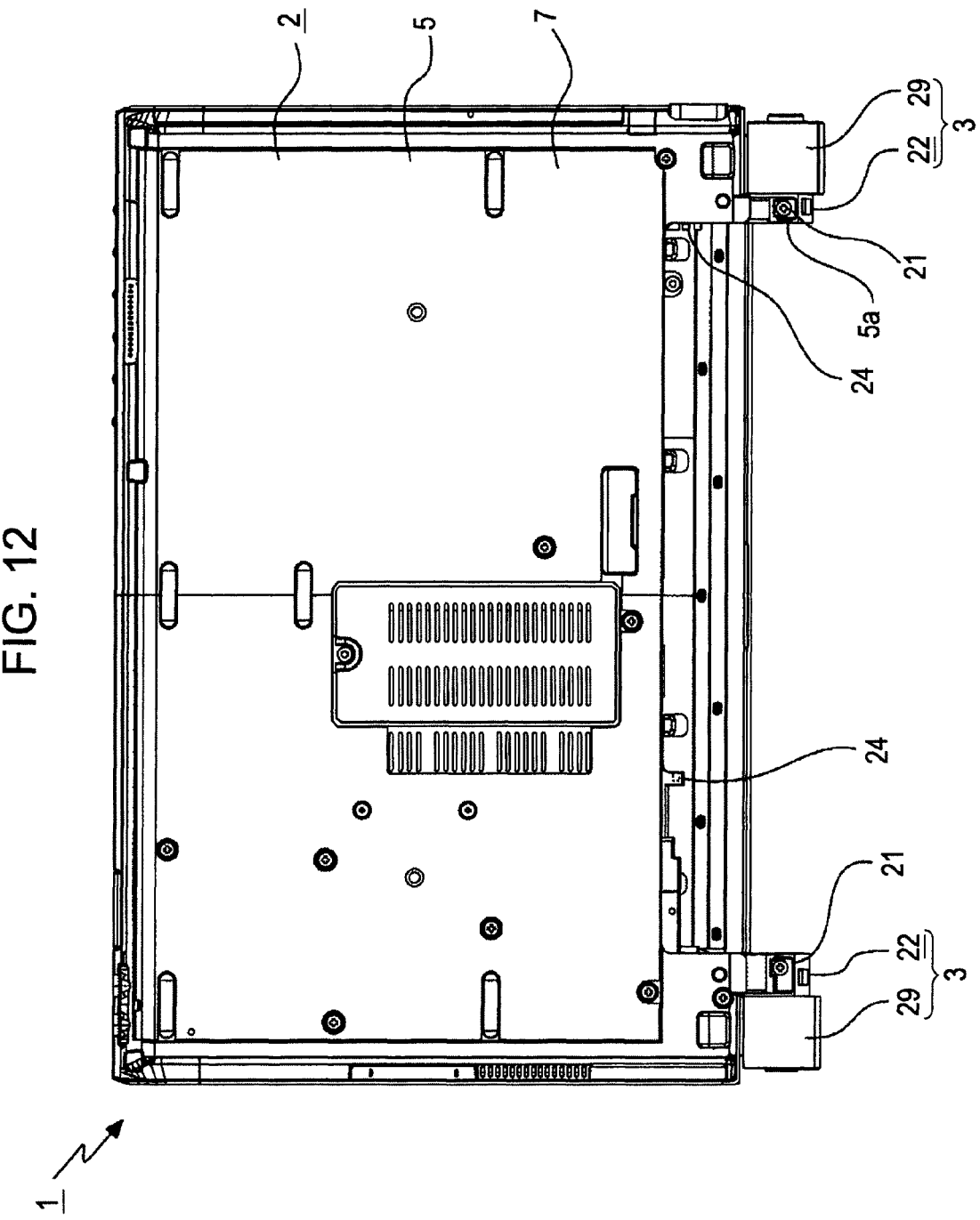
FIG. 12 is a bottom view of the electronic device illustrating a state in which the display portion is closed.
Figure 13:
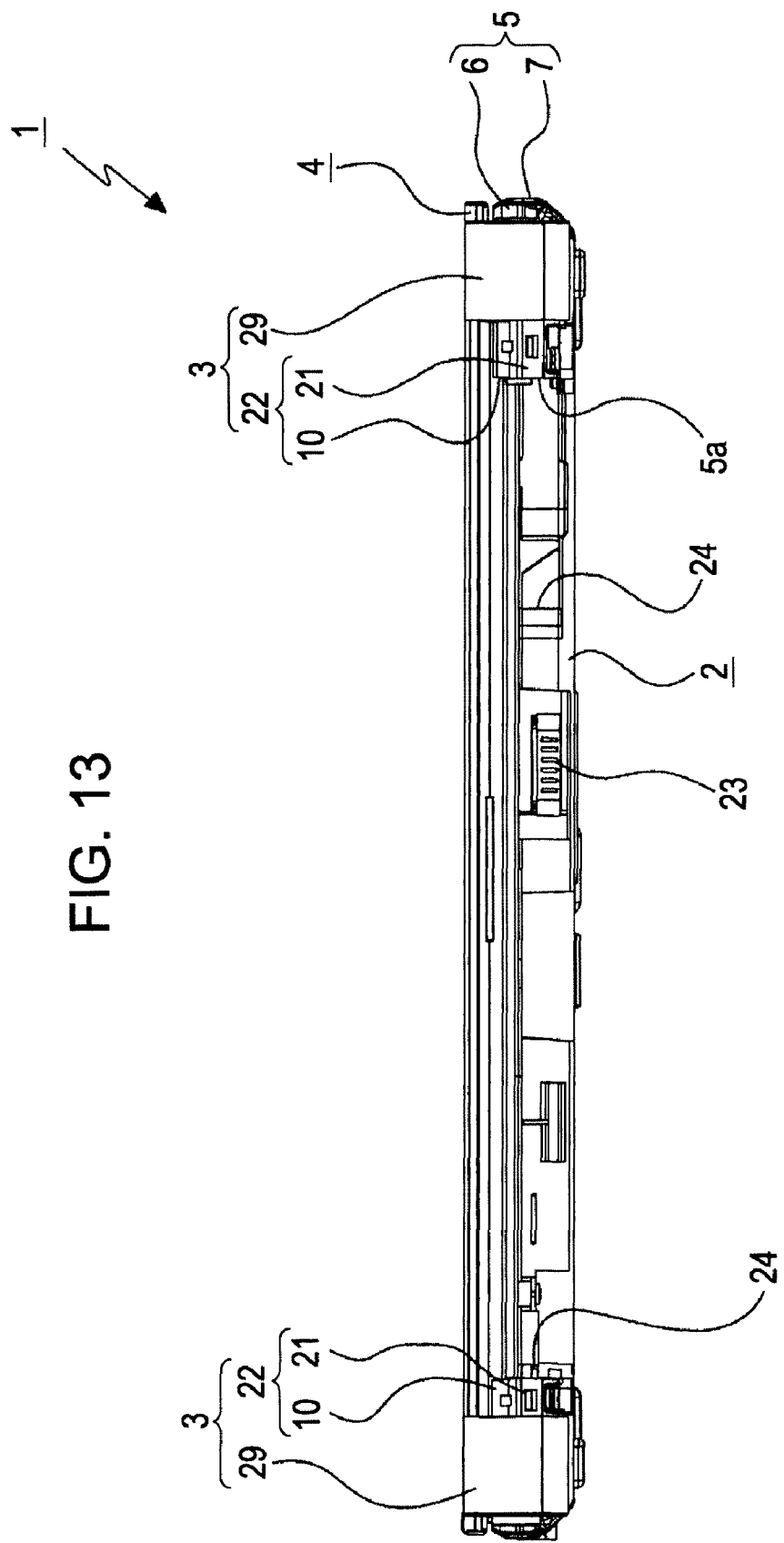
FIG. 13 is a rear view of the electronic device illustrating a state in which the display portion is closed.

In the lower case 7 of the casing 5, protrusions for hinges 21 and 21 protruding backward from the rear face are isolated and provided on either side (see FIGS. 12 and 13). The lower case 7 is attached to the upper case 6, and the protrusions for hinges 10 of the upper case 6 and the protrusions for hinges 21 of the lower case 7 are connected vertically, thereby providing supporting protrusions 22.

A recessed portion for battery placement 5a which is opened backward and downward is formed at the rear face of the casing 5. A connector 23 is provided at the recessed portion for battery placement 5a (see FIG. 13). Both side faces of the recessed portion for battery placement 5a of the casing 5 are provided with attachment pieces 24 respectively (see FIGS. 12 and 13).

Figure 14:
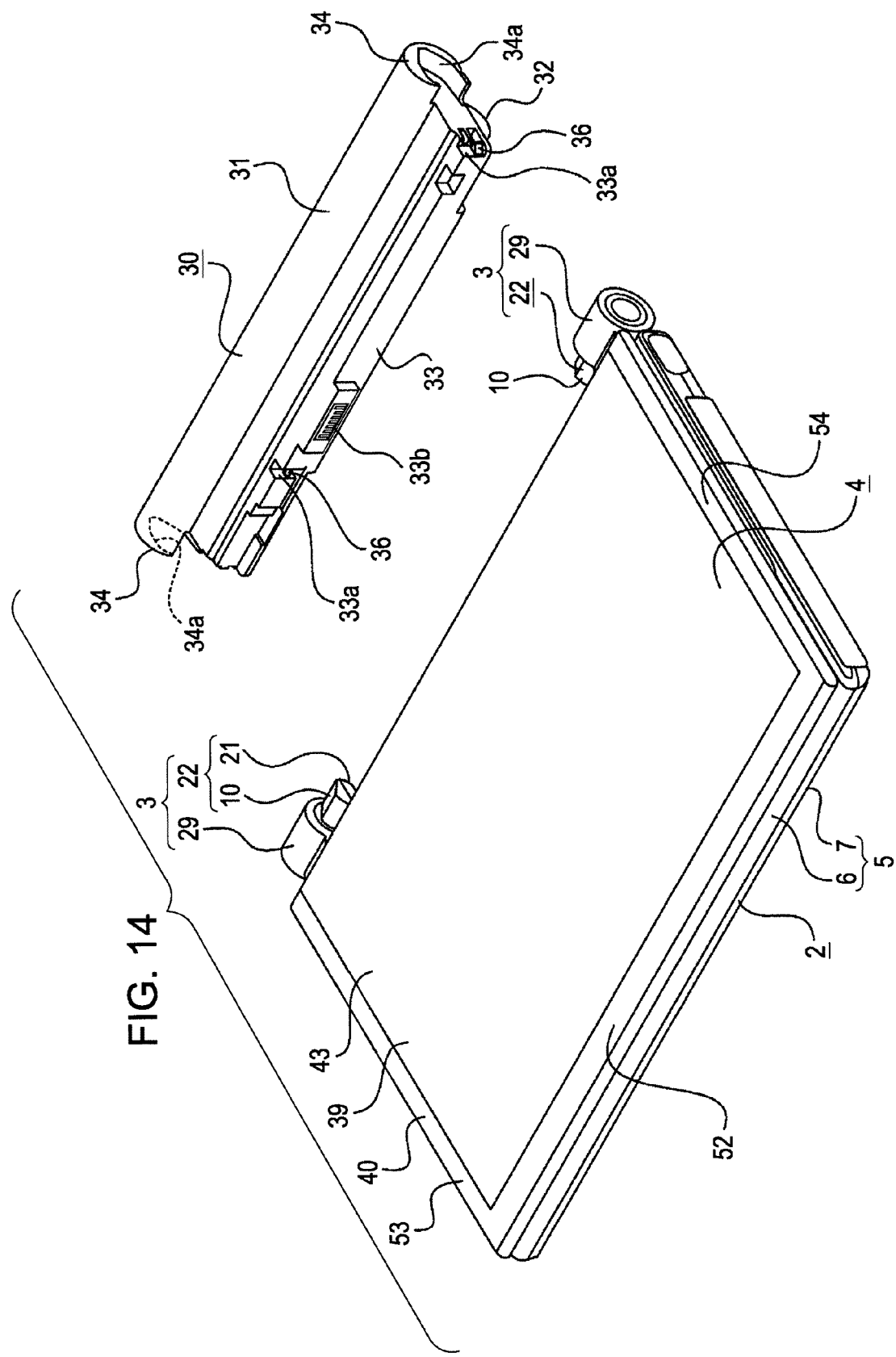
FIG. 14 is a perspective view illustrating a state in which a battery is detached form the device main frame portion.
Figure 15:
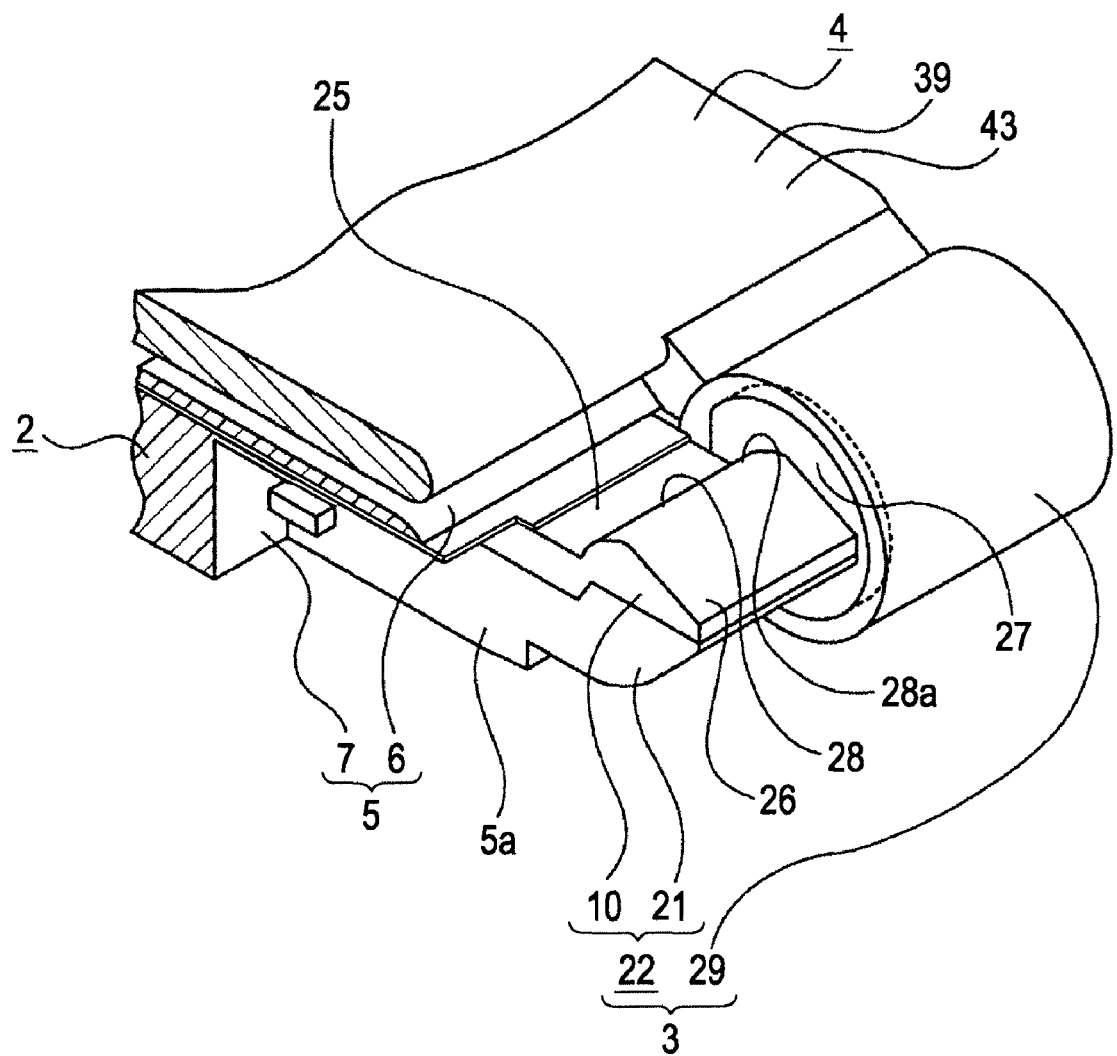
FIG. 15 is an enlarged perspective view of a supporting protrusion.

The supporting protrusions 22 are typically disposed on both sides of the recessed portion for battery placement 5a, respectively (see FIGS. 12 through 14). The supporting protrusion 22 includes, as shown in FIG. 15, a base portion 25 protruding backward, an insertion portion 26 disposed consecutively at the rear edge of the base portion 25, and a flange-shaped projecting portion 27 provided at the side face of the outer side of the insertion portion 26.

The insertion portion 26 is formed such that the vertical width becomes small as the position thereof advances backward, and an upper edge portion 28 is positioned above the upper face of the base portion 25, and the upper face 28a of the upper portion 28 is formed in an approximate arc shape protruding upward.

Supported protrusions 29 protrude from both side edge portions of the lower edge portion of the display portion 4, which is supported at the device main frame portion 2 so as to be rotationally movable (see FIGS. 1, 2, and 12). The supported protrusions 29 are supported by the supporting protrusions 22 so as to be rotationally movable, respectively. In a state in which the supported protrusions 29 are supported by the supporting protrusions 22, the projecting portions 27 of the supporting protrusions 22 are closed from the outer side of the casing 5 by the supported protrusions 29 (see FIGS. 12 through 14).

Hinge portions 3 are comprised of the supporting protrusions 22 and the supported protrusions 29 (see FIGS. 1 and 2). The display portion 4 is supported at the device main frame portion 2 via the hinge portions 3 so as to be rotationally movable.

A battery 30 is attached to the device main frame portion 2, and a part of the battery 30 is disposed between the hinge portions 3 (see FIGS. 2 and 14).

Figure 16:
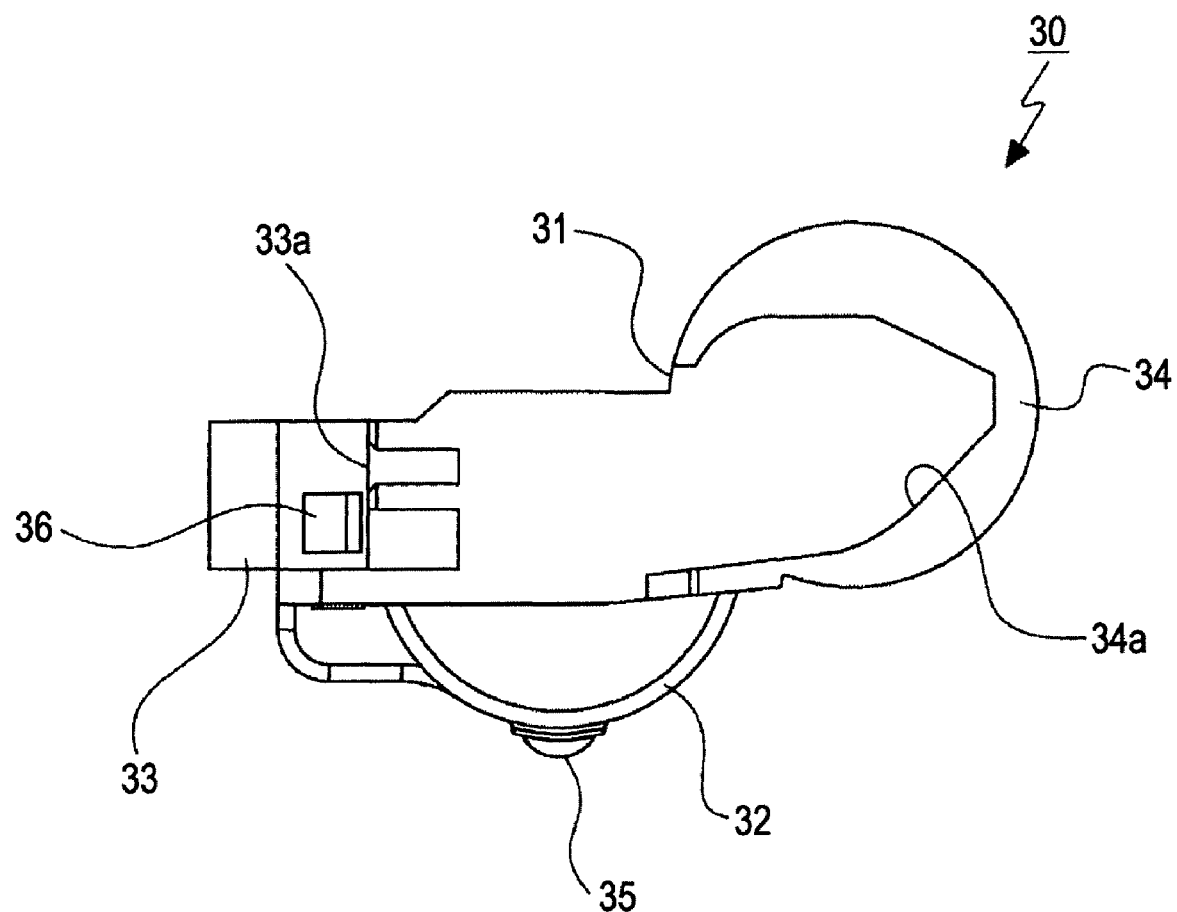
FIG. 16 is an enlarged side view of the battery.

The battery 30 includes, as shown in FIGS. 14 and 16, a horizontally long first cell placement portion 31 of which the cross-sectional shape is typically formed in an approximate cylindrical shape, a second cell placement portion 32 of which a lower side half of the cross-sectional shape is typically formed in an approximate semi-cylindrical shape, and a board placement portion 33 where an unshown control circuit board for charging the battery is disposed. The second cell placement portion 32 is provided consecutively at the front side of the first cell placement portion 31, and a lower side half thereof is disposed below the first cell placement portion 31. The board placement portion 33 is provided consecutively at the front side of the second cell placement portion 32.

The first cell placement portion 31 and second cell placement portion 32 generally have the same length in the horizontal direction, and each typically stores three unshown charging batteries (cells) therein.

Cover portions 34 are each provided integrally with both side edge portions of the first cell placement portion 31. With the cover portion 34, the outer face is formed in an arc shape which continues to the first cell placement portion 31, and the inner side includes an insertion groove 34a which opens forward. The insertion groove 34a is formed in the same shape as the shape of the insertion portion 25 of the supporting protrusion 22.

The outer diameter of the cover portions 34 is formed in the same size as the outer diameter of the supported protrusions 29 protruding backward from the display portion 4.

At the underside of the second cell placement portion 32, receiving protrusions 35, typically made up of a flexible material, such as rubber or the like, are isolated and provided on either side.

Figure 17:
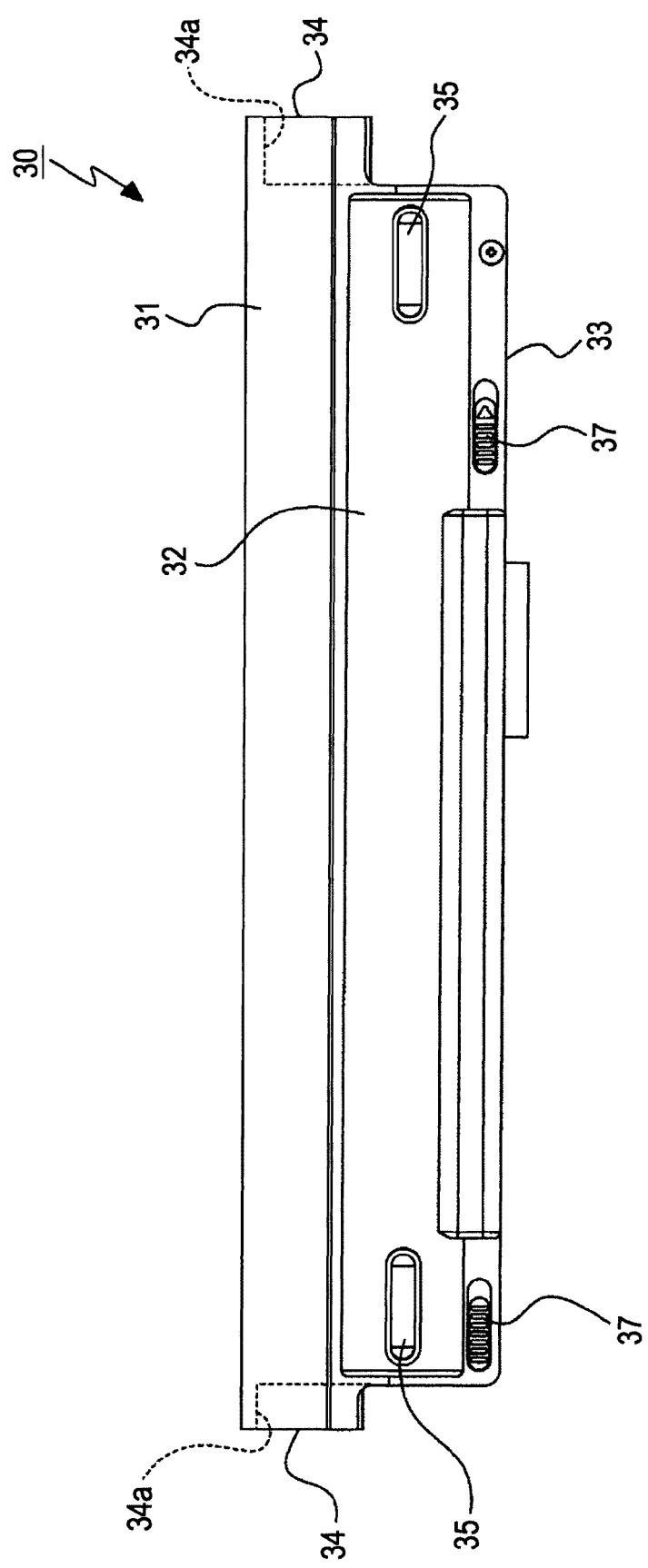
FIG. 17 is a bottom view of the battery.

At the front edge portion of the board placement portion 33, notched portions 33a, which are isolated on either side and opened at least forward, are formed, and the notched portions 33a are disposed with engagement pawls 36 respectively. At the underside of the board placement portion 33, release levers 37 are isolated on either side and provided so as to slide (see FIG. 17). The release levers 37 are made to slide in one direction, whereby the engagement pawls 36 (see FIG. 18) disposed at the notched portions 33a are drawn toward the inner portion of the board placement portion 33. The engagement pawls 36 are pressed in the direction drawn in the notched portions 33a by unshown spring members.

At the board placement portion 33, a connector portion 33b protruding forward is provided (see FIG. 14).

Description will be made below regarding procedures for attaching the battery 30 to the device main frame portion 2 (see FIGS. 18 through 23).

Figure 18:
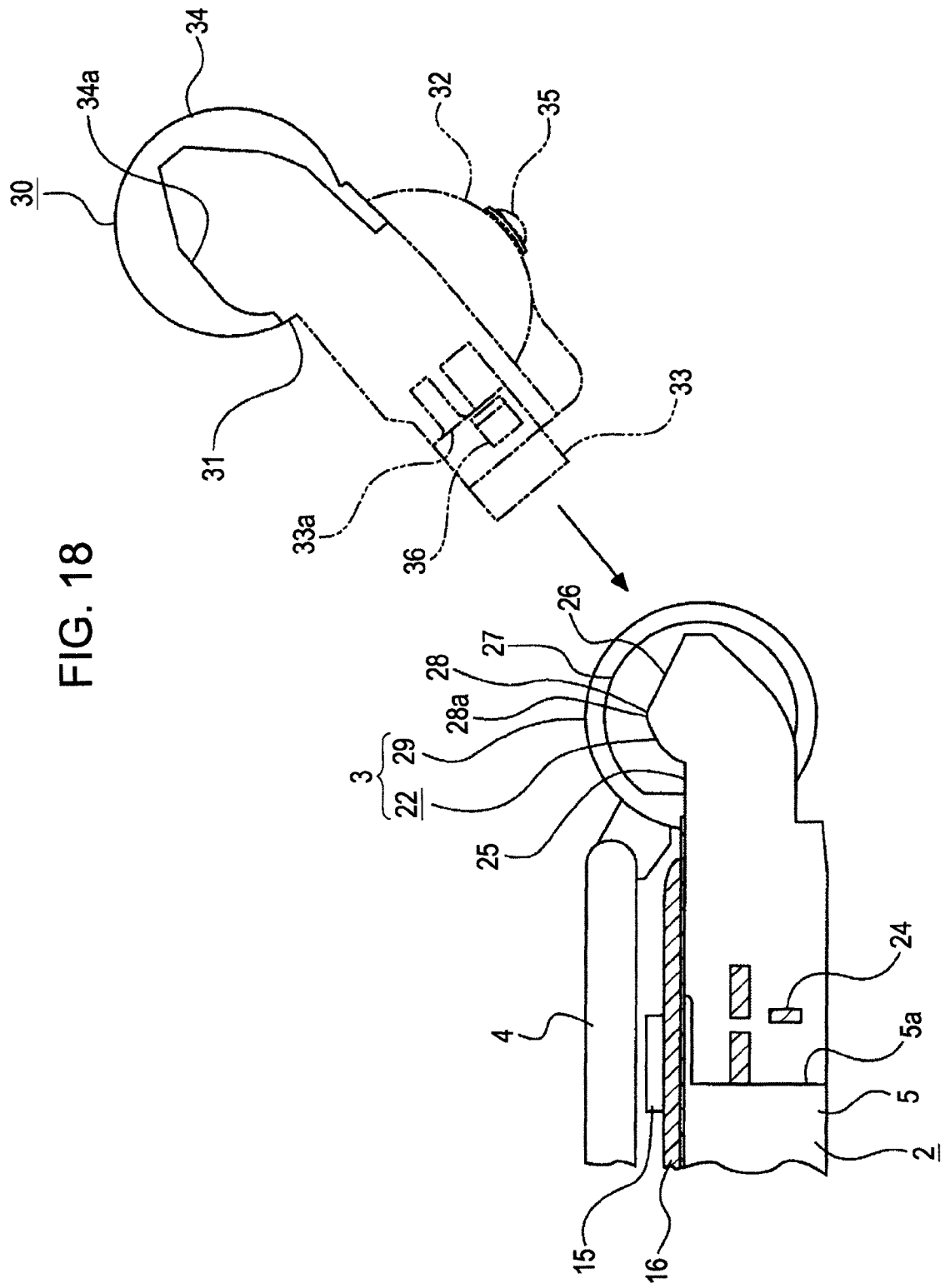
FIG. 18 illustrates connection procedures between the battery and the device main frame portion along with FIGS. 19 through 25, and the present diagram is a schematic enlarged cross-sectional view illustrating a state in which the cover portion is inclined obliquely.

First, the battery 30 is inclined such that the opening direction of the cover portions 34 is directed toward a front downward slanting portion (see FIG. 18).

Figure 19:
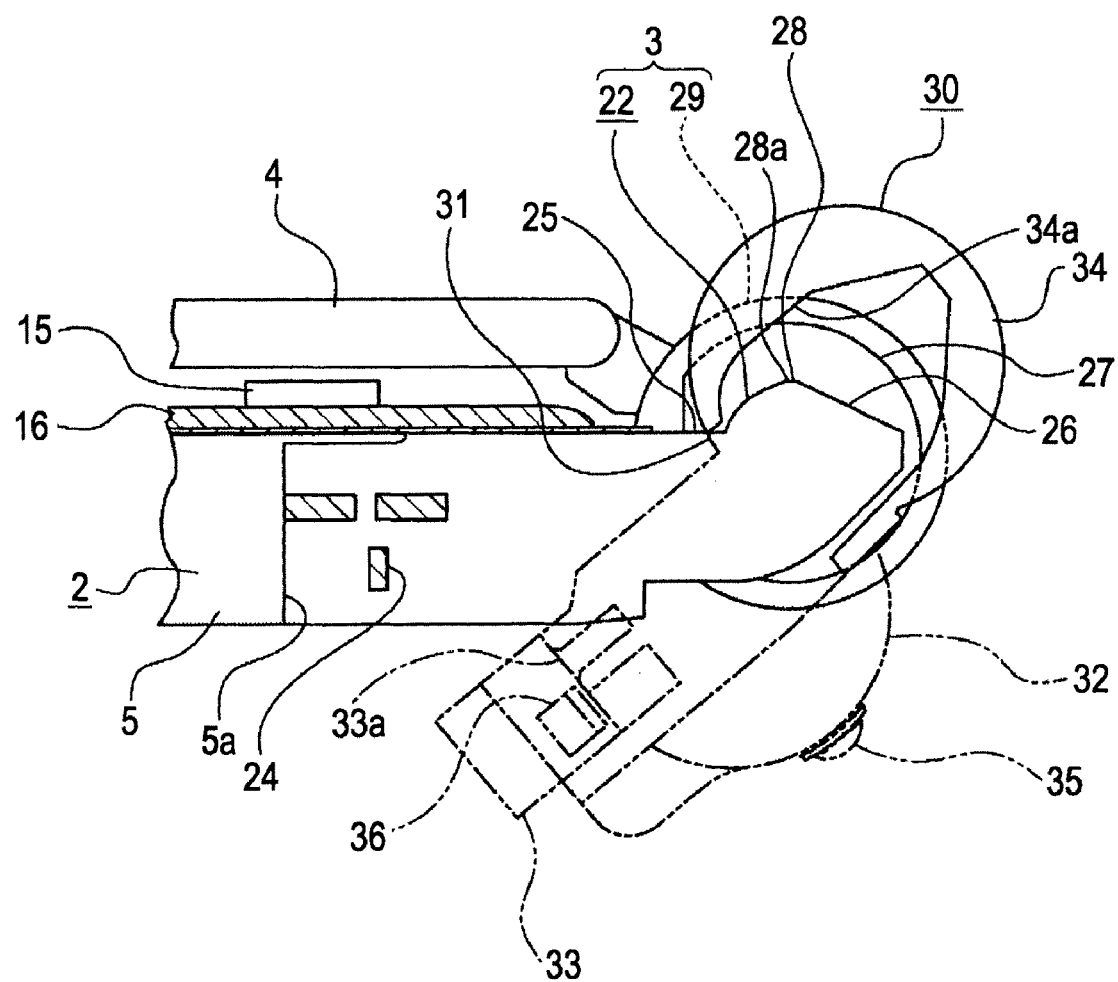
FIG. 19 is a schematic cross-sectional view illustrating a state in which the battery is moved to a front slanting lower portion, and a supporting protrusion is inserted in an insertion groove.

Next, the battery 30 is moved toward a front downward slanting portion, and the supporting protrusions 22 are inserted in the insertion grooves 34a (see FIG. 19).

Figure 20:
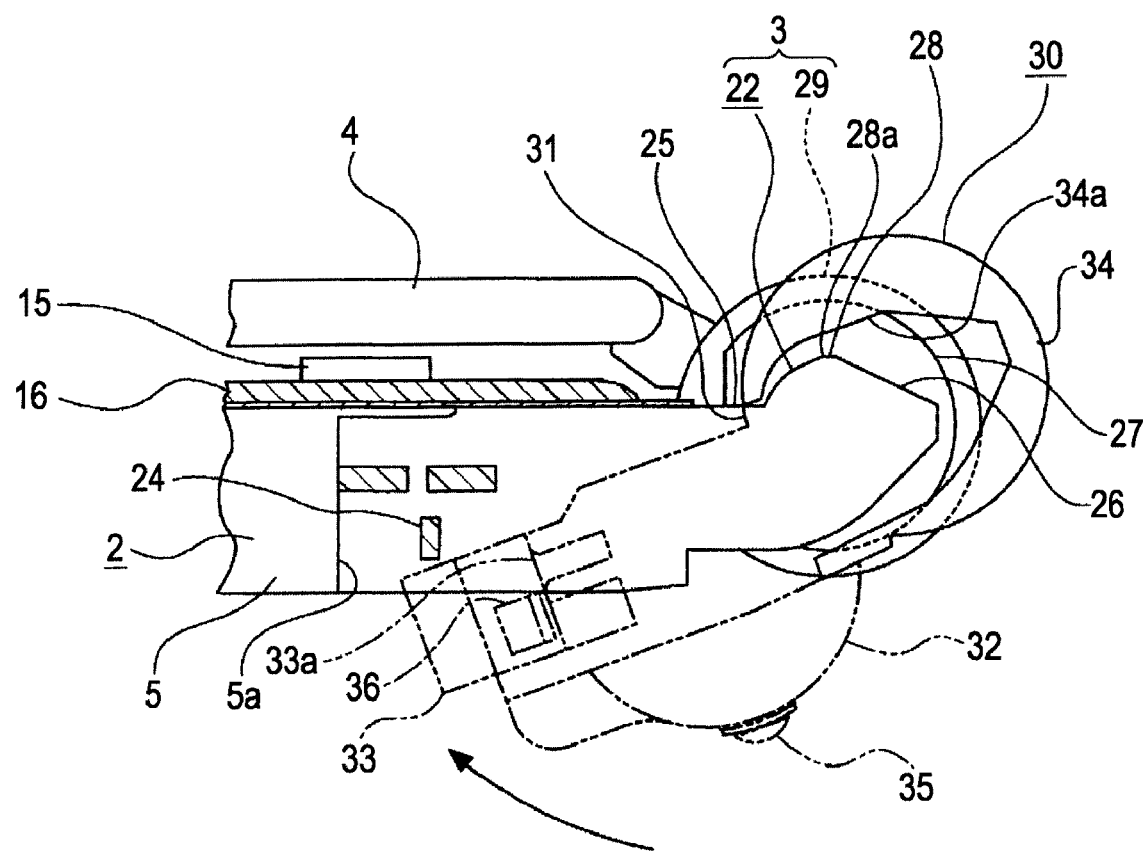
FIG. 20 is a schematic cross-sectional view illustrating a state in the middle of rotating the battery.
Figure 21:
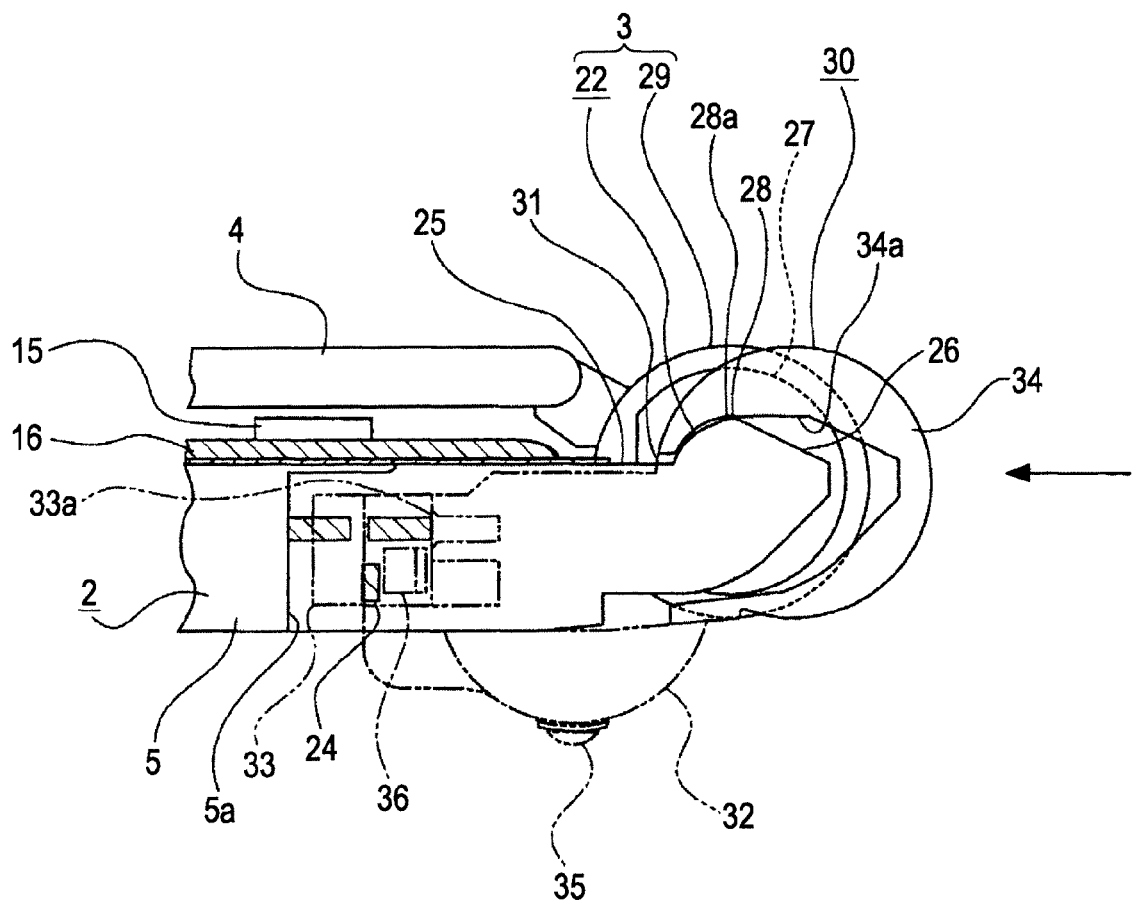
FIG. 21 is a schematic cross-sectional view illustrating a state of the battery being rotated.

Subsequently, the battery 30 is rotated such that the opening direction of the cover portions 34 is directed forward (see FIGS. 20 and 21). At this time, even if the hand which was grasping the battery 30 separates from the battery 30, the supporting protrusions 22 are inserted in the insertion grooves 34a of the cover portions 34 respectively, whereby the battery 30 can be prevented from dropping and falling from the supporting protrusions 22. In particular, the upper faces 28a of the upper edge portions 28 of the supporting protrusions 22 are formed in an approximate arc shape protruding upward, and accordingly the cover portions 34 are readily held by the upper edge portions 28 respectively, and the battery 30 can be prevented from dropping from the supporting protrusions 22.

Figure 22:
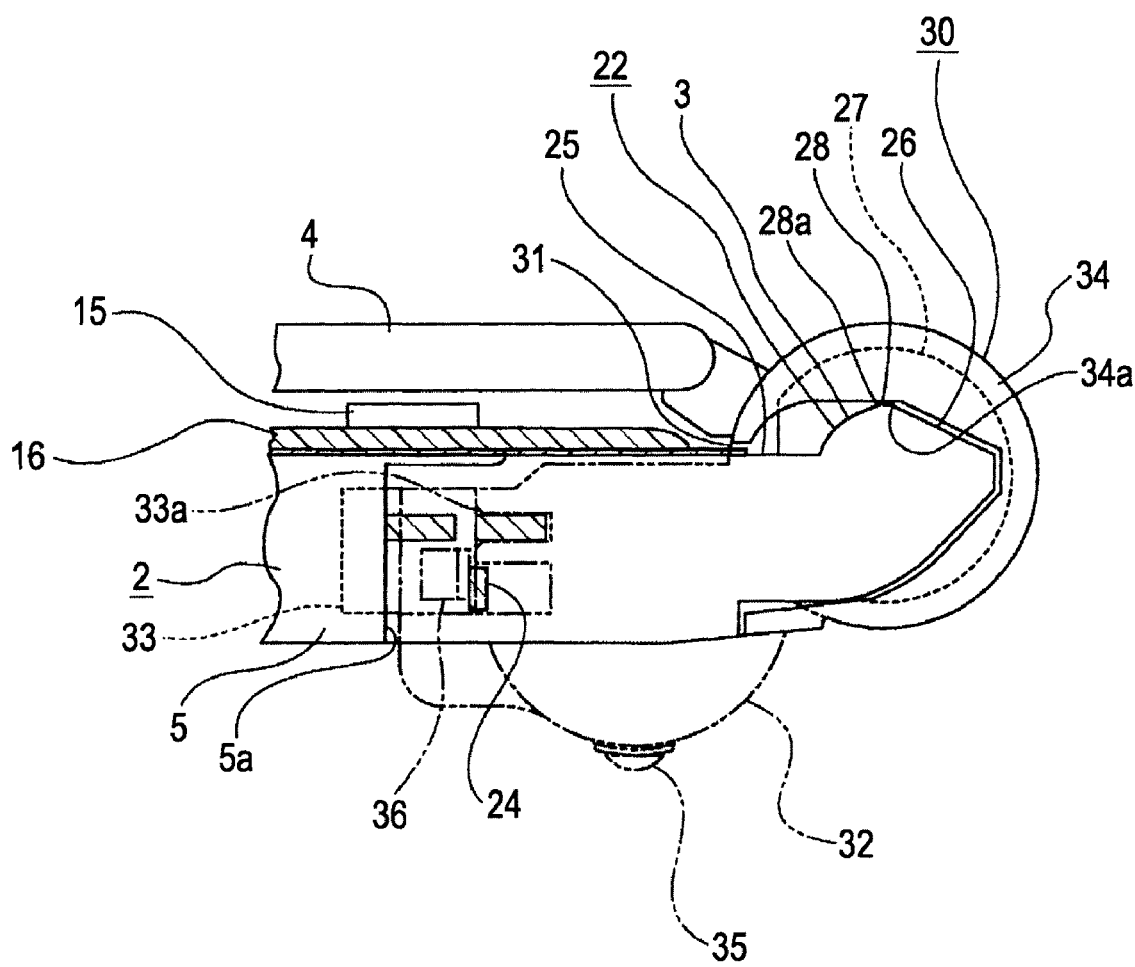
FIG. 22 is a schematic cross-sectional view illustrating a state in which the battery is attached to the device main frame portion.
Figure 23:
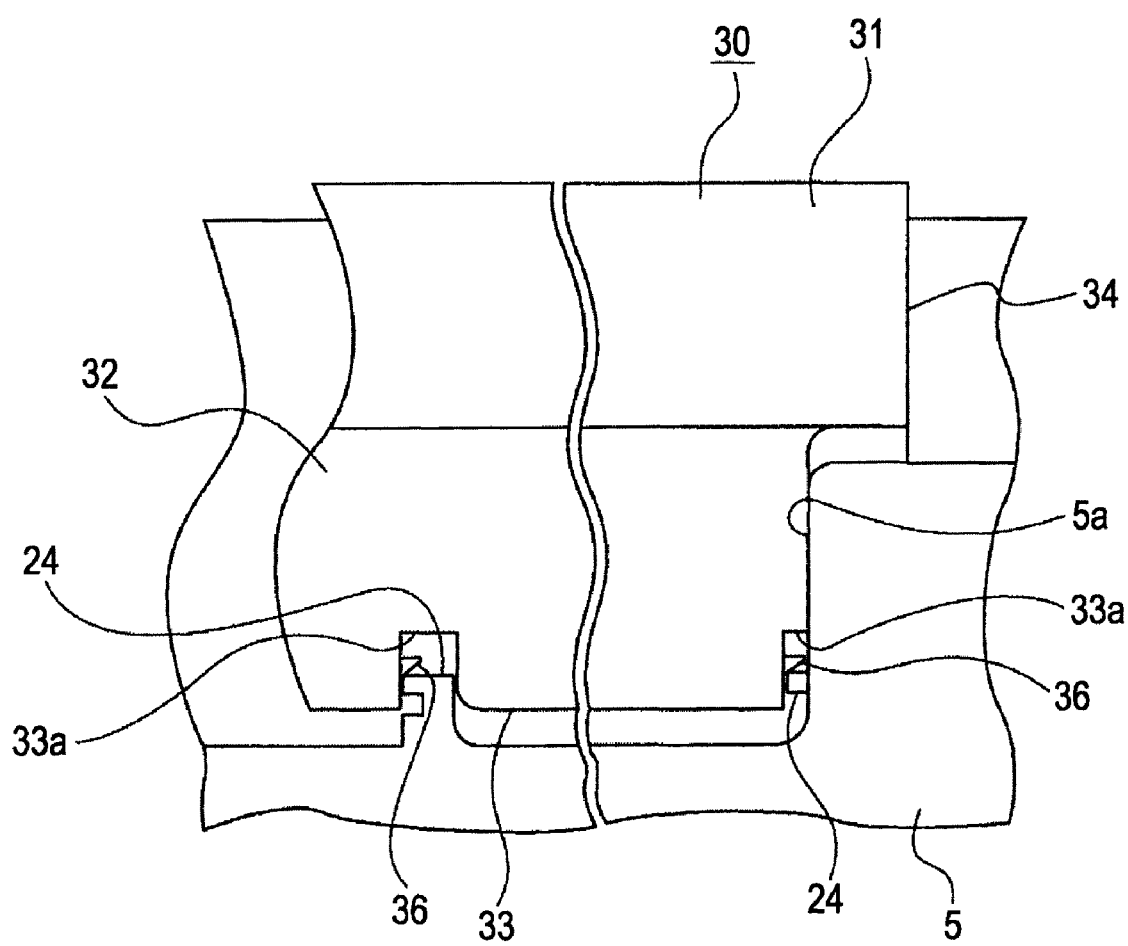
FIG. 23 illustrates the sequence when the battery is locked with the device main frame portion along with FIGS. 24 and 25, and the present diagram is a schematic enlarged plan view illustrating a state in which engagement pawls come into contact with attachment pieces.
Figure 24:
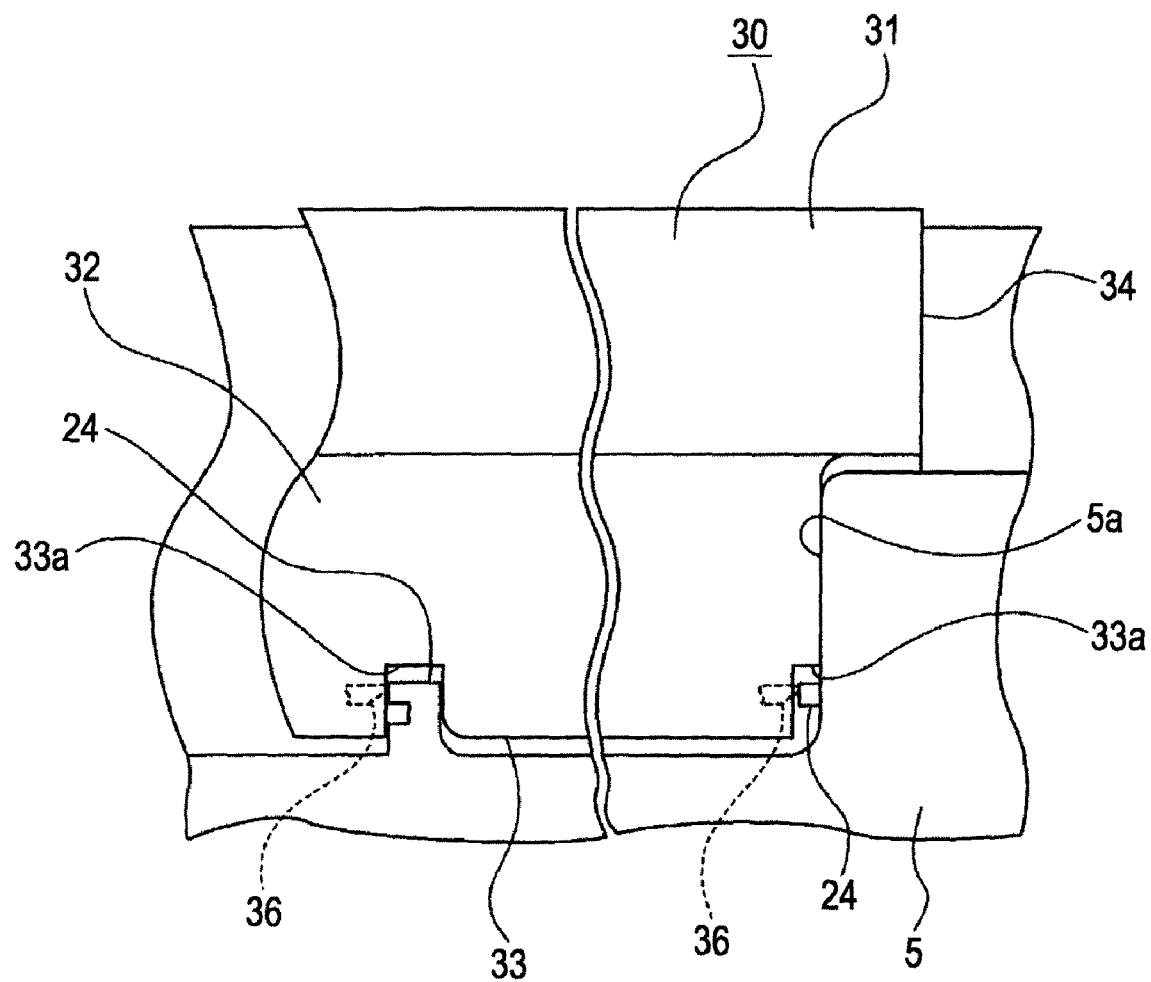
FIG. 24 is a schematic enlarged plan view illustrating a state in which the engagement pawls are moved against pressing force of spring members.
Figure 25:
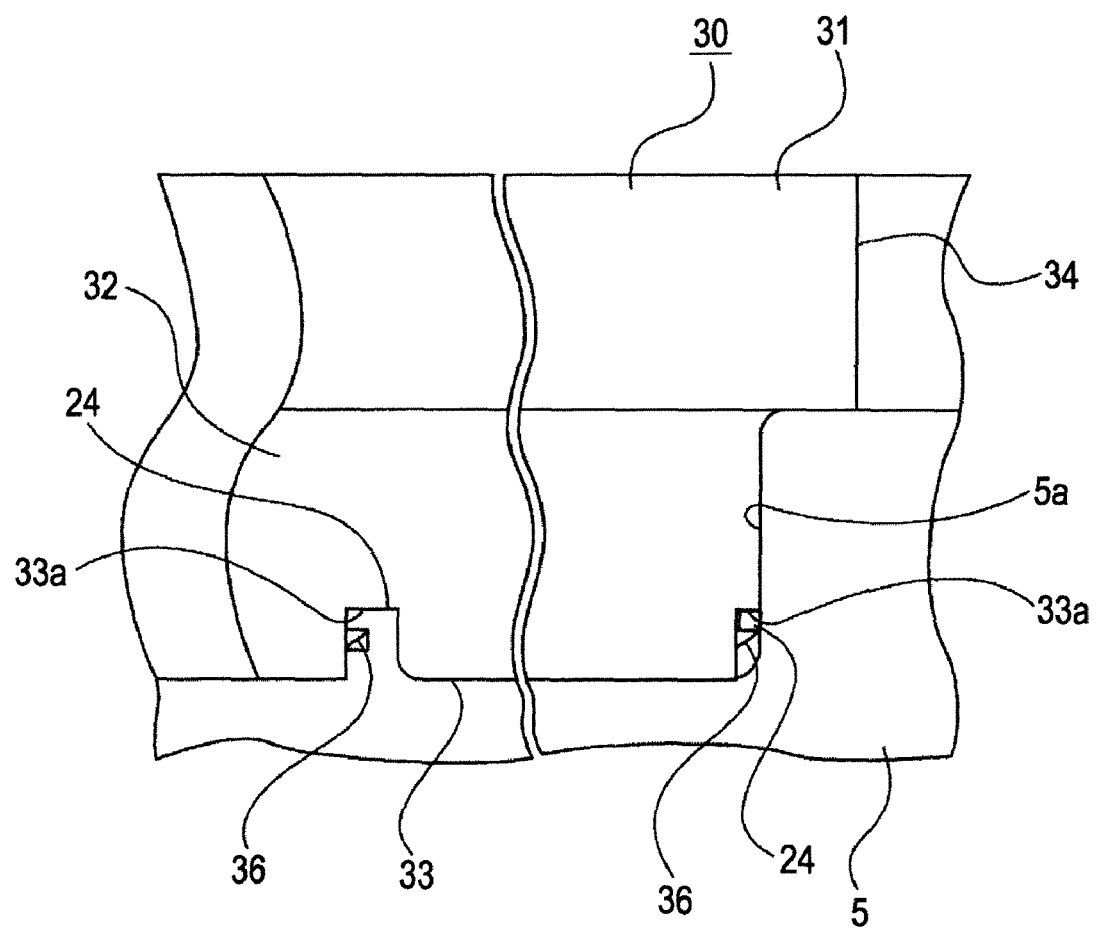
FIG. 25 is a schematic enlarged plan view illustrating a state in which the engagement pawls are engaged with the attachment pieces, and the battery is locked with the device main frame portion.

Ultimately, the battery 30 is moved forward, whereby attachment to the device main frame portion 2 is completed (see FIG. 22). When the battery 30 is attached to the device main frame portion 2, the engagement pawls 36 come into contact with the attachment pieces 24 of the casing 5 respectively (see FIG. 23). The engagement pawls 36 are moved against the pressing force of the spring members by forward movement of the battery 30 (see FIG. 24), and when the engagement pawls 36 ride up over the attachment pieces 24 by further movement of the battery 30, the engagement pawls 36 are returned to the original positions by the pressing force of the spring members and engaged with the attachment pieces 24. The battery 30 is thus locked with the device main frame portion 2 (see FIG. 25).

In a state in which the battery 30 is attached to the device main frame portion 2, the connector portion 33b is connected to the connector 23 provided in the device main frame portion 2, and the cover portions 34 are positioned adjacent to the inner side of the supported protrusions 29 protruding backward from the display portion 4. Accordingly, of the supporting protrusions 22, the portion which has not been closed by the supported protrusions 29 is closed from the outer circumferential side by the cover portions 34.

Figure 26:
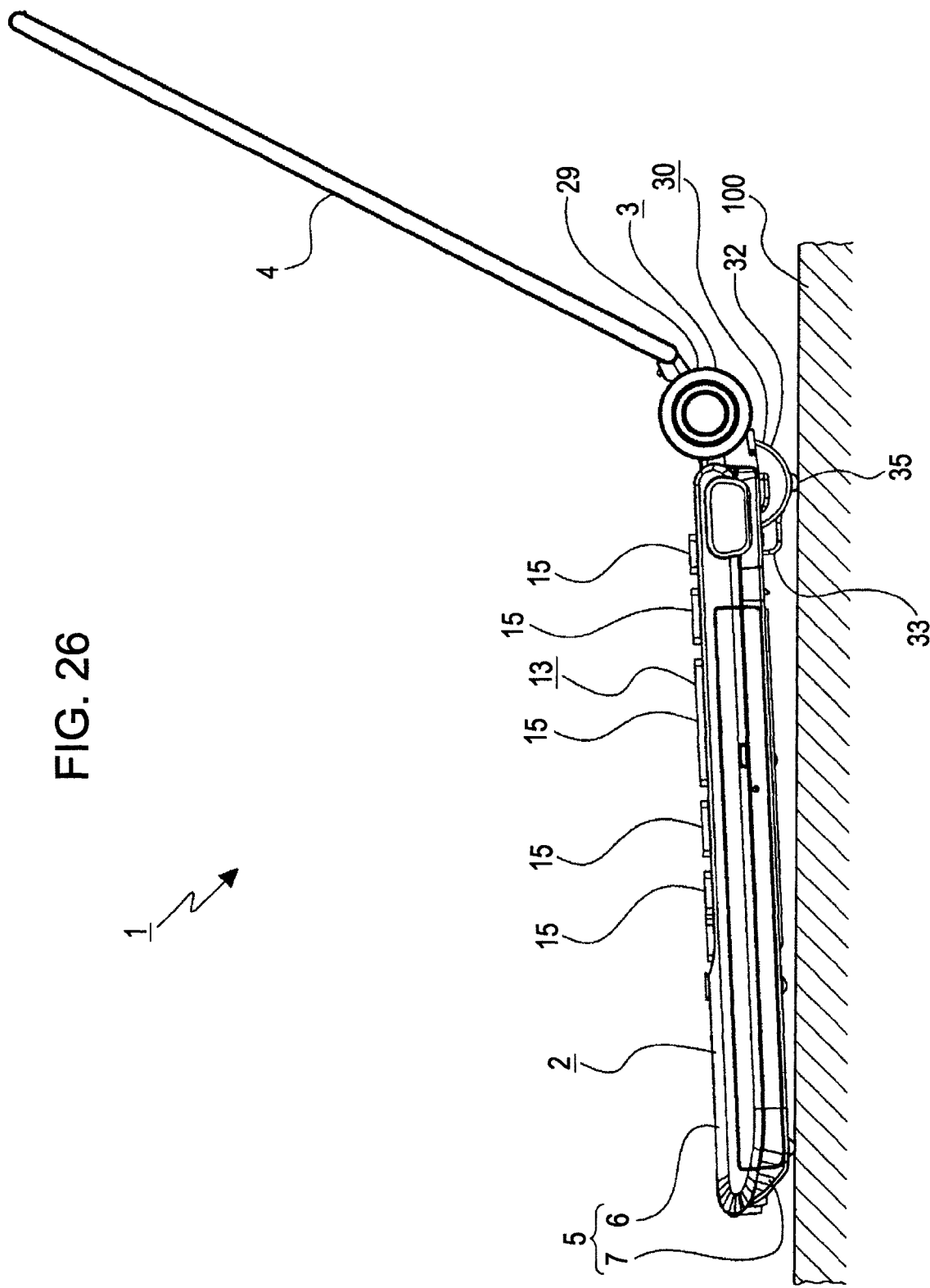
FIG. 26 is a side view of the electronic device.

In a state in which the battery 30 is attached to the device main frame portion 2, as shown in FIG. 26, upon the electronic device 1 being laid on a installation face 100 of a desk or the like, the electronic device 1 is supported on the installation face 100 by the receiving protrusions 35 provided in the second cell placement portion 32 protruding downward from the underside of the front edge portion of the device main frame portion 2 and the first cell placement portion 31, and the device main frame portion 2 is inclined in a forward-inclined state. Accordingly, the user readily operates the operating keys 15, and improvement in operability can be achieved.

Thus, with the battery 30, the electronic device 1 is supported by the second cell placement portion 32 protruding downward from the first cell placement portion 31, which eliminates necessity for providing a portion for holding the device main frame portion 2 inclined in a forward-inclined state, whereby improvement in ease of use of the electronic device 1 can be achieved even though the number of components has been reduced.

Detachment of the battery 30 from the device main frame portion 2 can be performed by making the release levers 37 slide to release the engagement between the engagement pawls 36 and attachment pieces 24, moving the battery 30 backward relative to the device main frame portion 2. The release levers 37 are provided at the underside of the battery 30, but as described above, in a state in which the electronic device 1 is laid on the installation face 100 of a desk or the like, the device main frame portion 2 is inclined in a forward-inclined state, gaps are formed between the installation face 100 and the device main frame portion 2 at the front side of the second cell placement portion 32. Accordingly, the user can make the release levers 37 slide by inserting both hands to search in the underside of the board placement portion 33 of the battery 30 from both sides of the device main frame portion 2. Thus detachment of the battery 30 from the device main frame portion 2 can be carried out while mounting the electronic device 1 on the installation face 100, and accordingly, detachment of the battery 30 from the device main frame portion 2 can be readily carried out.

As described above, with the electronic device 1, in a state in which the battery 30 is attached to the device main frame portion 2, the pair of cover portions 34 are adjacent to the pair of supported protrusions 29, and the supporting protrusions 22 are closed by the cover portions 34. This arrangement reduces the need for forming the supporting protrusions 22 in accordance with the shapes and sizes of the supported protrusions 29 and battery 30. Accordingly improvement in flexibility of designing of the electronic device 1 can be realized.

Also, gaps are typically formed only between the cover portions 34 of the battery 30, and the supported protrusions 29, so invasion of dust from the gaps is reduced, and accordingly, the excellent connection state of the battery 30 to the device main frame portion 2 can be ensured.

Figure 27:
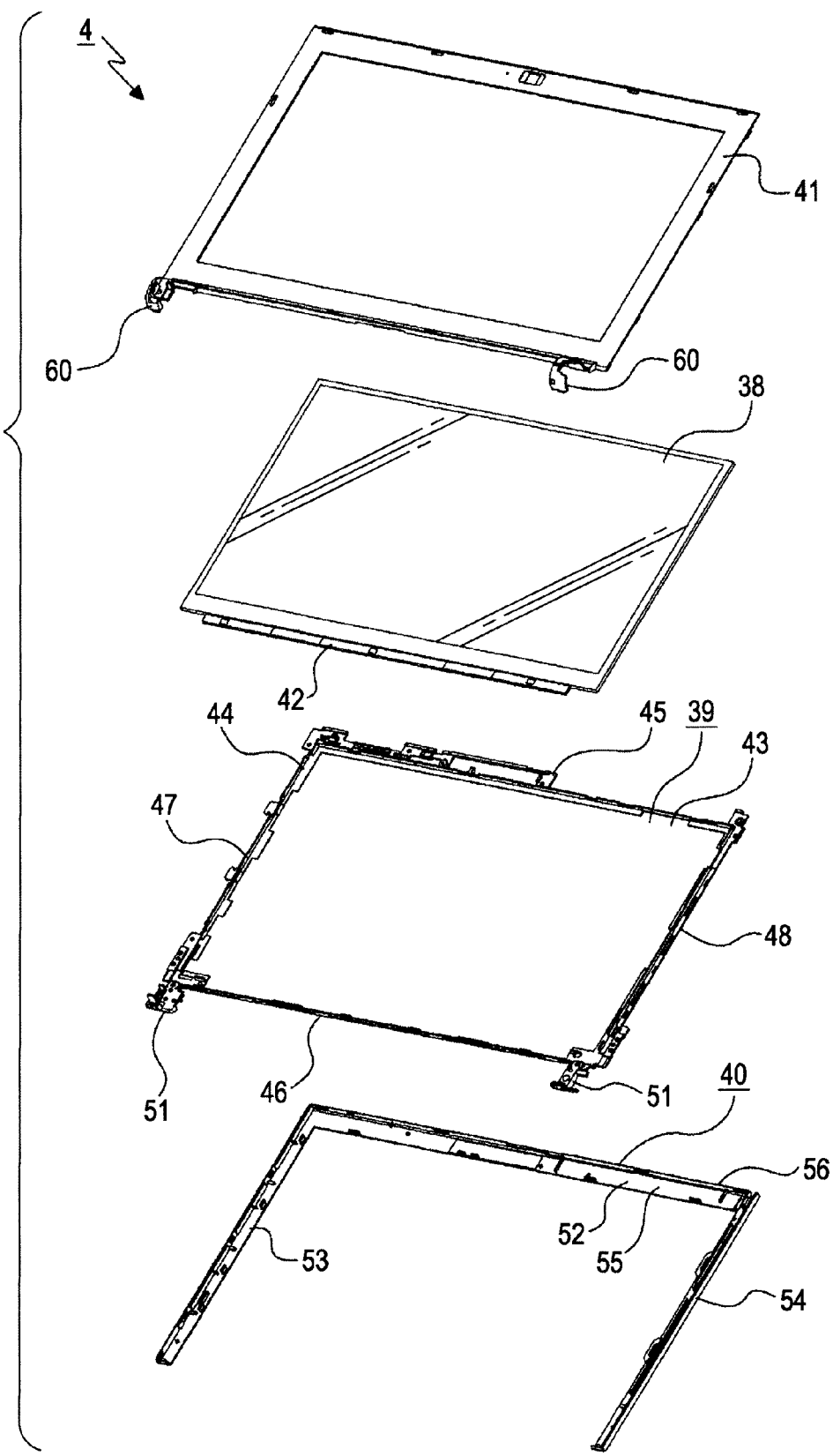
FIG. 27 is an exploded perspective view of the display portion.
Figure 28:
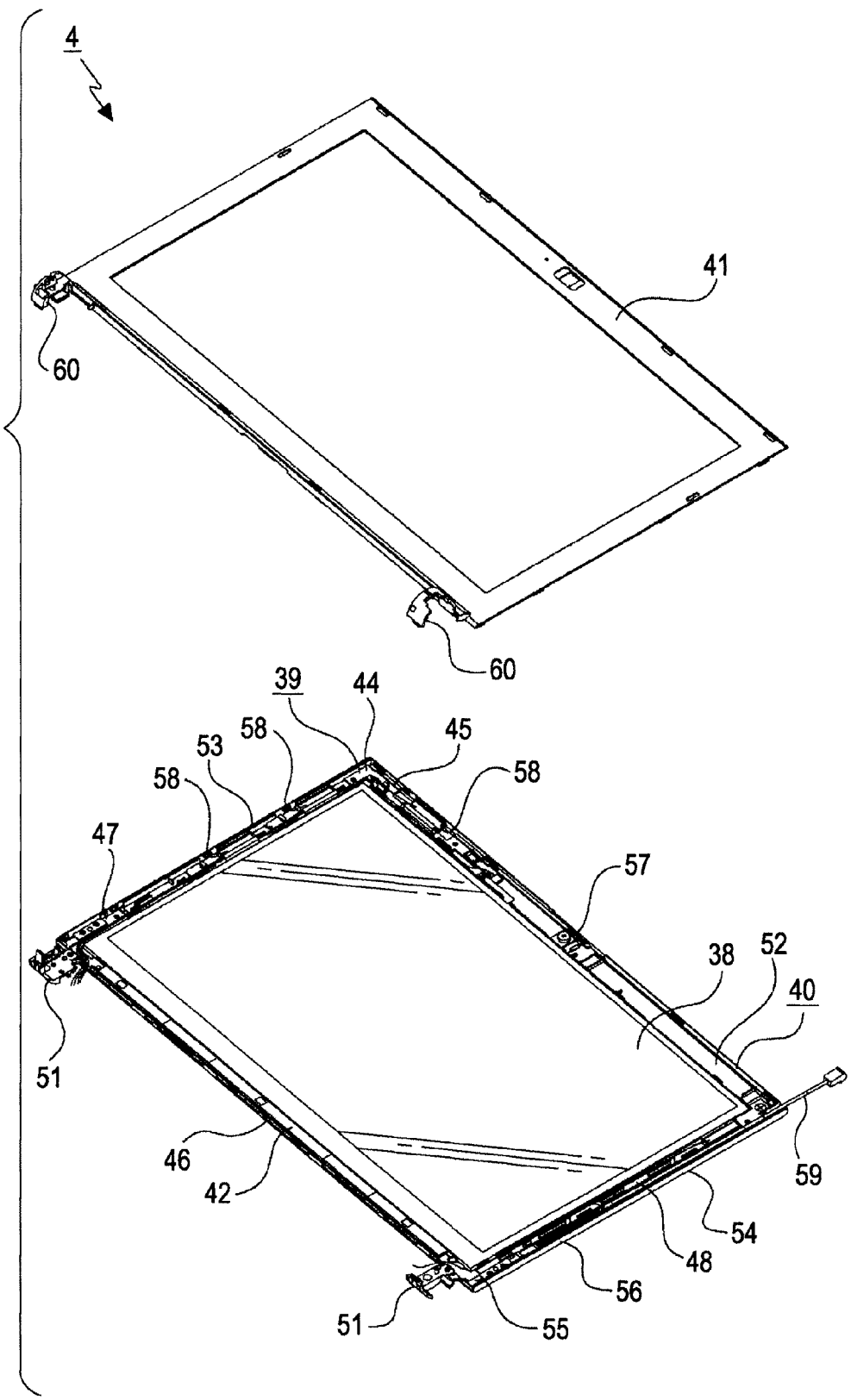
FIG. 28 is a perspective view of the display portion illustrating a state of the outer frame being separated.

The display portion 4 includes, as shown in FIGS. 27 and 28, a display panel 38, a panel casing 39 where the display panel 38 is disposed, a placement frame 40 attached to the outer circumference of the panel casing 39, and an outer frame 41 covering the placement frame 40 from the front.

As for the display panel 38, for example, a liquid crystal display is employed, and the lower edge portion of the display panel 38 is attached with a horizontally long control board 42. The control board 42 is a board for drive-controlling the display panel 38.

Figure 29:
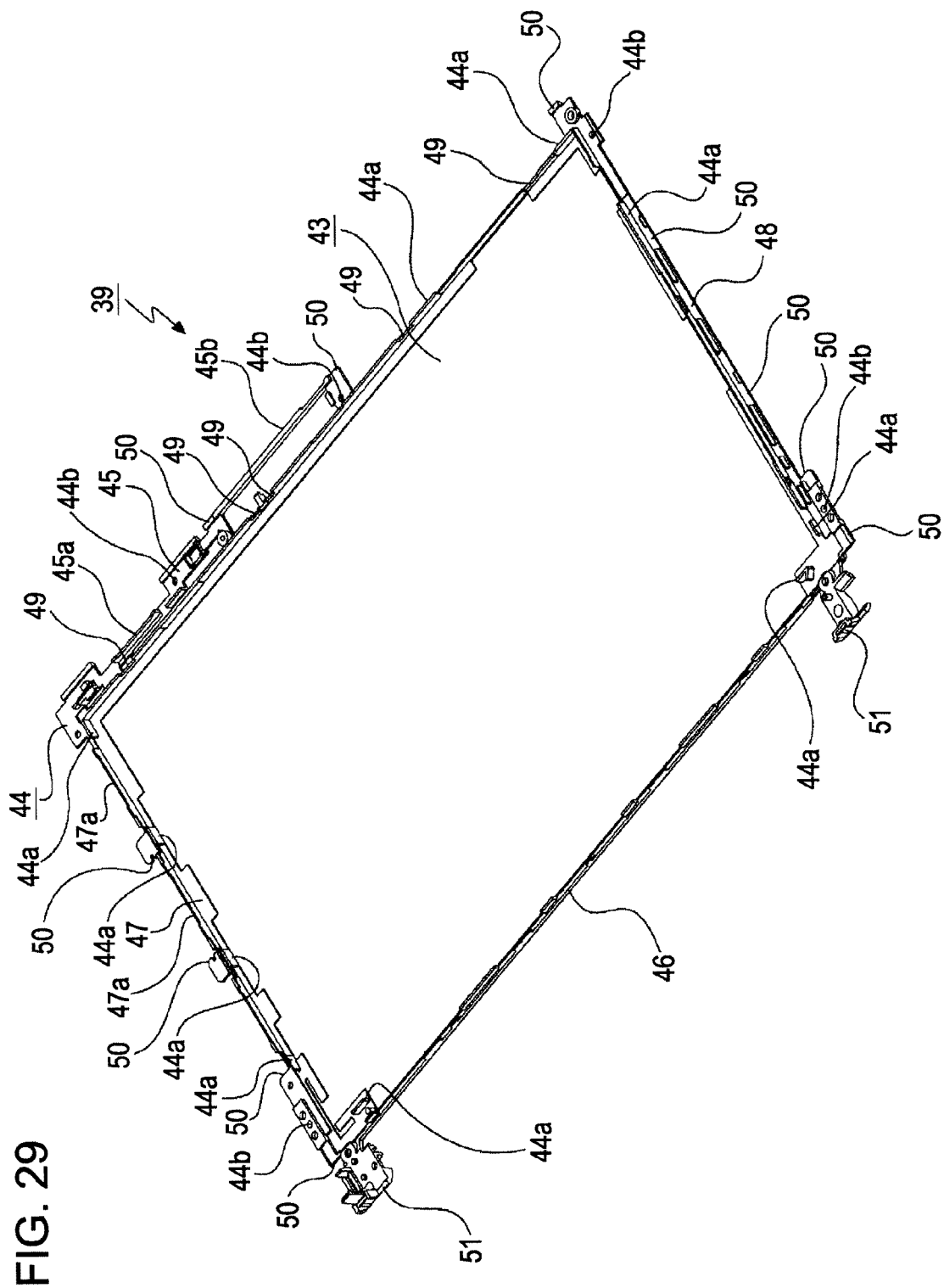
FIG. 29 is a perspective view of a panel casing.
Figure 30:
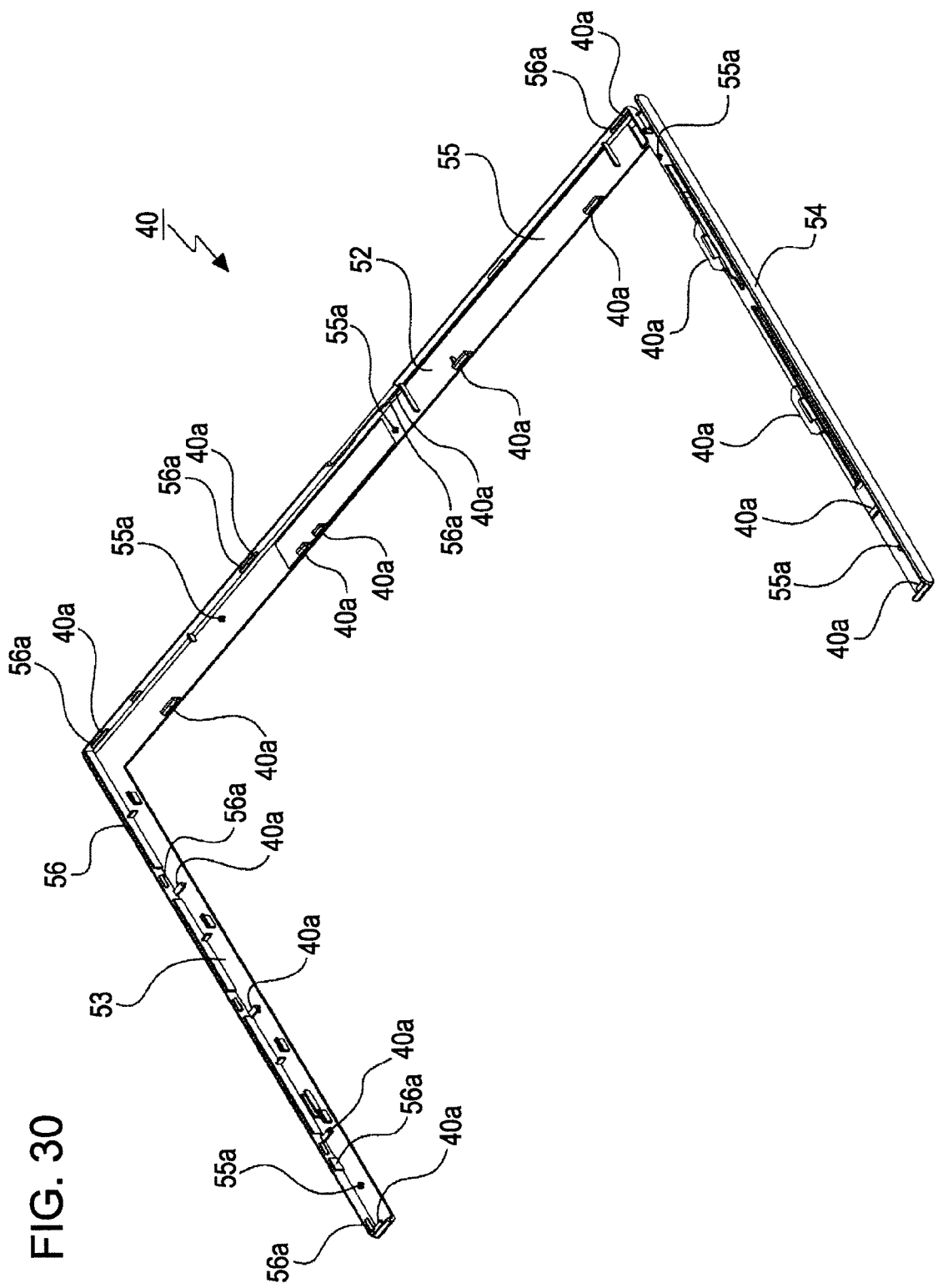
FIG. 30 is a perspective view of a placement frame.

The panel casing 39 is typically configured, for example, such that a base plate portion 43 formed of a carbon material, and a frame portion 44 provided on the outer circumferential portion of the base plate portion 43 are integrally formed by insert molding (see FIG. 29).

The base plate portion 43 is formed in a flat plate shape of a somewhat larger rectangle than the display panel 38, and the display panel 38 is disposed on the front face of the base plate portion 43. The base plate portion 43 is typically formed of a carbon material, whereby high rigidity is preferably provided.

The frame portion 44 is formed of a material including a carbon resin with a base material as a resin, and is formed in a frame shape with an upper portion 45, a lower portion 46, a left side portion 47, and right side portion 48.

The frame portion 44 is provided with walls 44a (FIG. 29) for positioning and disposing the display panel 38. A part of the wall 44a is provided as a connection engagement portion or portions 49 of which the height is lower than the other portions.

The display panel 38 is disposed on the inner side of the walls 44a and is attached to the panel casing 39.

Positioning holes 44b, which are penetrated forward and backward, are formed at predetermined positions on the frame portion 44.

Connection engagement portions 50 are provided on the outer circumferential portions of the upper portion 45, left side portion 47, and right side portion 48 of the frame portion 44, connection, respectively.

A horizontally long terminal attachment portion 45a is provided on the upper portion 45. The approximate central portion in the horizontal direction of the upper portion 45 is provided as a camera attachment portion 45b in the example depicted in FIG. 29.

Vertically long terminal attachment portions 47a are isolated and provided upward and downward on the left side portion 47.

Protrusions for hinges 51 protrude downward from both side edge portions of the lower portion 46. The protrusions for hinges 51 are disposed within the supported protrusions 29, and are connected to the supporting protrusions 22 through an unshown rotational movement mechanism, respectively.

In the placement frame 40, a horizontally long upper face portion 52, a left side face portion 53, and a right side face portion 54 each protrude downward from both side edge portions of the upper face portion 52 and are formed integral with a resin material.

The placement frame 40 includes a flat plate portion 55 formed in a plate shape which is directed forward and backward, a wall 56 protruding forward from the outer circumferential portion of the flat plate portion 55. Connection engagement portions 40a are provided at predetermined positions of the placement frame 40.

Multiple positioning pins 55a protrude forward on the flat plate portion 55.

Engagement portions 56a are provided on the inner face of the wall portion 56. A part of the engagement portions 56a also serve as connection engagement portions 40a. Accordingly, simplification of the configuration can be achieved.

In the placement frame 40, the positioning pins 55a are inserted in the positioning holes 44b of the panel casing 39 from the back to perform positioning respectively, and the connection engagement portions 40a are engaged with the connection engagement portions 49 of the panel casing 39 to connect to the panel casing 39 respectively. Accordingly, connection between the placement frame 40 and panel casing 39 is performed only by engagement between the connection engagement portions 40a, and the connection engagement portions 49 and 50.

Figure 31:
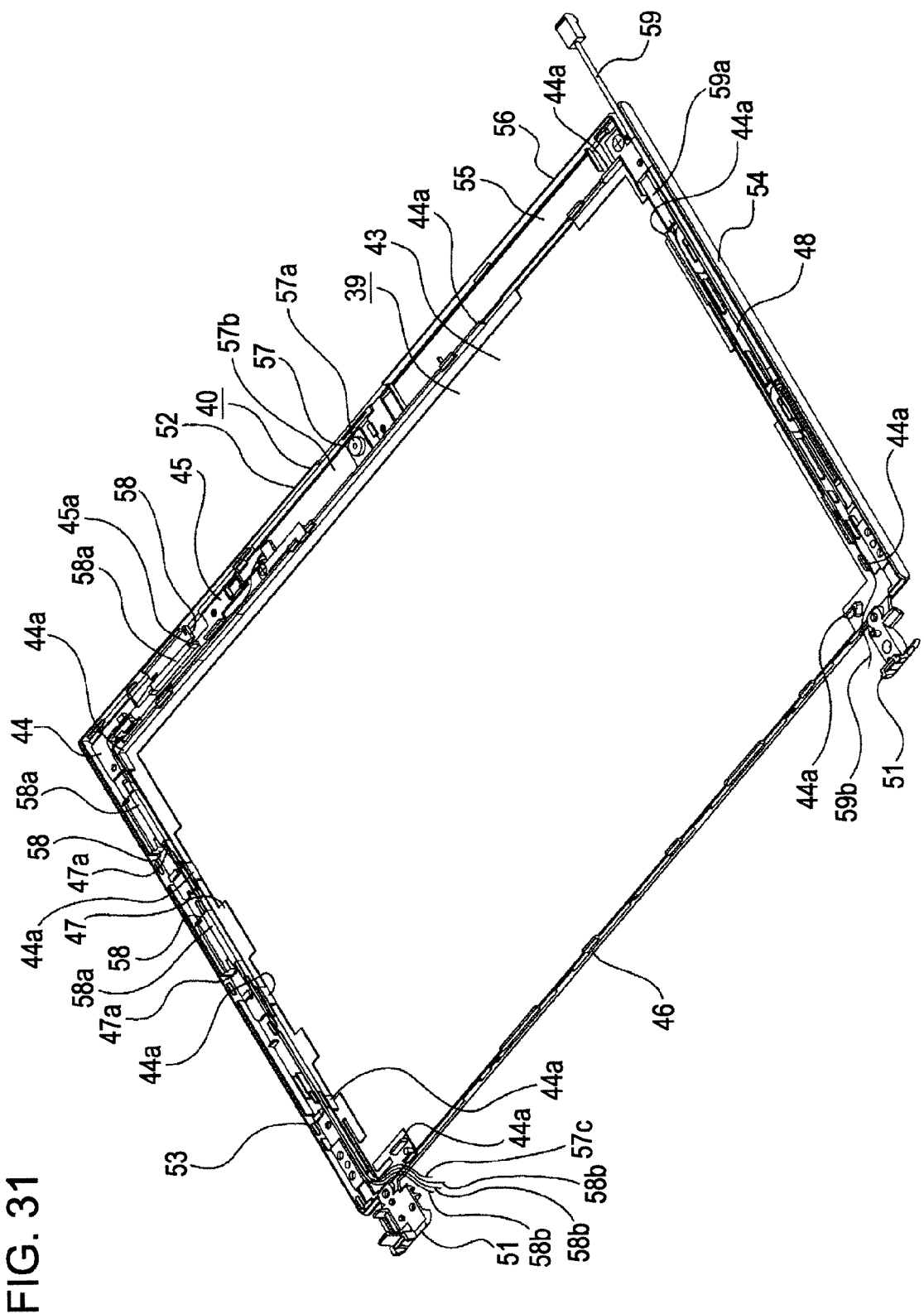
FIG. 31 is a perspective view illustrating a state in which the respective portions are attached to the panel casing and placement frame.

A camera unit 57 is attached to the camera unit attachment portion 45b of the upper portion 45 of the panel casing 39 (see FIGS. 28 and 31). The camera unit 57 includes a camera main unit 57a and a control board 57b. A connection line 57c extends from the camera unit 57. The connection line 57c passes through the upper portion 45 of the panel casing 39, the left side portion 47, the inside of the supported protrusion 29, and to the inside of the supporting portion 22. The connection line 57c is connected to the control circuit board (mother board) disposed in the inside of the device main frame portion 2.

Figure 32:
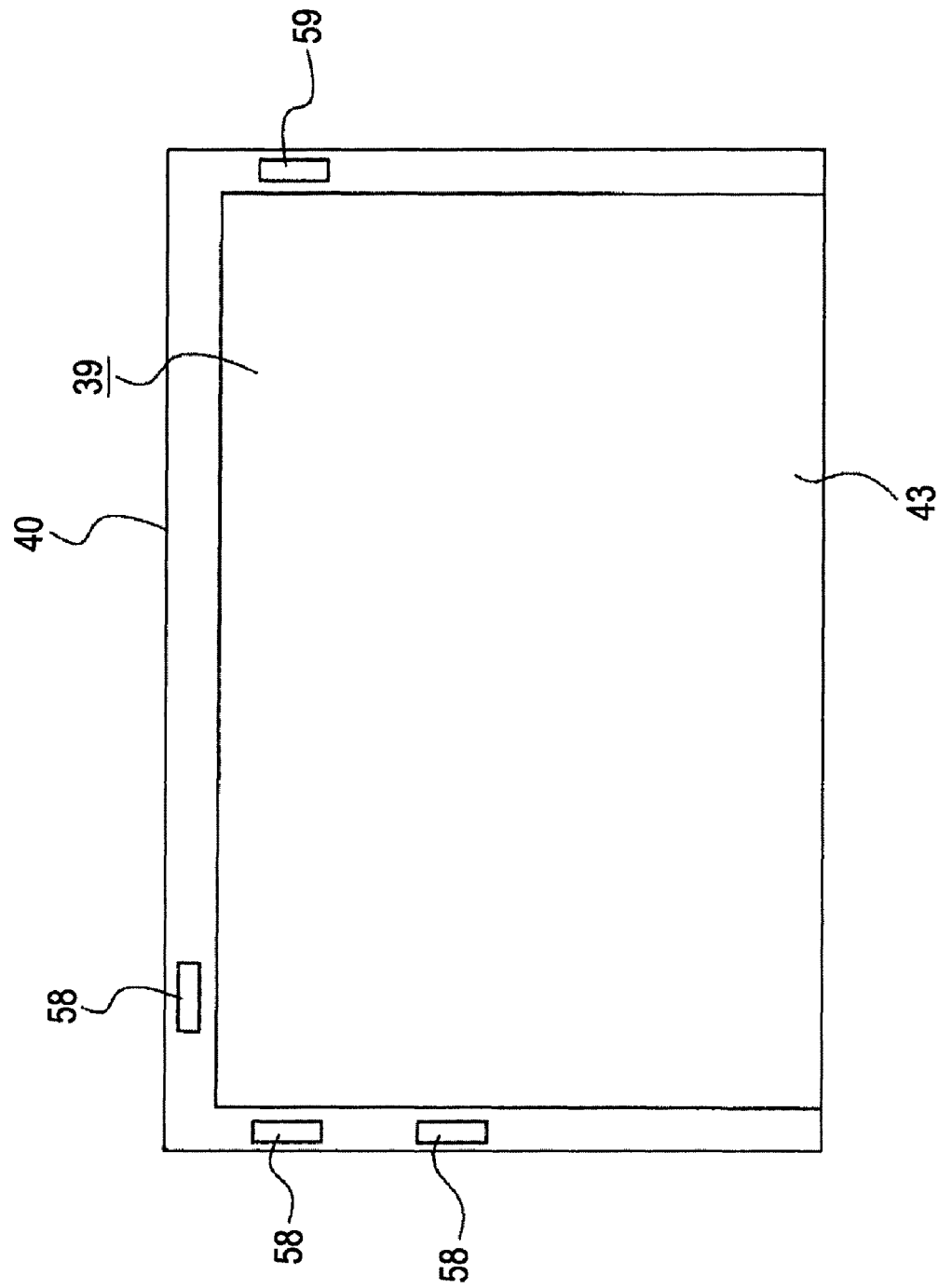
FIG. 32 is a conceptual view illustrating a state in which a first antenna and a second antenna are disposed on the placement frame.

The first antennas 58 and a second antenna 59 are disposed in a state in which the panel casing 39 and placement frame 40 are connected (see FIGS. 31 and 32). Each of the first antennas 58 is, for example, an antenna for wireless LAN (WLAN), and the second antenna 59 is, for example, an antenna for one-segment broadcasting.

The first antennas 58 are typically disposed at a position close to the left edge of the upper face portion 52, and positions isolated upward and downward at the upper side of the left side face portion 53, of the placement frame 40, respectively. Metal grounding terminals 58a are provided at the first antennas 58 respectively, and are attached to the terminal attachment portions 45*a*, 47*a*, and 47*a* of the panel casing 39, and grounded, respectively.

Connection cables 58*b* extend from the first antennas 58 respectively, and the connection cables 58*b* pass through from the upper portion 45 or left side portion 47 of the panel casing 39, the inside of the supported protrusion 29, to the inside of the supporting protrusion 22, and are connected to the control circuit board (mother board) disposed in the inside of the device main frame portion 2.

In the example depicted in FIG. 31, the second antenna 59 is disposed on the upper side of the right side face portion 54 of the placement frame 40. A metal terminal for grounding 59*a* is provided at the second antenna 59, and the metal terminal 59*a* is connected to the panel casing 39, and grounded.

A connection cable 59*b* extends from the second antenna 59 and passes through from the right side portion 48 of the panel casing 39, the inside of the supported protrusion 29, to the inside of the supporting protrusion 22. The connection cable 59*b* is thus connected to the control circuit board (mother board) disposed in the inside of the device main frame portion 2.

The second antenna 59 includes an antenna shaft 59*c*, which is configured to be drawn out from and be stored in the display portion 4.

An outer frame 41 is attached to the placement frame 40 from the front. The outer frame 41 is formed in a rectangular frame shape, and protrusions for hinges 60 each protruding downward are disposed at both side edge portions of the lower edge portion of the outer frame 41. The protrusions for hinges 60 and 60 are connected to protrusions for hinges 51 provided in the panel casing 39 respectively, and are disposed in the inside of the supported protrusions 29 along with the protrusions for hinges 51, and are linked to the supporting protrusions 22 via an unshown rotational movement mechanism so as to be rotatable.

Figure 33:
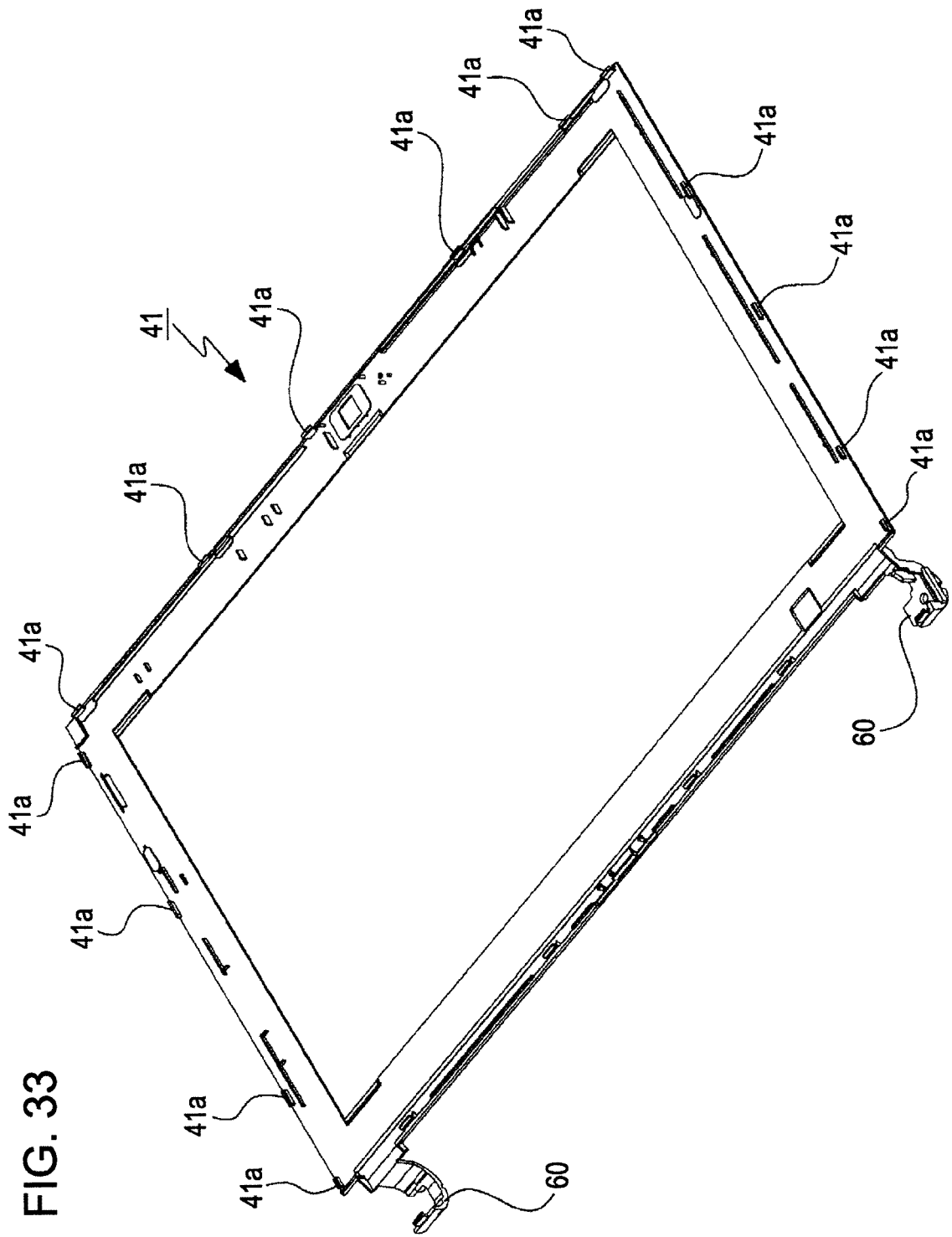
FIG. 33 is a perspective view of the outer frame.

As shown in FIG. 33, multiple engagement portions 41*a* are isolated in the circumferential direction and provided on the rear face of the outer frame 41, and the engagement portions 41*a* protrude downward.

The outer frame 41 is connected to the placement frame 40 by the engagement portions 41*a* being engaged with the engagement portions 56*a* respectively. Accordingly, connection between the placement frame 40 and outer frame 41 is preferably performed only by engagement between the engagement portions 41*a*, and the engagement portions 56*a*.

In a state in which the outer frame 41 is connected to the placement frame 40, the entirety of the placement frame 40 and the outer circumferential portion of the display panel 38 are covered from the front.

As described above, with the electronic device 1, the first antennas 58 are disposed on the upper face portion 52 and left side face portion 53 of the placement frame 40 formed of a nonmetallic material, and the second antenna 59 is disposed on the right side face portion 54.

Accordingly, improvement in communication performance can be achieved following sufficient space for disposing the first antennas 58, and the second antenna 59 each employing a different communication method being ensured. In particular, the first antennas 58 are disposed on the upper face portion 52 and left side face portion 53, whereby improvement in sensitivity is realized by a signal having intensity necessary for each of the first antennas 58 being received, and accordingly, communication performance can be enhanced.

Also, the first antennas 58 and the second antenna 59 are disposed at the upper side, and accordingly, the first antennas 58 and the second antenna 59 are isolated from a desk (installation face 100) and the device main frame portion 2, which may shield incoming radio waves to be received, whereby improvement in reception sensitivity can be realized, the probability of receiving unnecessary noise which may be caused from the device main frame portion 2 decreases, and an excellent communication state can be ensured.

Further, connection between the placement frame 40 and outer frame 41 is performed only by engagement between the engagement portions 41*a*, and the engagement portions 56*a*, whereby improvement in the reception sensitivity of the first antennas 58, and the second antenna 59 can be achieved without employing metal fixing screws which may deteriorate reception sensitivity at the time of connection between the placement frame 40 and outer frame 41.

Further, connection between the placement frame 40 and panel casing 39 is also performed only by engagement between the connection engagement portions 40*a*, and the connection engagement portions 49 and 50, whereby improvement in the reception sensitivity of the first antennas 58, and the second antenna 59 can be achieved without employing metal fixing screws, which may deteriorate reception sensitivity at the time of connection between the placement frame 40 and panel casing 39.

Additionally, the second antenna 59 is configured to be drawn out and stored, and can be moved in and out within the display portion 4 and outside, whereby the second antenna 59 can be elevated by drawing out the second antenna 59, and accordingly, improvement in reception sensitivity can be achieved.

Note that the example has been shown above wherein the second antenna 59 is disposed on the right side face portion 54 of the placement frame 40, but the second antenna 59 may be disposed on the upper face portion 52 of the placement frame 40.

Figure 34:
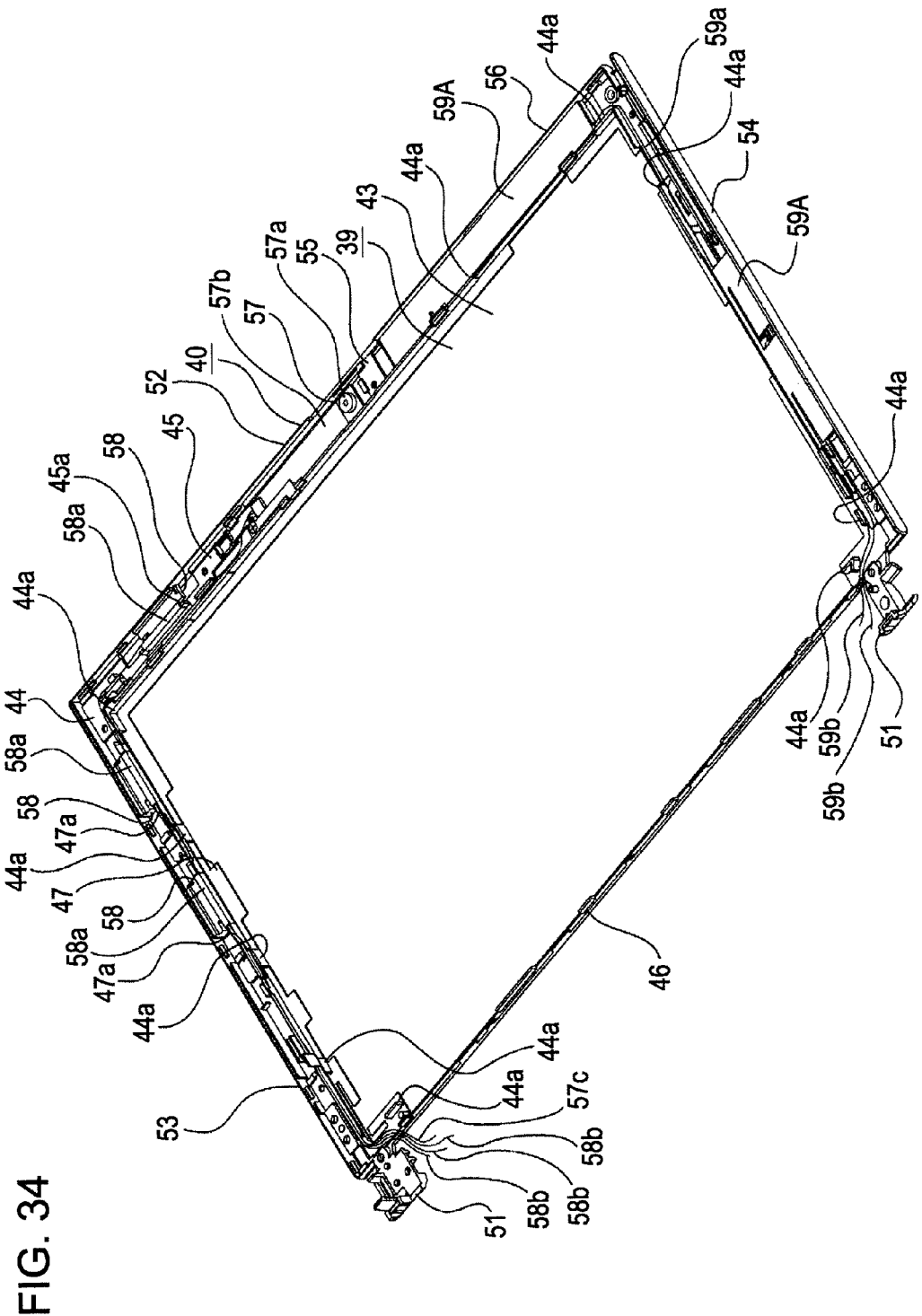
FIG. 34 is a perspective view illustrating a state in which the respective portions including another type of second antenna are attached to the panel casing and placement frame.
Figure 35:
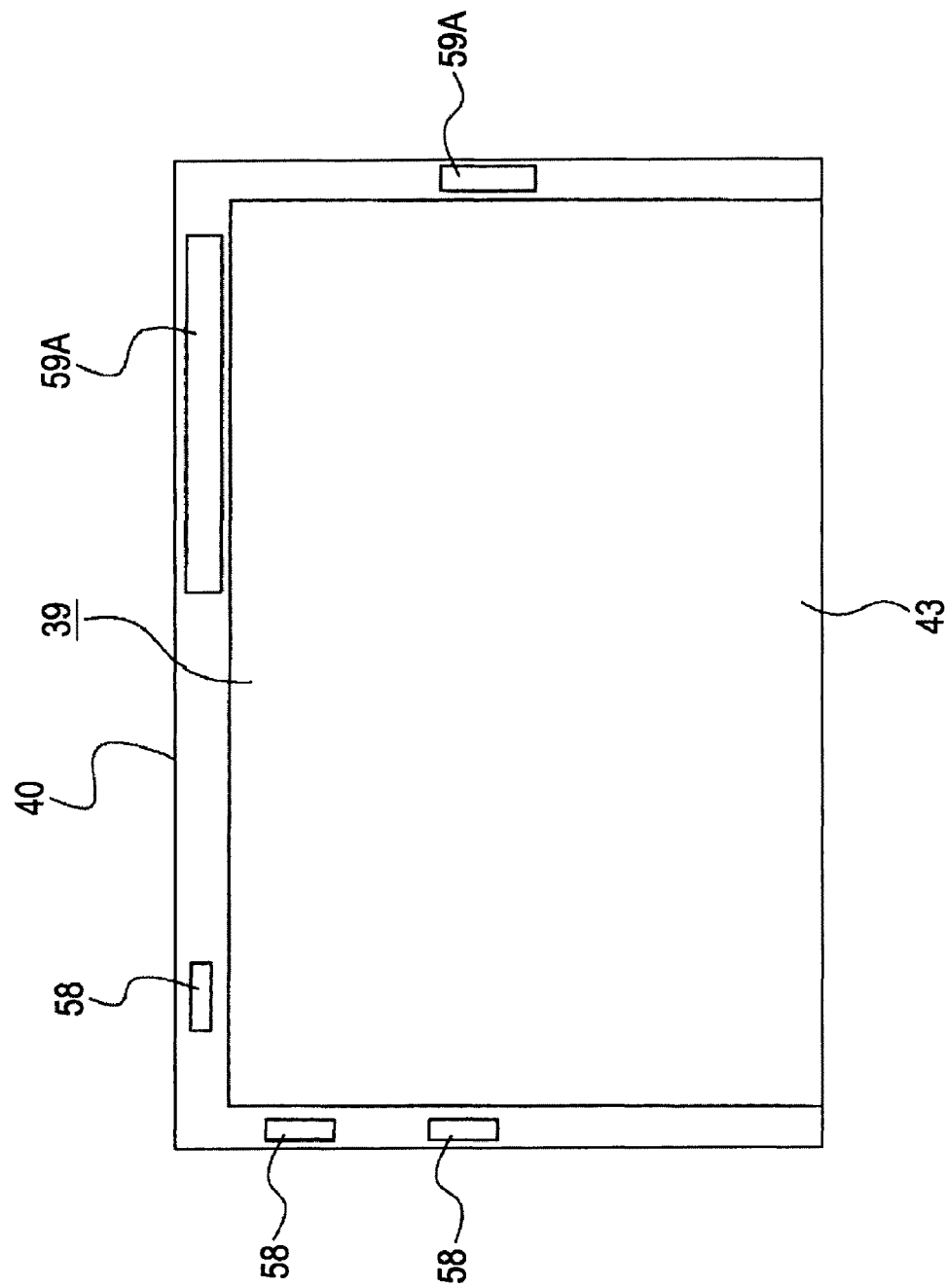
FIG. 35 is a conceptual view illustrating a state in which the first antenna and another type of second antenna are disposed on the placement frame.

Also, an example has been shown above in which the antenna for one-segment broadcasting is disposed as the second antenna 59, but for example, as shown in FIGS. 34 and 35, an antenna for WAN (Wide Area Network) may be disposed as a second antenna 59A. In this case, there is a possibility that there is a need to dispose two second antennas 59A. In a case wherein there is a need to dispose the two second antennas 59A, the second antennas 59A may be disposed on the upper face portion 52 and right side face portion 54, respectively.

The second antennas 59A are typically disposed on the upper face portion 52 and right side face portion 54 respectively, whereby improvement in sensitivity is achieved by a signal having intensity necessary for each of the second antennas 59A being received, and accordingly, communication performance can be enhanced.

An example has been described above wherein an antenna for wireless LAN is employed as the first antenna 58, and an antenna for one-segment or WAN is employed as the second antennas 59 and 59A. However, the first antenna and second antenna are not restricted to the antennas of those communication methods, and optional antennas of other communication methods can be employed.

Additionally, an example has been shown above wherein the two types of antennas using a different communication method are disposed, but the types of antennas are not restricted to two types, and three types or more of antennas using a different communication method may be implemented.

The specific shapes and configurations of the components shown in the embodiments are only examples for implementing the present invention, and should not be interpreted restrictively. It should be understood by those skilled in the art that various modifications, combinations, sub-combinations, and alterations may occur depending on design requirements and other factors insofar as they are within the scope of the appended claims or the equivalents thereof.

Second Embodiment

In a second embodiment, a description will be given on an electronic device while using a laptop personal computer as an example.

Figure 36:
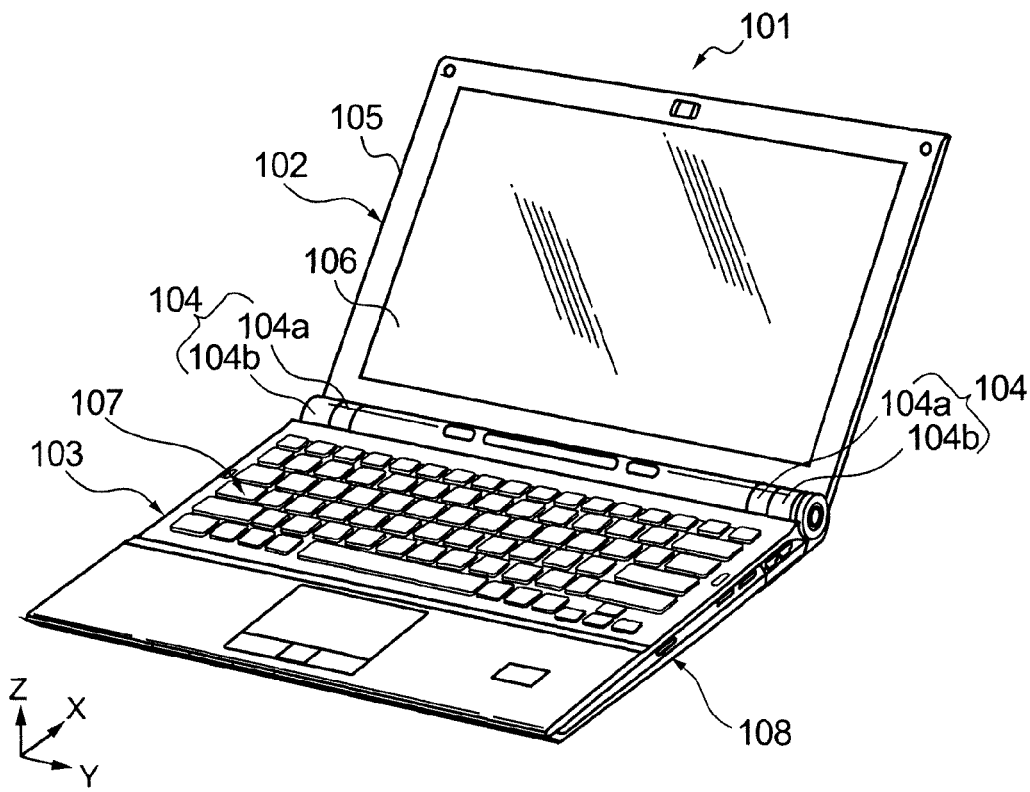
FIG. 36 is a perspective view of an electronic device according to an embodiment of the present invention in an opened state.
Figure 37:
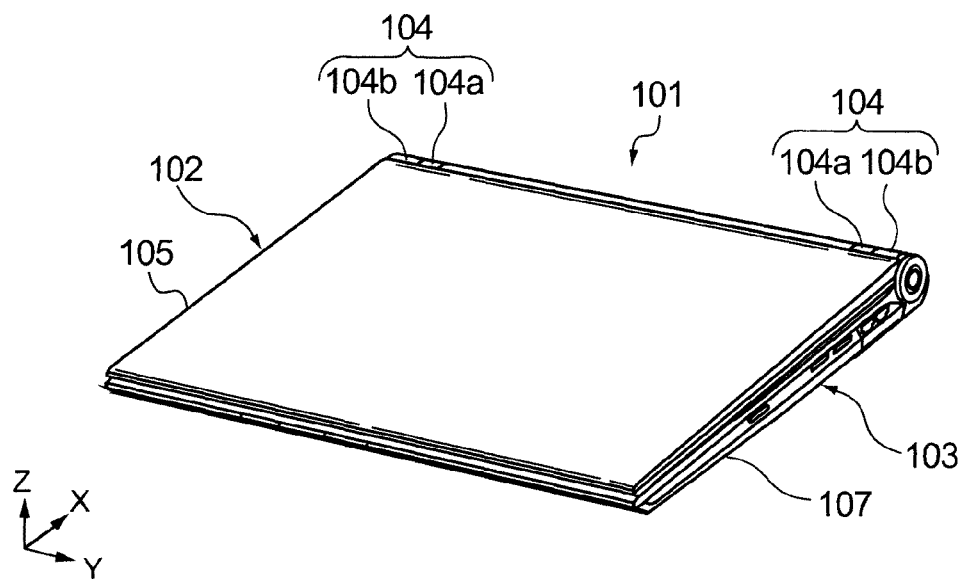
FIG. 37 is a perspective view of the electronic device shown in FIG. 36 in a closed state.

FIG. 36 is a perspective view of an electronic device according to the second embodiment of the present invention in an opened state, and FIG. 37 is a perspective view of the electronic device shown in FIG. 36 in a closed state.

An electronic device 101 includes a display portion 102, a main body portion 103, and a hinge 104 that connects the display portion 102 and the main body portion 103.

The display portion 102 can be opened and closed with respect to the main body portion 103 through the hinge 104. The display portion 102 includes a display-side casing 105, a display surface 106, and a display processing unit (not shown) that is provided in the display-side casing 105 and performs a display processing.

The display-side casing 105 is a casing of the display portion 102 that contains the display processing unit (not shown). The display surface 106 displays information and faces the main body portion 103 in the closed state. To the display-side casing 105, two cylindrical-shaped connection portions 104a are provided. Those two connection portions 104a are connected with connection portions 104b of the main body (described later) to constitute the hinge 104.

The main body portion 103 includes components such as a keyboard unit 107, a main body unit 108, a central processing unit (not shown) incorporated in the main body unit 108, and a hard disk drive (not shown). The keyboard unit 107 can be attached/detached with respect to the main body unit 108 as described later.

Figure 38:
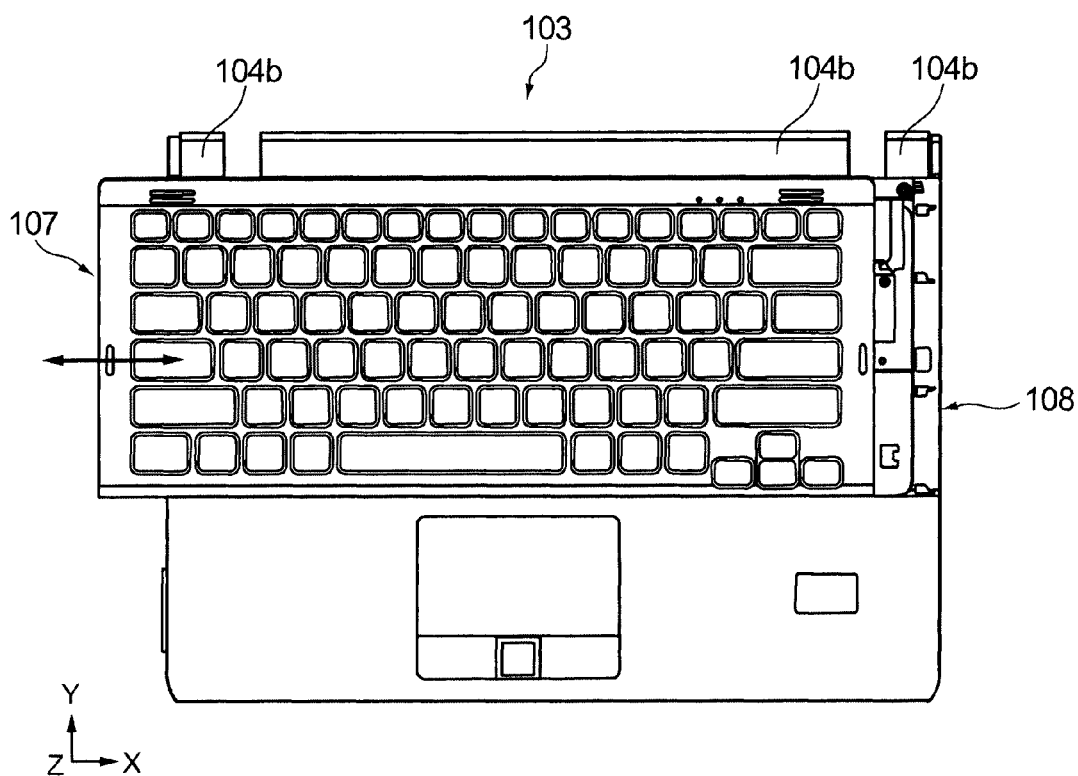
FIG. 38 is a view showing a state where a keyboard unit is detached from a main body unit.

FIG. 38 is a view showing a state where the keyboard unit 107 is detached from the main body unit 108.

As shown in FIG. 38, by sliding the keyboard unit 107 of the main body portion 103 in a longitudinal direction (X direction in FIG. 38) of the keyboard unit 107 as described later, the keyboard unit 107 can be attached/detached with respect to the main body unit 108.

Figure 39:
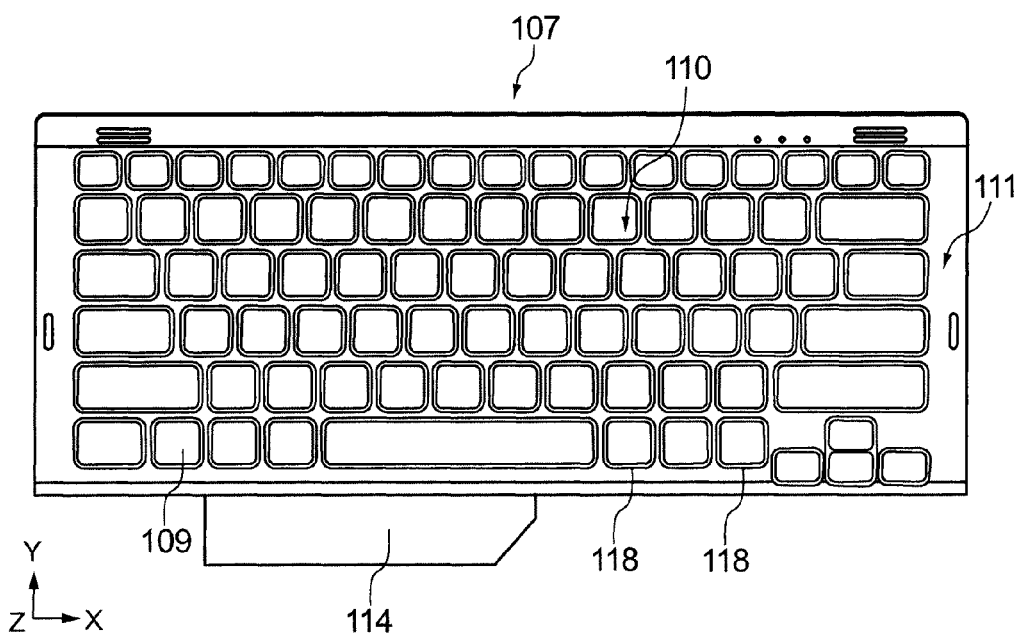
FIG. 39 is a plan view of the keyboard unit.
Figures 40A, 40B:
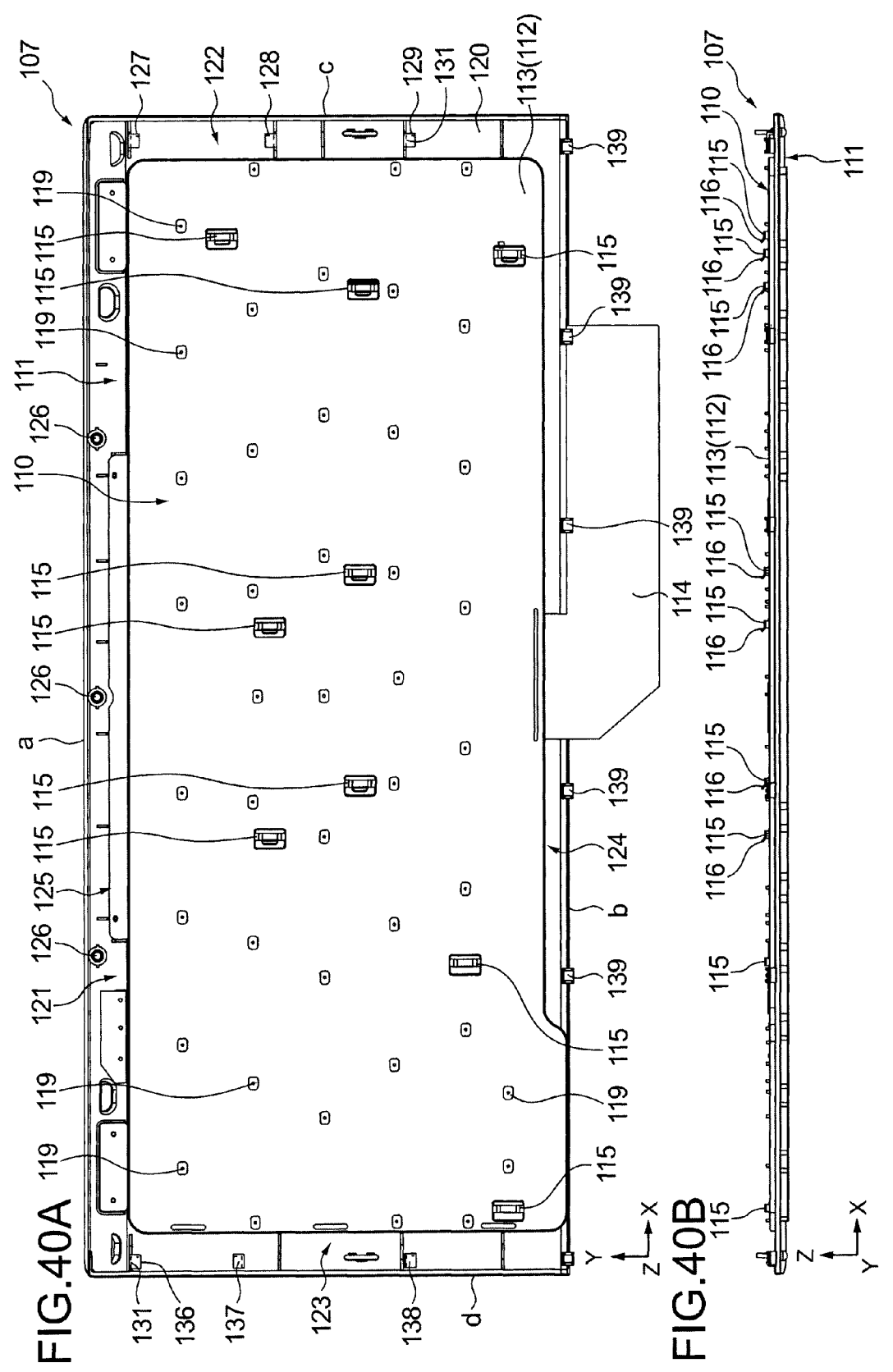

FIG. 39 is a plan view of the keyboard unit 107, and FIGS. 40A and 40B are a bottom view and a side view of the keyboard unit 107, respectively.

The keyboard unit 107 includes a keyboard main body 110 and a keyboard bezel 111. The keyboard main body 110 and the keyboard bezel 111 are connected at a plurality of welded portions 119 as shown in FIG. 40A.

As shown in FIG. 39, the keyboard main body 110 includes a plurality of keys 109 on an upper surface side of the keyboard main body 110 and a backing plate 113 on a side of a bottom surface 112 of the keyboard main body 110, for example. The keyboard main body 110 functions as an input portion of the electronic device 101 and incorporates a sheet switch (not shown) or the like that is formed of, e.g., PET. From the sheet switch of the keyboard main body 110, a flexible wiring substrate 114 is typically fed out to the outside of the keyboard main body 110. On the bottom surface 112 of the backing plate 113, a plurality of protrusion portions 115 are provided.

The protrusion portions 115 are used for fixing the keyboard unit 107 and the main body unit 108 with each other as described later. As shown in FIG. 40A, the protrusion portions 115 are provided on an area away from respective sides a, b, c, and, d of the keyboard unit 107, for example. The protrusion portions 115 are typically dispersedly provided in areas including a center area of the backing plate 113. The protrusion portions 115 typically have almost the same shape and are directed in the same direction. The protrusion portions 115 are provided so as to protrude from the bottom surface 112 of the backing plate 113, as shown in FIG. 40B.

Figure 41:
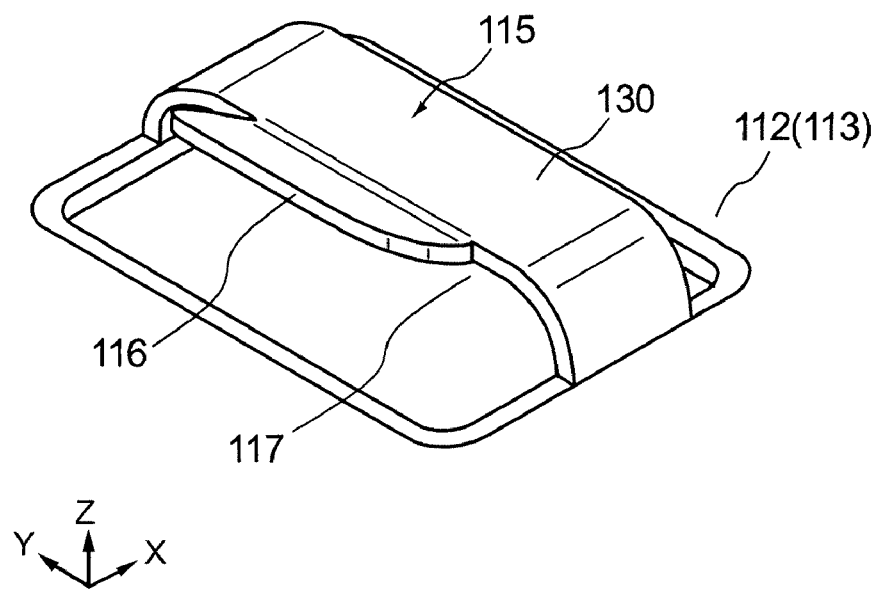
FIG. 41 is a perspective view of a protrusion portion.
Figure 42:
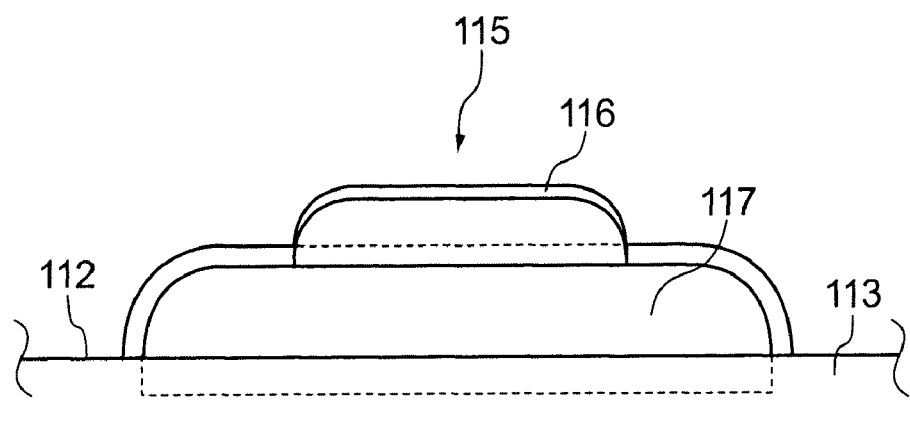
FIG. 42 is a side view of the protrusion portion shown in FIG. 41 when viewed in an X direction.

FIG. 41 is a perspective view of the protrusion portion 115, and FIG. 42 is a side view of the protrusion portion 115 of FIG. 41 when viewed in the X direction.

The protrusion portions 115 each have an approximately flat-topped U-shape. In the protrusion portion 115, an engagement hole 117 that penetrates the protrusion portion 115 in a longitudinal direction (X direction in FIGS. 40A and 41) of the keyboard main body 110 is formed. As shown in FIG. 41, in the protrusion portion 115, an eave portion 116 is provided to a flat portion 130 farthest from the bottom surface 112 of the keyboard main body 110, which is a part of the approximately flat-topped U-shape portion. The cave portion 116 is provided to the flat portion 130 of the protrusion portion 115 so as to project in the longitudinal direction of the keyboard main body 110 (X direction of FIGS. 40 and 41). The depicted cave portion 116 is inclined so that a distance between the cave portion 116 and the bottom surface 112 increases with increasing distance from the flat portion 130 in the longitudinal direction (X direction of FIGS. 40 and 41) of the keyboard main body 110. It should be noted that it is unnecessary to form all the protrusion portions 115 into the same shape.

As shown in FIG. 39, the keyboard bezel 111 is a frame disposed so as to cover the keyboard main body 110 from an upper surface side thereof. As shown in FIG. 39, in the keyboard bezel 111, a plurality of holes 118 into which the plurality of keys 109 of the keyboard main body 110 are fitted. The keys 109 are provided on the upper surface side of the keyboard unit 107 so as to protrude from the surface (upper surface) of the keyboard bezel 111. As shown in FIG. 40A, the keyboard bezel 111 has a rectangular shape larger than an outline of the keyboard main body 110 in the plan view. As shown in FIG. 40A, the keyboard bezel 111 includes an extending area 121 that extends out over a perimeter of the bottom surface 112 of the keyboard main body 110 in a flame-like form when viewed from the bottom surface 120.

The extending area 121 of the keyboard bezel 111 includes areas 122, 123, 124, and 125. The area 122 is provided along a short side c of the keyboard unit 107 and formed into a rectangular shape. The area 123 is provided along a short side d of the keyboard unit 107 and formed into a rectangular shape. The area 124 is provided along a long side b of the keyboard unit 107 and formed into a rectangular shape. The area 125 is provided along a long side a of the keyboard unit 107 and formed into a rectangular shape.

In the area 122 of the keyboard bezel 111, positioning protrusions 127, 128, and 129 are provided. The positioning protrusions 127, 128, and 129 are arranged at approximately regular intervals along the short side c in parallel to the short side c (Y direction in FIG. 40A). It should be noted that the example in which the positioning protrusions 127, 128, and 129 are arranged at the approximately regular intervals in the Y direction is shown, but the embodiment is not limited to this.

Figure 43:
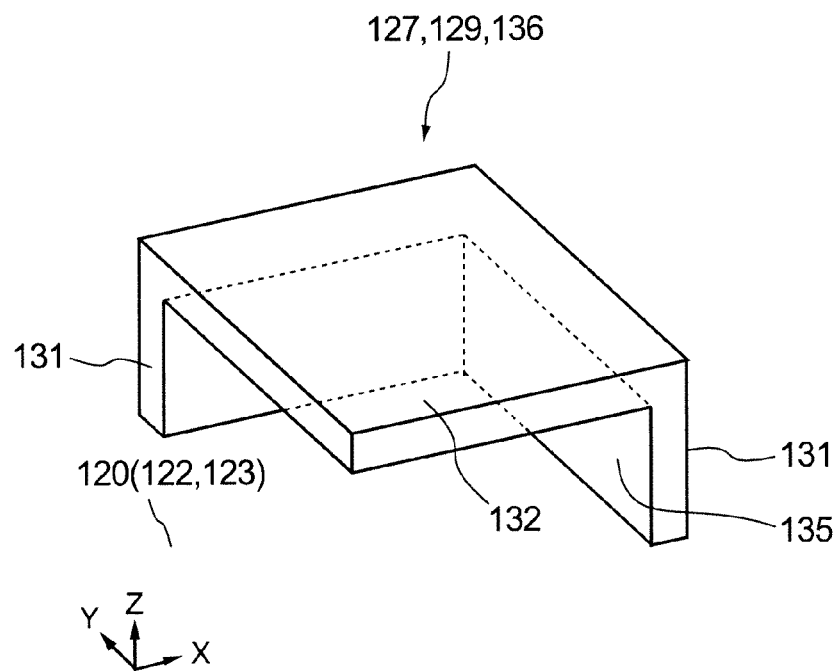
FIG. 43 is a perspective view of positioning protrusions.

FIG. 43 is a perspective view of the positioning protrusions 127, 129, and the like.

The positioning protrusion 129 includes an L-shaped protrusion wall 131 and a rectangular engagement portion 132. The positioning protrusion 129 is formed integrally with the keyboard bezel 111. The L-shaped protrusion wall 131 is protruded from the bottom surface 120 of the keyboard bezel 111 approximately perpendicularly to the bottom surface 120. The rectangular engagement portion 132 is provided at an end of the L-shaped protrusion wall 131 approximately in parallel to the bottom surface 120. The bottom surface 120, the protrusion wall 131, and the engagement portion 132 of the keyboard bezel 111 are structured so that a hole 135 is formed by being surrounded.

As shown in FIG. 40A, the positioning protrusion 128 is provided on the area 122 so that the positioning protrusions 128 and 129 are symmetrical with respect to a line extending in the X direction. As shown in FIG. 40A, the positioning protrusion 127 is provided on the area 122 so as to be directed in the same direction with the positioning protrusion 129. The directions of the positioning protrusions 128 and 129 can be changed as appropriate.

On the area 123 of the keyboard bezel 111, positioning protrusions 136, 137, and 138 protrude. The positioning protrusions 136, 137, and 138 are provided so as to correspond to the positioning protrusions 127, 128, and 129 along the short side d in parallel to the short side d (Y direction in FIG. 40A) at approximately regular intervals. It should be noted that the example in which the positioning protrusions 136, 137, and 138 are provided at the approximately regular intervals in the Y direction are described, but the embodiment is not limited to this. As shown in FIG. 40A, the positioning protrusions 136, 137, and 138 are provided in the area 123 so as to be directed in the same directions as the positioning protrusions 127, 128, and 129, respectively. For example, the positioning protrusion 136 are typically formed into the same shape and directed in the same direction as the positioning protrusions 127 and 129.

In the area 124 of the keyboard bezel 111, a plurality of L-shaped guide members 139 are provided in a direction parallel to the long side b (X direction in FIG. 40A) at predetermined intervals so as to protrude. The example in which the plurality of L-shaped guide members 139 are provided on the long side b at the regular intervals is described, but the embodiment is not limited to this and can be modified as appropriate.

Figure 44:
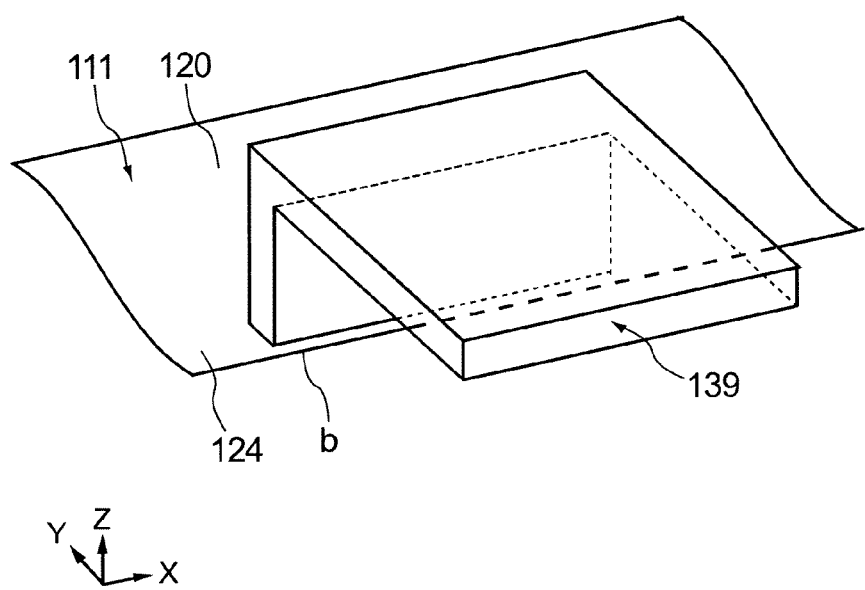
FIG. 44 is a perspective view of a guide member.

FIG. 44 is one example of a perspective view of the guide member 139.

The guide member 139 is formed in the area 124 along the long side b of the rectangular keyboard unit 107 in an upstanding manner from the bottom surface 120 of the keyboard bezel 111 and extends toward the outside of the keyboard unit 107.

As shown in FIG. 40A, in the area 125 of the keyboard bezel 111, a plurality of screw holes 126 are typically formed at predetermined intervals in a direction parallel to the long side a (X direction in FIG. 40A).

Figure 45:
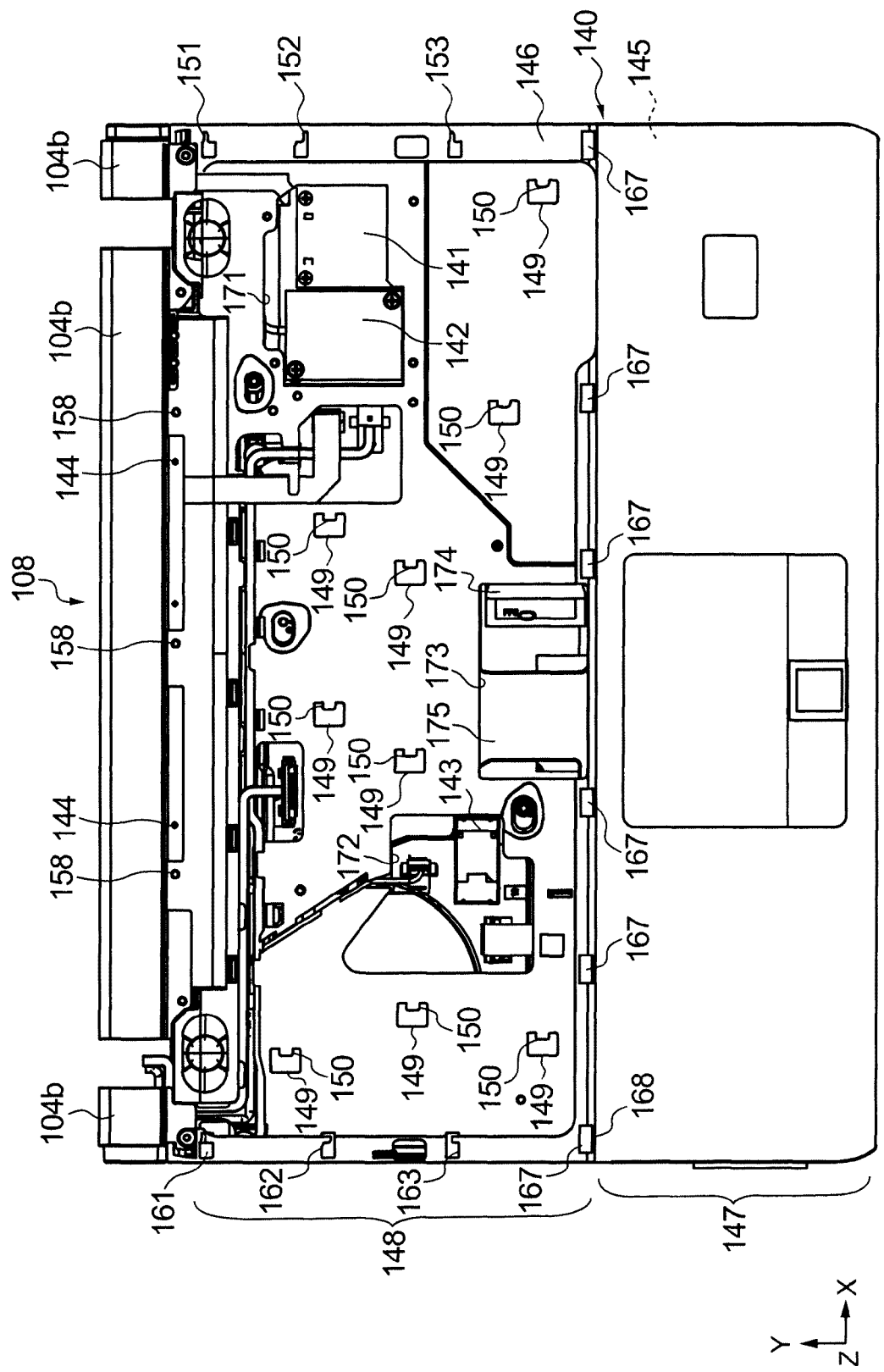
FIG. 45 is a plan view of the main body unit.

FIG. 45 is a plan view of one example of the main body unit 108.

The main body unit 108 includes a main-body-side casing 140, a wireless LAN module 141, a modem module 142, a BLUETOOTH (a short-range radio technology for Internet and mobile devices, aimed at simplifying communications among them) module 143, an LCD (Liquid Crystal Display) unit fixation portion 144, a central processing unit (not shown), and the like. The central processing unit is mounted on a multilayer printed wiring board in the main body unit 108. The central processing unit performs various processings such as a computation processing, a control processing, an image processing, and an output processing to the display portion 102 when receiving an input signal, and thus substantially serves as a functional main part of the electronic device 101.

The main-body-side casing 140 includes a first casing 145 that constitutes the bottom surface side of the main body portion 103 and a palm rest 146 that constitutes the upper surface side of the main body portion 103.

The first casing 145 contains the wireless LAN module 141, the modem module 142, the BLUETOOTH module 143, and the like. The palm rest 146 is fixed to the first casing 145 so as to cover incorporated components (not shown) contained in the first casing 145.

The palm rest 146 includes a palm rest portion 147 and a cover portion 148.

In the palm rest portion 147, for example, a touch pad is typically disposed, and a palm rest area on which a user lays his/her hand is provided on both sides of the touch pad.

The cover portion 148 is typically formed integrally with the palm rest portion 147 and covers the incorporated components (not shown) except for the wireless LAN module 141, the modem module 142, the BLUETOOTH module 143, and the like.

To the cover portion 148, the keyboard unit 107 is provided on a surface (upper surface) 159 thereof. In the cover portion 148, a plurality of insertion holes 149 shown in FIG. 45 are formed at positions corresponding to the plurality of protrusion portions 115 of the keyboard unit 107 shown in FIG. 40A.

Figure 46:
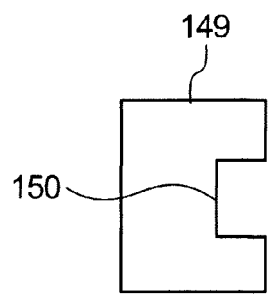
FIG. 46 is an enlarged plan view of an insertion hole.

FIG. 46 is an enlarged plan view of the insertion hole 149.

The insertion hole 149 is formed in the cover portion 148 into an approximately concave shape. When the keyboard unit 107 is fixed to the main body unit 108, the protrusion portions 115 on the keyboard unit 107 side shown in FIG. 40A are inserted into the insertion hole 149 for fixation. The insertion hole 149 (cover portion 148) includes an engagement protrusion 150 that protrudes toward the inside of the insertion hole 149 and is formed into an approximately rectangular shape. The engagement protrusions 150 are fitted to the engagement holes 117 shown in FIG. 42 when the keyboard unit 107 is fixed to the main body unit 108. The insertion or through holes 149 have approximately the same shape. The engagement protrusions 150 have a substantially rectangular shape in this example. But the shape is not limited to this and may instead be a tongue-like shape. With this structure, when the keyboard unit 107 and the main body unit 108 can be more smoothly combined.

On the cover portion 148, positioning holes 151, and 152, and 153 shown in FIG. 45 are formed at positions corresponding to the positioning protrusions 136, 137, and 138 of the keyboard unit 107 shown in FIG. 40A.

Figure 47:
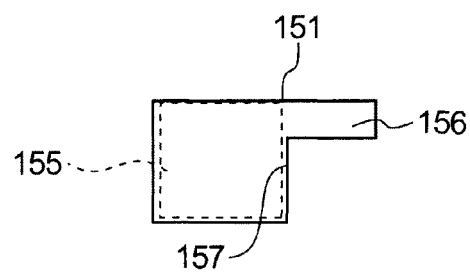
FIG. 47 is an enlarged plan view of a positioning hole.

FIG. 47 is an enlarged plan view of the positioning hole 151.

The positioning hole 151 is formed of an insertion hole 155 and a positioning groove 156. Into the insertion hole 155, the positioning protrusion 136 shown in FIG. 40A is fitted, when the keyboard unit 107 is placed over the main body unit 108 as described later. A planner shape of the insertion hole 155 is nearly the same as the rectangular shape, which is the planner shape of the positioning protrusion 136. Into the positioning groove 156, the protrusion wall 131 of the positioning protrusion 136 shown in FIG. 43 is fitted, when the keyboard unit 107 is slid with respect to the main body unit 108 as described later. As shown in FIG. 47, the positioning hole 151 (cover portion 148) typically includes a protrusion piece 157 that partly constitutes the positioning hole 151. The protrusion piece 157 is superposed with the engagement portion 132 of the positioning protrusion 136 shown in FIG. 43 in a plan view, after the keyboard unit 107 is slid with respect to the main body unit 108 in the longitudinal direction thereof (X direction of FIG. 45). The protrusion piece 157 is set to have the approximately rectangular shape as an example, but the shape is not limited to this as long as the protrusion piece 157 is superposed with the engagement portion 132.

The positioning hole 152 and the positioning hole 151 are symmetrical with respect to a line parallel to the X-axis direction, and the positioning hole 153 has the same shape as the positioning hole 151.

In the cover portion 148, positioning holes 161, 162, and 163 shown in FIG. 45 are formed at positions corresponding to the positioning protrusions 127, 128, and 129 of the keyboard unit 107 shown in FIG. 40A, respectively.

Figure 48:
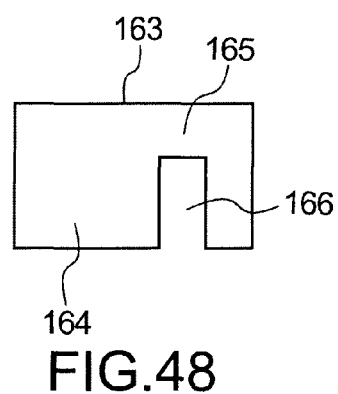
FIG. 48 is an enlarged plan view of a positioning hole.

FIG. 48 is an enlarged plan view of the positioning hole 163.

The positioning hole 163 includes an insertion hole 164 and a positioning hole 165. Into the insertion hole 164, the positioning protrusion 129 shown in FIG. 40A is inserted, when the keyboard unit 107 is placed over the main body unit 108. Into the positioning groove 165, the protrusion wall 131 shown in FIG. 43 is fitted, when the keyboard unit 107 is slid with respect to the main body unit 108 in the longitudinal direction (X direction in FIG. 45) to fix the keyboard unit 107 to the main body unit 108. As shown in FIG. 48, the positioning hole 163 (cover portion 148) includes a protrusion piece 166 that protrudes toward an inside of the positioning hole 163. The positioning hole 162 and the positioning hole 163 are symmetrical with respect to line parallel to the X direction. The positioning hole 161 has the same shape as the positioning hole 151. The protrusion piece 166 is set to have an approximately rectangular shape as an example, but the shape of the protrusion piece 166 is not limited to this.

In the cover portion 148, a plurality of guide grooves 167 shown in FIG. 45 are formed at positions corresponding to the plurality of guide members 139 of the keyboard unit 107 shown in FIG. 40A. The guide grooves 167 can be inserted to the guide members 139, and the guide members 139 to which the guide grooves are inserted can be moved in the longitudinal direction of the keyboard unit 107.

Figure 49:
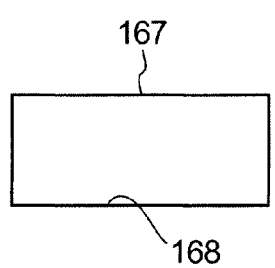
FIG. 49 is an enlarged plan view of a guide groove.

FIG. 49 is one example of an enlarged plan view of the guide groove 167.

The guide groove 167 (cover portion 148) includes a guide rail 168 for guiding the guide member 139. The guide rail 168 is formed by a portion provided along an outer side of the guide groove 167. The guide groove 167 is set to have the approximately rectangular shape as an example, but the shape is not limited to this. The guide groove 167 may include a groove (not shown) as in the case where the positioning hole 151 shown in FIG. 47 includes the positioning groove 156. With this structure, the guide member 139 can be guided in a direction along the groove (not shown).

In the cover portion 148, a plurality of screw holes 158 are formed at positions corresponding to the plurality of screw holes 126 of the keyboard unit 107. Through the screw holes 158, the cover portion 148 is penetrated. The keyboard unit 107 and the main body unit 108 are secured to each other by screws (not shown) screwed into the screw holes 126 and 158.

As shown in FIG. 45, in the cover portion 148, openings 171, 172, and 173 are formed.

The opening 171 is formed at a position corresponding to the wireless LAN module 141 and the modem module 142 that are incorporated in the main-body-side casing 140. The opening 171 allows an operator to easily access the wireless LAN module 141 and the modem module 142. The opening 172 is formed at a position corresponding to the BLUE-TOOTH module 143. The opening 172 allows the operator to easily access the BLUETOOTH module 143. The opening 173 is formed at a position corresponding to a connection terminal portion 174 to which the flexible wiring substrate 114 is connected. The opening 173 allows the operator to easily access the connection terminal portion 174. The connection terminal portion 174 is a terminal to which the flexible wiring substrate 114 shown in FIG. 39 is connected. On the first casing 145 side of the opening 173, a containing portion 175 in which the flexible wiring substrate 114 is contained is provided. The shapes of the openings 171, 172, and 173 can be changed as appropriate. For example, by setting the opening 171 to have at least the same area as the planner shape of the wireless LAN module 141 and the modem module 142, the operator can more easily perform a replacement operation of the modules. The same holds true for the openings 172 and 173.

As shown in FIG. 45, the connection portions 104b of the main-body-side casing 140 that constitute the hinge 104 are screwed to be connected with the connection portions 104a shown in FIG. 36 that are attached to the display portion 102 side, thereby forming the hinge 104.

Figure 50:
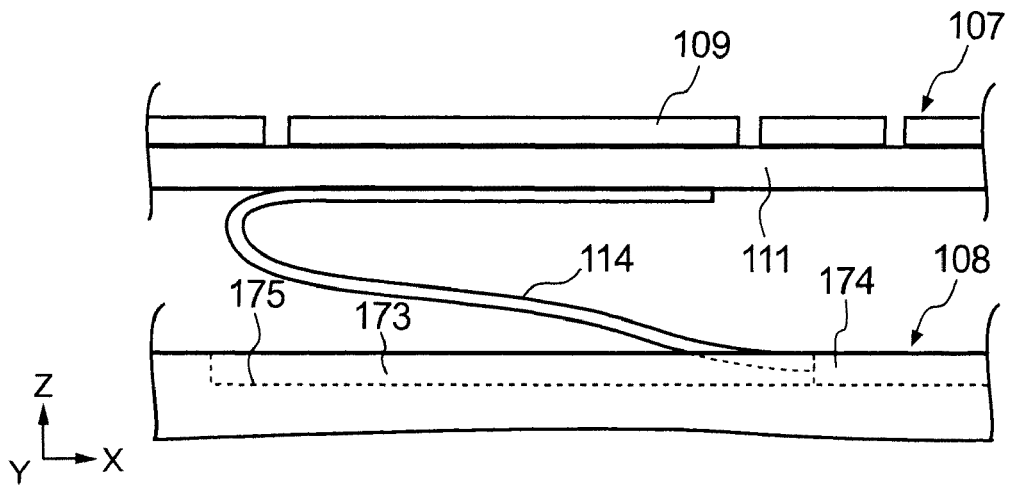
FIG. 50 is a view showing a state where the keyboard unit and the main body unit are connected through a flexible wiring substrate.

FIG. 50 is a view showing a state where the keyboard unit 107 and the main body unit 108 are connected through the flexible wiring substrate 114.

One end of the flexible wiring substrate 114 is connected to the keyboard unit 107 side, and the other end as the connection terminal portion is connected to the connection terminal portion 174 of the main body unit 108. The flexible wiring substrate 114 is bent into an approximately U shape in a side view. The flexible wiring substrate 114 is drawn along the keyboard unit 107 in a direction in which the keyboard unit 107 is slid (−X direction in FIG. 50), bent, and drawn in an opposite direction (+X direction in FIG. 50) toward the main body unit 108. When the keyboard unit 107 is placed over the main body unit 108 and fixed thereto, the flexible wiring substrate 114 are folded and contained in the containing portion 175 of the main body unit 108. The flexible wiring substrate 114 is typically formed into an approximately U shape as shown in FIG. 50 as an example, but may be bent into an inverse U shape in the X direction in FIG. 50.

Next, a manufacturing method (assembling method) of the electronic device 101 will be described.

Figure 51:
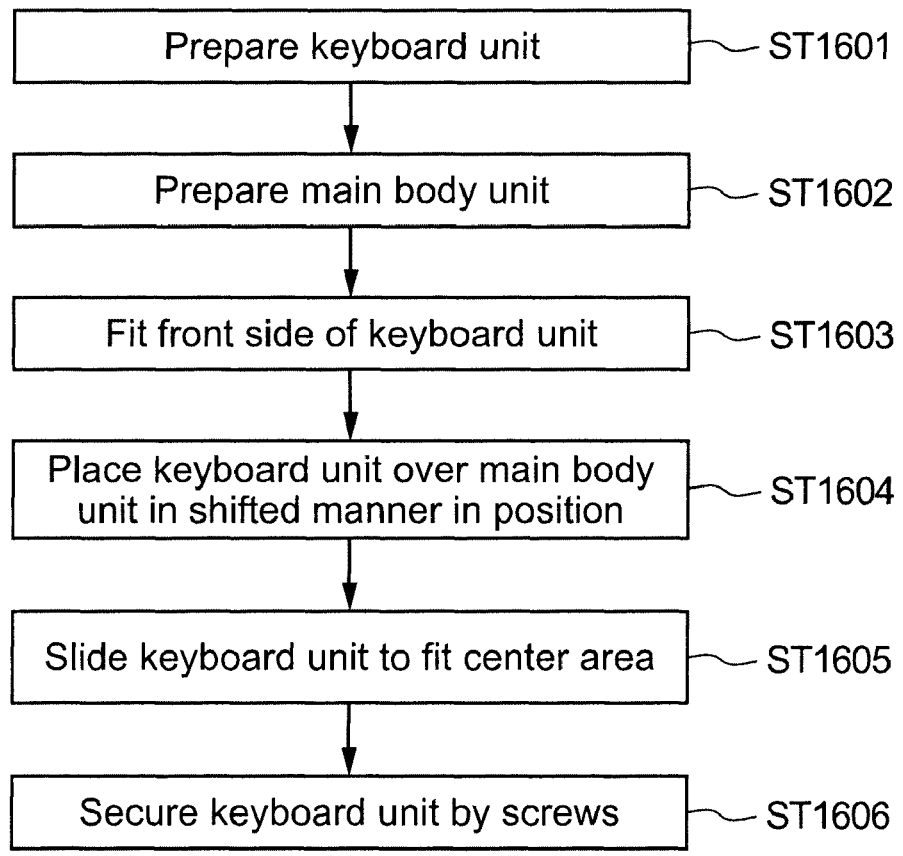
FIG. 51 is a flowchart showing manufacturing steps of the electronic device.

FIG. 51 is a flowchart showing manufacturing steps of the electronic device 101.

The keyboard unit 107 shown in FIG. 40A is prepared (ST1601). For example, as shown in FIG. 40A, the keyboard main body 110 and the keyboard bezel 111 are aligned at a predetermined position and typically fixed by welding at the plurality of welding positions 119, thereby preparing the keyboard unit 107.

The main body unit 108 shown in FIG. 45 is prepared (ST1602). For example, as shown in FIG. 45, in the first casing 145, the wireless LAN module 141, the modem module 142, the BLUETOOTH module 143, and the like are incorporated, and the casing 45 is covered with the palm rest 146. The connection portions 104b is secured to the LCD unit fixation portions 144, and the connection portions 104b as the power switch is screwed to the palm rest 146, for example, thereby preparing the main body unit 108. It should be noted that either of the keyboard unit 107 or the main body unit 108 may be prepared first.

In this state, as shown in FIG. 45, the wireless LAN module 141 and the modem module 142 are exposed from the opening 171, and the BLUETOOTH module 143 are exposed from the opening 172. Further, the connection terminal portion 174 is exposed from the opening 173.

A combining (fixing) process between the keyboard unit 107 and the main body unit 108 will now be described.

The guide members 139 of the keyboard unit 107 shown in FIG. 40A are fitted into the guide groove 167 of the main body unit 108 shown in FIG. 45 (front side of the keyboard unit 107 is fitted into the main body unit 108) (ST1603).

The keyboard unit 107 is placed over the main body unit 108 with the keyboard unit 107 being shifted in the X direction with respect to the main body unit 108. As a result, the positioning protrusions 136, 137, 138, 127, 128, and 129 and the protrusion portions 115 of the keyboard unit 107 are inserted into the positioning holes 151, 152, 153, 161, 162, and 163 and the insertion holes 149 of the main body unit 108, respectively (ST1604).

Figure 52:
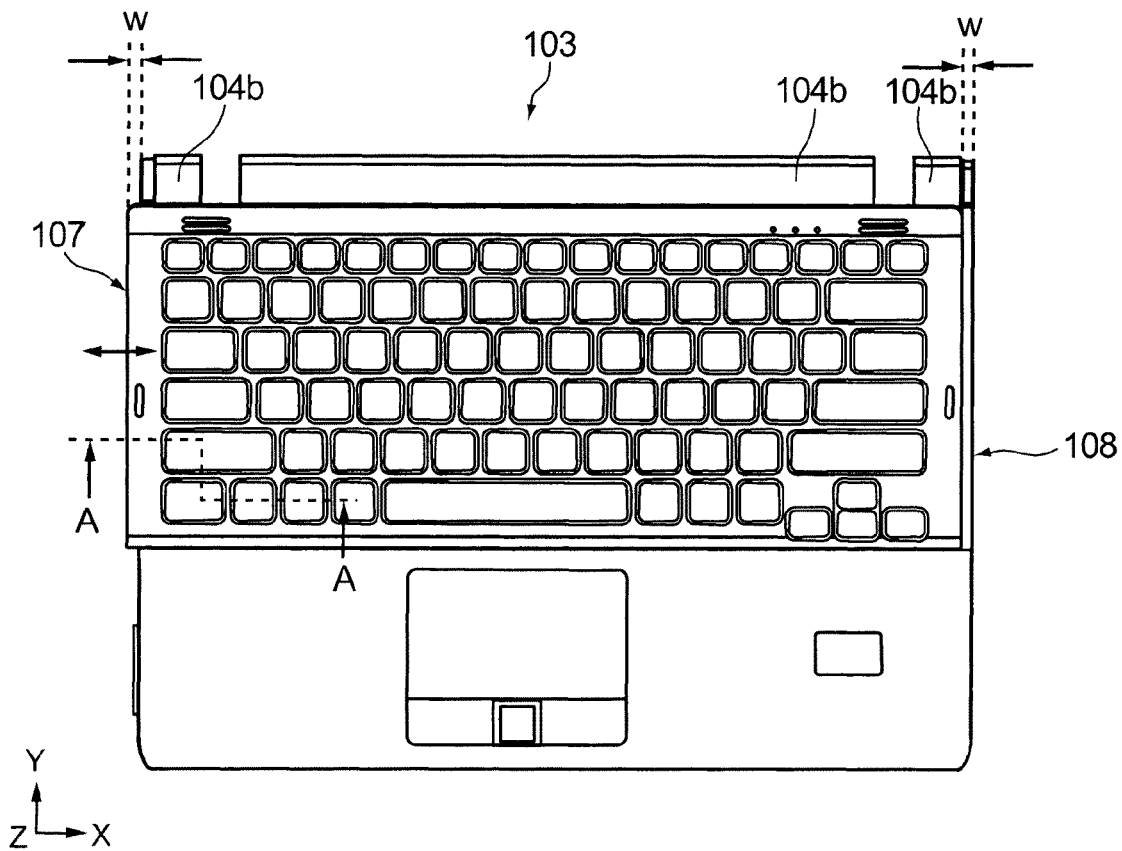
FIG. 52 is a plan view when the keyboard unit is placed over the main body unit.
Figure 53:
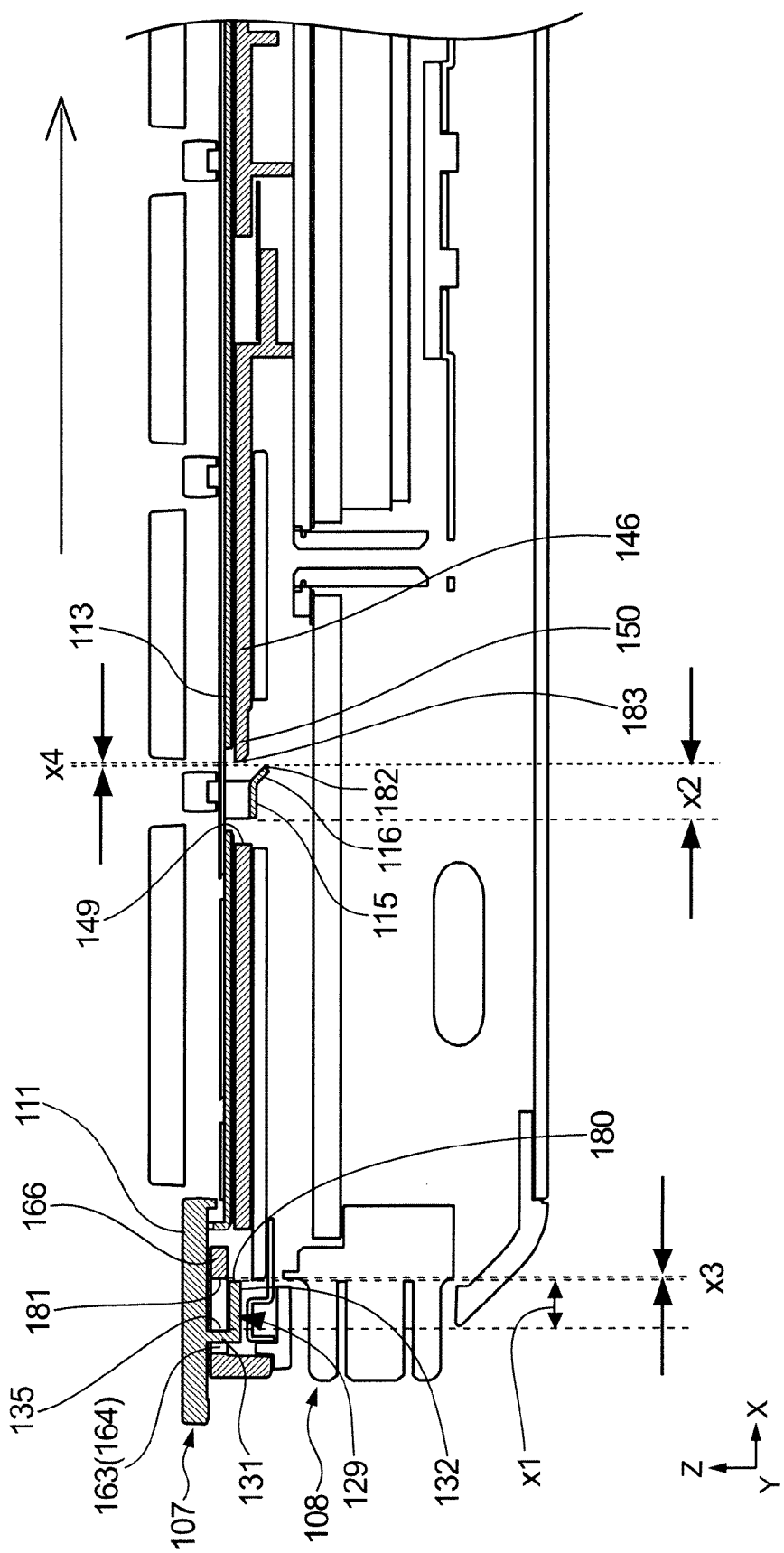
FIG. 53 is a cross-sectional view taken along the line A-A of FIG. 52.

FIG. 52 is a plan view when the keyboard unit 107 is placed over the main body unit 108, and FIG. 53 is a cross-sectional view taken along the line A-A of FIG. 52.

Here, as shown in FIG. 52, the keyboard unit 107 is fitted to the main body unit 108 with the keyboard unit 107 being shifted with respect to the main body unit 108 in the longitudinal direction (X direction in FIG. 52) of the keyboard unit 107 by a predetermined length w. For example, as shown in FIG. 53, into (the insertion hole 164 of) the positioning hole 163 of the palm rest 146 of the main body unit 108, the positioning protrusion 129 of the keyboard bezel 111 of the keyboard unit 107 is fitted. The protrusion portion 115 that protrudes from the backing plate 113 of the keyboard unit 107 is fitted into the insertion hole 149 of the palm rest 146 of the main body unit 108. In the same way, the positioning protrusion 136 of the keyboard bezel 111 shown in FIG. 40A is fitted into the positioning hole 151 shown in FIG. 45.

As shown in FIG. 53, a length x1 of the engagement portion 132 of the positioning protrusion 129 in the X direction is set to 2.85 mm, and a length x2 of the protrusion portion 115 in the X direction is set to 2.87 mm, for example. In this case, a distance x3 between an end 180 of the engagement portion 132 and a side surface 181 of the protrusion piece 166 that is opposed to the protrusion wall 131 is set to 0.15 mm, and a distance x4 between an end 182 of the eave portion 116 of the protrusion 15 and an end 183 of the engagement protrusion 150 in the X direction is set to 0.13 mm, for example.

In the state where the keyboard unit 107 is shifted with respect to the main body unit 108 in the X direction by the length was shown in FIG. 52, the keyboard unit 107 is slid with respect to the main body unit 108 in the longitudinal direction (X direction in FIG. 52) of the keyboard unit 107 (ST1605).

At this time, the guide member 139 is guided in the longitudinal direction of the keyboard unit 107 while the L-shaped guide member 139 shown in FIG. 40A is being engaged with the guide rail 168 shown in FIG. 45. As a result, as shown in FIG. 53, first, the protrusion piece 166 is fitted into the hole 135 of the positioning protrusion 129 from the side surface 181 thereof (the same holds true for the other positioning protrusions 127, 136, and the like). Some time later, the eave portion 116 of the protrusion portion 115 guides the engagement protrusion 150 to the engagement hole 117 of the protrusion portion 115, and thus the engagement protrusion 150 is fitted into the engagement hole 117.

Figure 54:
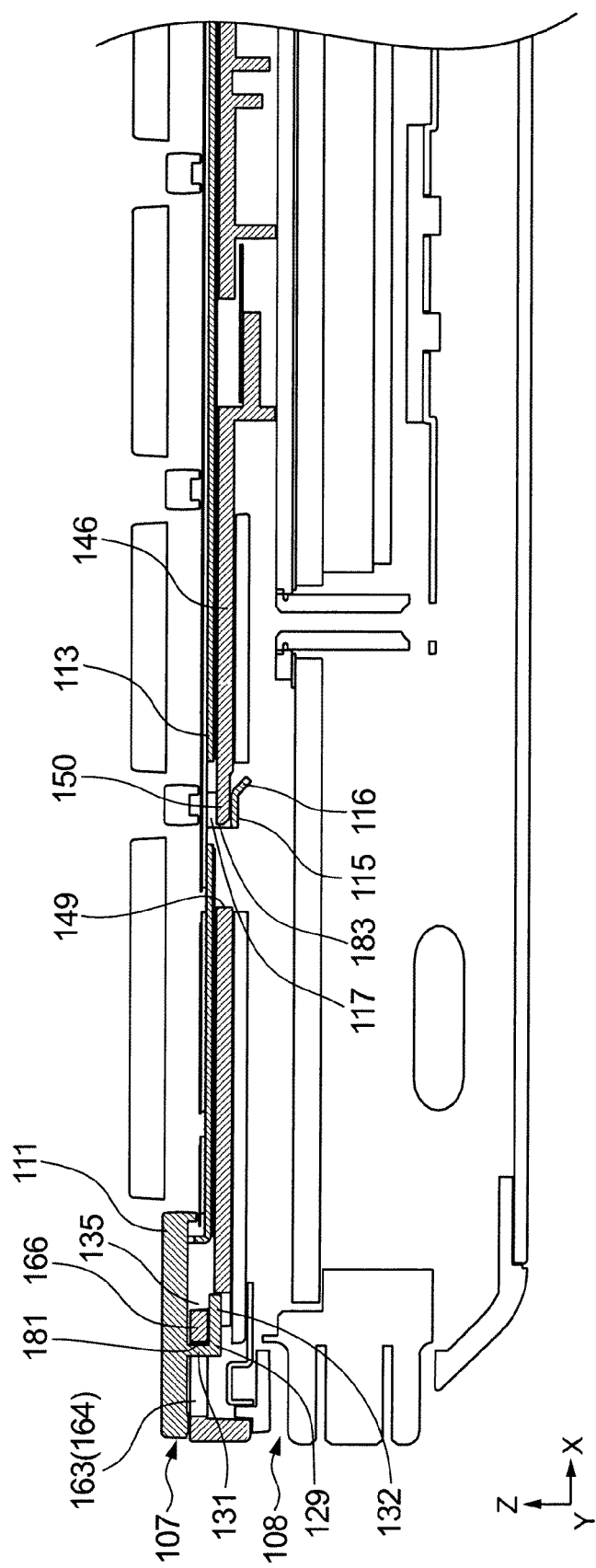
FIG. 54 is a partial cross-sectional view showing a state where the keyboard unit is fixed to the main body unit by being slid.

FIG. 54 is a partial cross-sectional view showing a state where the keyboard unit 107 is fixed to the main body unit 108 by being slid.

As shown in FIG. 54, for example, the side surface 181 of the protrusion piece 166 is contacted with the protrusion wall 131 of the positioning protrusion 129, thereby stopping the slide of the keyboard unit 107. Thus, the protrusion piece 166 is fitted into the hole 135 of the positioning protrusion 129, and the engagement protrusion 150 is fitted into the engagement hole 117 of the protrusion portion 115.

The keyboard unit 107 and the main body unit 108 are secured to each other by screws (not shown) through the plurality of screw holes 126 shown in FIG. 40A and the plurality of screw holes 158 shown in FIG. 45 (ST1606).

As described above, the positioning protrusions 136 and 127 and the protrusion portion 115 of the keyboard unit 107 are fixed to the positioning holes 151 and 161 and the insertion hole 149 of the main body unit 108, respectively, thereby fixing the keyboard unit 107 and the main body unit 108 to each other.

As described above, according to this embodiment, the guide member 139 of the keyboard unit 107 shown in FIG. 40A is fitted into the guide groove 167 of the main body unit 108 shown in FIG. 45 (ST1603), and as shown in FIG. 52, the keyboard unit 107 can be placed over the main body unit 108 with the keyboard unit 107 being shifted with respect to the main body unit 108 in the X direction by the length w. As a result, the positioning protrusions 136 and 127 and the protrusion portion 115 of the keyboard unit 107 can be fixed to the positioning holes 151 and 161 and the insertion hole 149 of the main body unit 108, respectively (ST1604). The keyboard unit 107 is slid in the longitudinal direction (X direction in FIG. 52) of the keyboard unit 107 (ST1605). As a result, the guide member 139 shown in FIG. 40A can be guided in the longitudinal direction of the keyboard unit 107 while the guide member 139 is being engaged with the guide rail 168 shown in FIG. 45. Therefore, as shown in FIG. 53, first, the protrusion piece 166 can be fitted into the hole 135 of the positioning protrusion 129 from the side surface 181. Some time later, the eave portion 116 of the protrusion portion 115 guides the engagement protrusion 150 to the engagement hole 117 of the protrusion portion 115, and thus the engagement protrusion 150 can be fitted into the engagement hole 117. As a result, the keyboard unit 107 can be fixed to the main body unit 108 through the positioning holes 151 and 161, the plurality of insertion holes 149, and the like shown in FIG. 45.

In other words, first, the guide member 139, the positioning protrusions 136 and 127, and the like are positioned in the vicinity of an outer periphery of the keyboard unit 107, in which the operator can easily perform the positioning. With this state being kept, the operator can cause the engagement hole 117 of the protrusion portion 115 to be engaged with the engagement protrusion 150 of the insertion hole 149 within the keyboard unit 107 where it is relatively difficult for the operator to perform the positioning. Accordingly, when the keyboard unit 107 is mounted on the main body unit 108, it can be prevented that the engagement hole 117 fails to be engaged with the engagement protrusion 150 of the insertion hole 149 in a center area of the keyboard unit 107 and a space is left in the center area.

For detaching the keyboard unit 107 from the main body unit 108, the keyboard unit 107 is slid with respect to the main body unit 108 in an opposite direction in which the keyboard unit 107 is slid to be fixed. With this operation, the protrusion portion 115 shown in FIG. 54 is detached from the engagement protrusion 150, and the positioning protrusion 129 is detached from the protrusion piece 166 (the state where the keyboard unit 107 is shifted from the main body unit 108 shown in FIG. 52 is recovered). After that, the positioning protrusions 136 and 127, the protrusion portion 115, and the like of the keyboard unit 107 can be removed from the positioning holes 151 and 161, the insertion hole 149, and the like of the main body unit 108.

As described above, the keyboard unit 107 can be relatively easily attached/detached. Further, the keyboard unit 107 can be fixed to the main body unit 108 at the portions in the areas 122 and 123 along the short sides c and d of the keyboard unit 107, respectively, and in the inner area of the keyboard unit 107 away from the sides a to d thereof. Therefore, a rigidity of the keyboard can be increased and a desirable keystroke feeling can be obtained.

For replacement of the keyboard unit 107, the keyboard unit 107 can be detached and replaced without removing the palm rest 146. For replacement of the wireless LAN module 141, the modem module 142, the BLUETOOTH module 143, and the LCD unit, the keyboard unit 107 is detached, and the wireless LAN module 141 and the modem module 142 can be replaced through the opening 171, and the BLUETOOTH module 143 can be replaced through the opening 172. As a result, time required for assembling the keyboard unit 107 and the respective modules or replacing them can be reduced.

Figure 55:
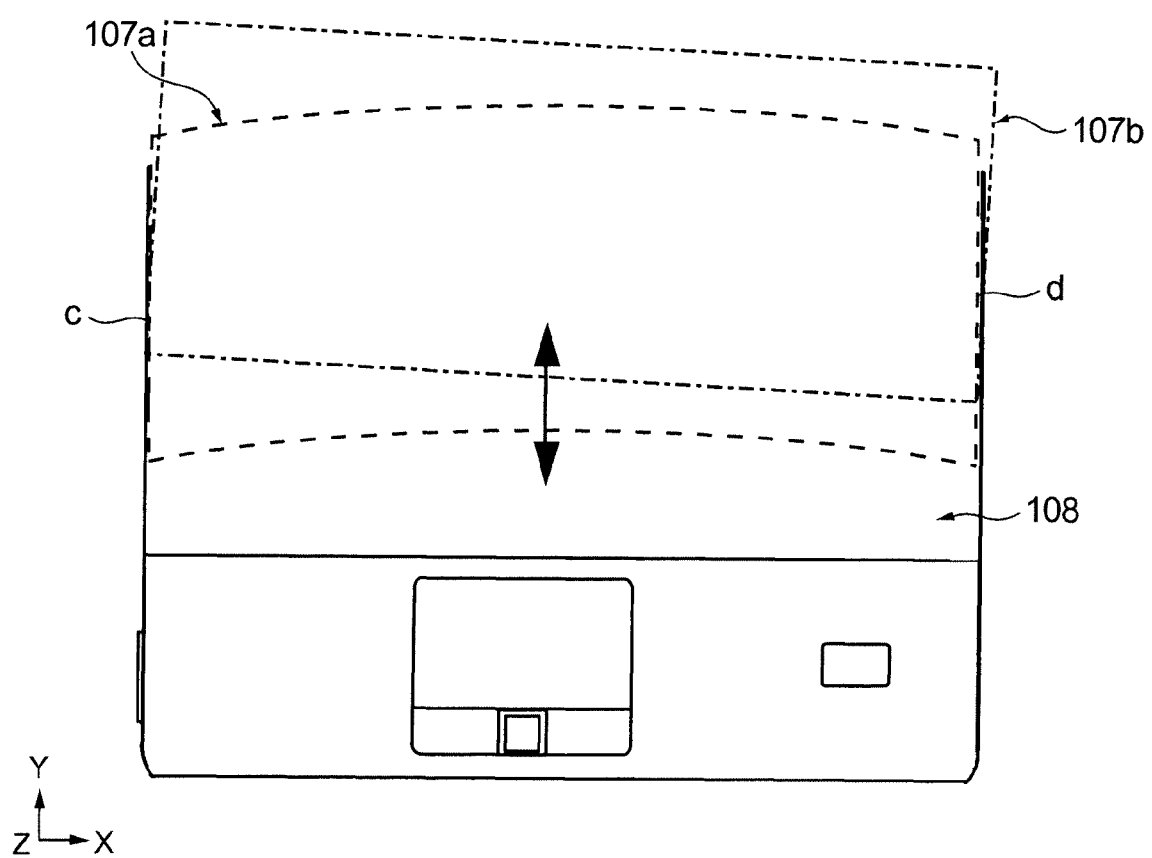
FIG. 55 is a diagram illustrating a case where the keyboard unit is slid in a short-side direction of the keyboard unit.

FIG. 55 is a diagram illustrating a case where the keyboard unit 107 is slid in a short-side direction of the keyboard unit 107.

As shown in FIG. 55, a case where the keyboard unit 107 is slid in a direction (Y direction in FIG. 55) perpendicular to the longitudinal direction (X direction in FIG. 55) of the keyboard unit 107 to be fitted to the main body unit 108 is considered. In this case, when the keyboard unit 107 and the main body unit 108 are aligned, the short sides c and d of the keyboard unit 107 are set apart, which may cause the keyboard unit 107 to sag like a keyboard unit 107a shown in FIG. 55, making it difficult to fit the positioning protrusions 127 and 136 into the positioning holes 161 and 151. In addition, when the keyboard unit 107 (107a, 107b) is slid in the Y direction, because the short sides c and d are set apart, which may make it difficult or impossible to press the short side c and the short side d with the same force, resulting in diagonal slide like the keyboard unit 107b shown in FIG. 55. Thus, in this case, it takes a long time to align the keyboard unit 107 and the main body unit 108.

In this embodiment, by inserting the L-shaped guide members 139 into the guide grooves 167 and placing the keyboard unit 107 over the main body unit 108, the keyboard unit 107 and the main body unit 108 can be more easily aligned. Accordingly, the keyboard unit 107 can be prevented from sagging when the keyboard unit 107 and the main body unit 108 are aligned. In addition, when the keyboard unit 107 is slid, the keyboard unit 107 can be fixed to the main body unit 108 without sagging the short sides c and d because the long sides a and b are not away from each other as compared to the short sides c and d.

Figure 56:
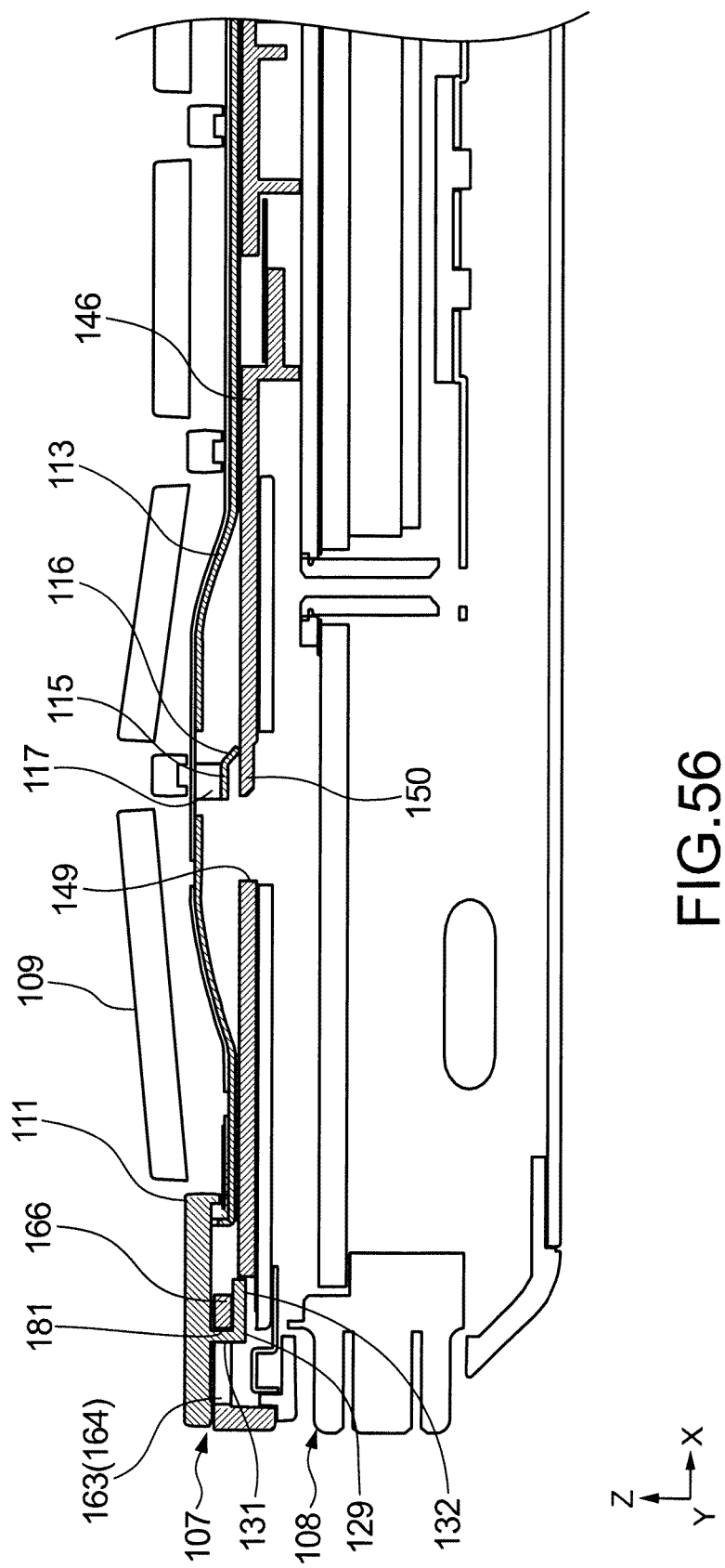
FIG. 56 is a view showing a state where the protrusion portion is run on a palm rest.

FIG. 56 is a view showing a state where the protrusion portion 115 is run on the palm rest 146.

The eave portion 116 of the protrusion portion 115 is inclined in a manner that the eave portion 116 is gradually distanced from the bottom surface 112 with increasing distance from the flat portion 130 in the longitudinal direction (X direction in FIG. 41) of the keyboard main body 110. The flat portion 130 is furthest from the bottom surface 112 in the approximately flat-topped U-shape of the protrusion portion 115.

Here, a case where the protrusion portion 115 is not inserted into the insertion hole 149 of the palm rest 146 but is run on the palm rest 146 as shown in FIG. 56 when the keyboard unit 107 is overlapped with the main body unit 108 and slid will be considered. In this case, as compared to a case where the eave portion 116 is not provided, a portion of the keyboard unit 107 that corresponds to the protrusion portion 115 that is run on the palm rest 146 banks by the height of the eave portion 116. Accordingly, the operator can easily and positively find out that the engagement protrusion 150 is not fitted into the engagement hole 117 of the protrusion portion 115.

One end of the flexible wiring substrate 114 is connected to the keyboard main body 110 side and the other end thereof is connected to the main body unit 108 side. Before the keyboard unit 107 is superposed on the main body unit 108, the flexible wiring substrate 114 is folded into a shape concave toward the longitudinal direction of the keyboard unit 107 as shown in FIG. 50. When the keyboard unit 107 is fixed to the main body unit 108, the flexible wiring substrate 114 is folded and contained into the containing portion 175 of the main body unit 108.

With this structure, for example, when the keyboard unit 107 is slid to be fixed to the main body unit 108 (ST1605), the flexible wiring substrate 114 is smoothly deformed. Thus, the flexible wiring substrate 114 can be prevented from being subjected to pressure application and can be contained into the containing portion 175 in the folded state. Therefore, it can be prevented that the flexible wiring substrate 114 is stuck between the keyboard unit 107 and the main body unit 108 and is damaged, when the keyboard unit 107 is slid.

The present invention is not limited to the above embodiment, and may be variously modified within the scope of the technical idea thereof to be carried out. The scope of carrying out the present invention belongs to the technical range of the present invention.

In the above embodiment, as shown in FIG. 53, when the keyboard unit 107 is slid with respect to the main body unit 108, first, the protrusion piece 166 is fitted into the hole 135 of the positioning protrusion 129 from the side surface 181 thereof. Some time later, the engagement protrusion 150 of the insertion hole 149 is inserted into the engagement hole 117 of the protrusion portion 115. But, the present invention is not limited to this. For example, the protrusion piece 166 may be fitted into the hole 135 of the positioning protrusion 129 nearly at the same time when the engagement protrusion 150 of the insertion hole 149 is inserted into the engagement hole 117 of the protrusion portion 115.

In the above embodiment, as shown in FIGS. 41 and 42, the protrusion portion 115 includes the eave portion 116. But, the protrusion portion 115 may not include the eave portion 116. Further, the eave portion 116 is inclined in the manner that the eave portion 116 is gradually distanced from the bottom surface 112 with increasing distance from the flat portion 130 in the longitudinal direction (X direction in FIGS. 40 and 41) of the keyboard main body 110. An inclination angle of the eave portion 116 is not particularly limited. By increasing the inclination angle, the portion of the keyboard unit 107 that corresponds to the protrusion portion 115 run on the palm rest 146 further banks in the case where the protrusion portion 115 is not inserted into the insertion hole 149 of the palm rest 146 and run on the palm rest 146 as shown in FIG. 56. Thus, the operator can more positively combine the keyboard unit 107 and the main body unit 108 and fix them to each other.

In the above embodiment, as shown in FIG. 53, the length x1 of the engagement portion 132 of the positioning protrusion 129 is set to 2.85 mm, and the length x2 of the protrusion portion 115 is set to 2.87 mm. However, the length x1 of the engagement portion 132 and the length x2 of the protrusion portion 115 are merely an example, and are not limited to those.

In the above embodiment, the keyboard unit 107 placed over the main body unit 108 as shown in FIGS. 52 and 53 is slid rightwards as shown in FIG. 54 so that the keyboard unit 107 covers the main body unit 108 as shown in FIG. 54.

Alternatively, the keyboard unit 107 may be slid leftwards with respect to the main body unit 108.

In the above embodiment, the present invention is applied to the laptop personal computer. However, the present invention is not limited to this, and may be applied to another electronic device in which a structure like the keyboard unit 107 having the keys can be detachably attached to a main body of the apparatus.

The invention claimed is:

1. A keyboard, comprising: a keyboard unit configured in the shape of a rectangle and including a first surface and a second surface, the first surface including at least one key disposed thereon, the second surface including at least one protrusion portion that protrudes from the second surface, the protrusion portion including an engagement hole open toward a first direction that corresponds to a longitudinal direction of the keyboard unit; and a casing including a third surface on which the keyboard unit is configured to mount, the third surface including at least one insertion hole into which the protrusion portion is configured to be inserted, the casing including at least one engagement protrusion provided at a position configured to oppose the engagement hole of the protrusion portion that is inserted into the insertion hole, the engagement protrusion engaging with the engagement hole of the inserted protrusion portion, in a direction opposite the first direction, when the keyboard unit is moved in the first direction, such that the engagement protrusion enters the engagement hole from a direction opposite the first direction, wherein the engagement hole is a through-hole extending in the first direction.

2. The keyboard according to claim 1,
wherein at least one protrusion portion is provided in each of a first area and a second area, the first area being located along at least one of two short sides of the rectangle, the second area being located inside the rectangle and offset from each side of the rectangle,
wherein the insertion hole is formed at a position configured to overlap the protrusion portion when the keyboard is in a state coupled to the casing, and
wherein the engagement hole of the protrusion portion provided in the first area is brought into contact with the engagement protrusion engaged with the insertion hole corresponding thereto before the engagement hole of the protrusion portion provided in the second area is brought into contact with the engagement protrusion engaged with the insertion hole corresponding thereto, when the keyboard unit is moved in the first direction.

3. The keyboard according to claim 1, further comprising:
an eave portion configured to guide the engagement protrusion to the engagement hole of the protrusion portion when the keyboard unit is moved in the first direction, the eave portion being provided on the protrusion portion and extending from the protrusion portion in the first direction.

4. The keyboard according to claim 3,
wherein the eave portion is inclined so as to increase in distance from the engagement protrusion with increasing distance from the protrusion portion in the first direction.

5. The keyboard according to claim 1, further comprising:
a guide member having an L shape that protrudes outward from the keyboard unit, the guide member being provided in a third area located along a first side of two long sides of the rectangle of the keyboard unit;
a guide groove provided at a position corresponding to the guide member in the casing, the guide groove being configured to receive the guide member and to allow the inserted guide member to move in the first direction; and
a guide rail configured to guide the guide member in the first direction with the guide rail being engaged with the guide member, the guide rail being provided along an outer side of the guide groove,
wherein the keyboard unit includes a first screw hole in a fourth area located along a second side of the two long sides of the rectangle, and
wherein the casing has a second screw hole that penetrates the casing, the second screw hole being disposed at a position overlapping to the first screw hole when the keyboard is in a state coupled to the casing,
the keyboard further including a screw that is screwed into the first screw hole through the second screw hole.

6. The keyboard according to claim 1, further comprising:
a flexible wiring substrate configured to electrically connect the keyboard unit and the casing, the flexible wiring substrate being folded into a concave shape concaved toward the first direction; and
a containing portion configured to receive the flexible wiring substrate, the containing portion being provided in the casing.

7. The keyboard according to claim 1, wherein the protrusion portion has a substantially U-shape.

8. An electronic device, comprising: a keyboard unit that is formed into a rectangle and includes a first surface and a second surface, the first surface including at least one key disposed thereon, the second surface including a protrusion portion that protrudes from the second surface, the protrusion portion including an engagement hole extending toward a first direction that corresponds to a longitudinal direction of the rectangle; a first casing including a third surface on which the keyboard unit is configured to mount, the third surface including at least one insertion hole into which the protrusion portion is configured to be inserted, the first casing including an engagement protrusion provided at a position configured to oppose the engagement hole of the protrusion portion that is inserted into the insertion hole, the engagement protrusion engaging with the engagement hole of the inserted protrusion portion, in a direction opposite the first direction, when the keyboard unit is moved in the first direction, such that the engagement protrusion enters the engagement hole from a direction opposite the first direction; and a second casing including a display portion configured to face the keyboard unit when closed with respect to the first casing, the second casing being pivotably attached to the first casing, wherein the engagement hole is a through-hole extending in the first direction.

9. The keyboard according to claim 8, wherein the protrusion portion has a substantially U-shape.

10. A keyboard manufacturing method, comprising: preparing a keyboard unit configured in the shape of a rectangle and including a first surface and a second surface and a casing including a third surface, the first surface including at least one key disposed thereon, the second surface including a protrusion portion protruding from the second surface, the protrusion portion including an engagement hole open toward a first direction parallel to a longitudinal direction of the keyboard, the third surface including an insertion hole into which the protrusion portion is configured to be inserted, the casing including an engagement protrusion provided at a position opposed to the engagement hole of the protrusion portion that is inserted into the insertion hole; inserting the protrusion portion into the insertion hole; and engaging the engagement hole with the engagement protrusion by moving the keyboard unit in the first direction such that the engagement protrusion enters the engagement hole from a direction opposite the first direction, wherein the engagement hole is a through-hole extending in the first direction.

11. The keyboard manufacturing method according to claim 10,
  wherein, during inserting the protrusion portion into the insertion hole, a guide member is inserted into a guide groove provided at a position corresponding to the guide member in the casing, the guide member having an L shape that protrudes outward from the keyboard unit, the guide member being provided in a third area located along a first side of two long sides of the rectangle of the keyboard unit, and
  wherein, during engaging the engagement hole with the engagement protrusion, the guide member is guided in the first direction while engaging the guide member with a guide rail provided along an outer side of the guide groove.

12. An electronic device manufacturing method, comprising: preparing a keyboard unit, a first casing, and a second casing, the keyboard unit being configured as a rectangle and including a first surface and a second surface, the first casing including a third surface, the first surface including at least one key disposed thereon, the second surface including a protrusion portion protruding from the second surface, the protrusion portion including an engagement hole open toward a first direction parallel to a longitudinal direction of the rectangle, the third surface including an insertion hole into which the protrusion portion is configured to be inserted, the first casing including an engagement protrusion provided at a position opposed to the engagement hole of the protrusion portion that is inserted into the insertion hole, the second casing including a display portion that faces the keyboard unit when closed with respect to the first casing, the second casing being pivotably attached to the first casing; inserting the protrusion portion into the insertion hole; and engaging the engagement hole with the engagement protrusion by moving the keyboard unit in the first direction such that the engagement protrusion enters the engagement hole from a direction opposite the first direction, wherein the engagement hole is a through-hole extending in the first direction.

13. The electronic device manufacturing method according to claim 12,
  wherein, during inserting the protrusion portion into the insertion hole, a guide member is inserted into a guide groove provided at a position corresponding to the guide member in the casing, the guide member having an L shape that protrudes outward from the keyboard unit, the guide member being provided in a third area located along a first side of two long sides of the rectangle of the keyboard unit, and
  wherein, during engaging the engagement hole with the engagement protrusion, the guide member is guided in the first direction while engaging the guide member with a guide rail provided along an outer side of the guide groove.

* * * * *